(12) United States Patent
Ariyoshi et al.

(10) Patent No.: US 7,251,817 B2
(45) Date of Patent: Jul. 31, 2007

(54) DISK TRANSFER DEVICE

(75) Inventors: Yuji Ariyoshi, Osaka (JP); Osamu Ataguchi, Osaka (JP); Yosuke Noda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 10/499,326

(22) PCT Filed: Dec. 18, 2002

(86) PCT No.: PCT/JP02/13219

§ 371 (c)(1),
(2), (4) Date: Jun. 17, 2004

(87) PCT Pub. No.: WO03/054874

PCT Pub. Date: Jul. 3, 2003

(65) Prior Publication Data

US 2005/0125812 A1    Jun. 9, 2005

(30) Foreign Application Priority Data

Dec. 20, 2001 (JP) ............................. 2001-388296
Dec. 25, 2001 (JP) ............................. 2001-391940

(51) Int. Cl.
*G11B 17/04* (2006.01)
(52) U.S. Cl. ....................................... 720/603
(58) Field of Classification Search ............ 360/98.08
See application file for complete search history.

(56) References Cited

U.S. PATENT DOCUMENTS

| 4,980,883 | A | | 12/1990 | Mutou et al. | |
|---|---|---|---|---|---|
| 5,878,013 | A | * | 3/1999 | Maeda et al. | 720/606 |
| 6,473,382 | B1 | * | 10/2002 | Tagawa et al. | 720/616 |
| 6,496,464 | B1 | * | 12/2002 | Yamauchi et al. | 720/622 |
| 6,560,184 | B2 | * | 5/2003 | Shida et al. | 720/603 |
| 6,804,821 | B1 | * | 10/2004 | Reed | 720/622 |
| 6,817,021 | B1 | * | 11/2004 | Miyasaka et al. | 720/603 |

FOREIGN PATENT DOCUMENTS

| EP | 0 315 255 | 5/1989 |
|---|---|---|
| EP | 0 862 174 | 9/1998 |
| JP | 8-235715 | 9/1996 |
| JP | 9-7267 | 1/1997 |

\* cited by examiner

*Primary Examiner*—Hoa T. Nguyen
*Assistant Examiner*—Mark Blouin
(74) *Attorney, Agent, or Firm*—Wenderoth, Lind & Ponack, L.L.P.

(57) ABSTRACT

The disk transfer device according to the present invention includes a disk tray for holding the disk during the disk transfer action and a tray driving mechanism for driving the tray forward and backward between a first position which is the retracted location of the tray corresponding to a turn table in a disk drive and a second position which is the loading and unloading location of the disk outwardly of the disk drive, wherein the disk tray comprises a main tray for supporting one side of the disk and a sub tray provided separately of the main tray for holding the other side of the disk, the main tray and the sub tray are joined to each other to have a pocket for accommodating partially the disk.

17 Claims, 42 Drawing Sheets

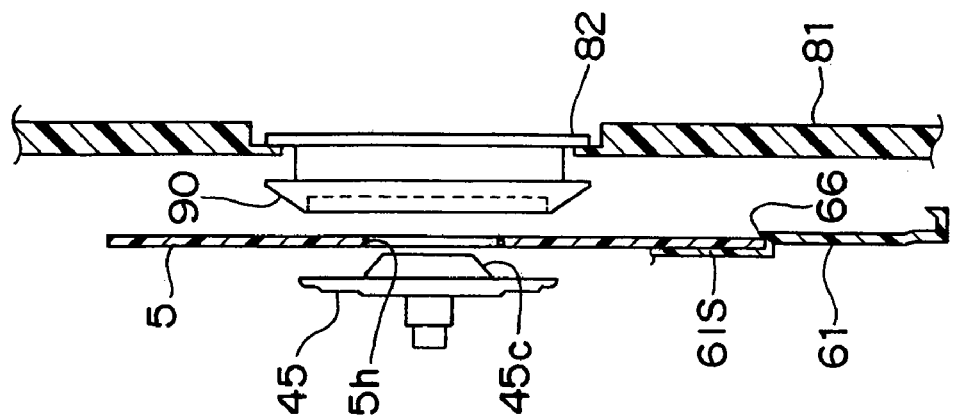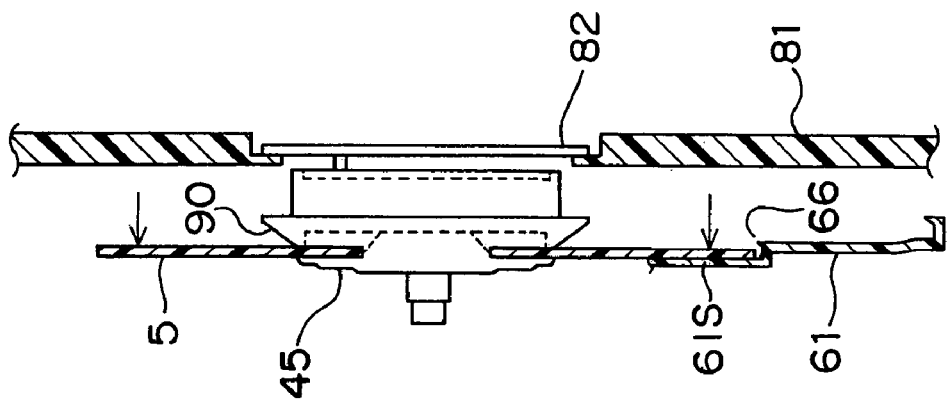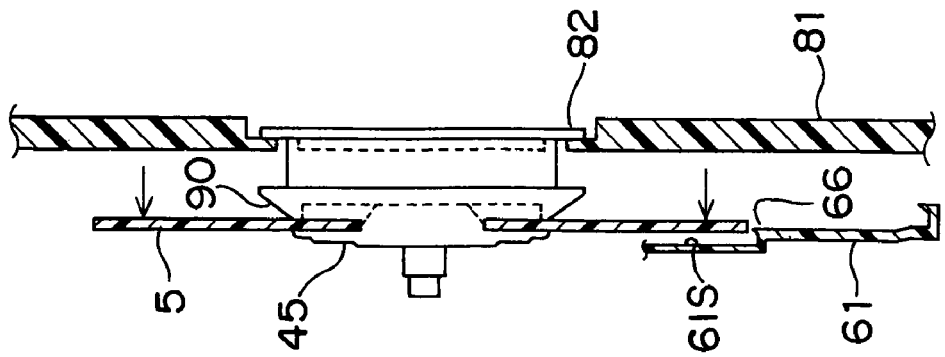

DISK TRANSFER DEVICE

TECHNICAL FIELD

The present invention relates to a disk transfer device to be used in a disk drive for recording a data signal and/or reproducing a data signal recorded to a disk used as a data storage medium such as so-called a CD (Compact Disk) or so-called a DVD (Digital Video Disk or Digital Versatile Disk).

BACKGROUND ART

Conventionally, as a disk transfer device to be used in the above-mentioned disk drive, a disk transfer device to be used in a disk loading equipment that has an opening on the front panel through which a disk tray is drawn out or retracted is well known. In this case, after the tray is drawn out from the disk loading equipment and a disk is loaded onto the tray, the tray is automatically retracted into a predetermined position (a mounted position onto the turntable) in the disk drive assembled in the loading equipment.

In such a type of disk drive, when a disk on the tray is retracted into the disk drive, it is held between the turntable and a clamper. And thereafter, the disk is driven at a specific rotational speed so that data signals recorded to the disk can be read by the disk drive, that is recording or reproducing apparatus, during a read operation, for example. More specifically, signals are recorded to tracks within a specific area of the disk, and a pickup for signal reading is driven according to the track address of the desired signal so that the desired signal can be reproduced.

Incidentally, in the above-mentioned disk drive utilizing a tray in transferring a disk, as types sorted by the installation posture, what is called a horizontal installation type is generally used. In this type of the disk drive, the disk is loaded in a horizontal position. However, depending on the purpose to use or the installed place and the like, what is called a vertical installation type is required. In this type of the disk drive, the disk is loaded in an inclined position to a certain degrees from the horizontal position (in a substantially vertical position, for example).

When such a vertical installation type of disk drive is desired, it might be considered to provide a plurality of claws on an outer periphery in a disk supporting surface of the tray so as to receive an outer periphery of the disk in a substantially vertical position. In this case, the disk is transferred in a state where it is supported by the claws at the outer periphery thereof.

FIG. 44 is an overall perspective view of a vertical type of personal computer E12. As shown in this drawing, in a disk drive assembled into the personal computer E12, a plurality of engaging claws 102 are disposed on a vicinity of an outer periphery in a disk supporting area 101*a* of a disk tray 101. The engaging claws 102 are mounted on the tray so as to rotate about supporting axes 102*s* respectively.

And, in a state that each claw 102 is turned outwardly, a disk (not shown) is placed to disk supporting area 101*a*. Thereafter, each claw 102 is turned inwardly (as shown in FIG. 44), and the disk is engaged by the claws. Thereby, the disk can be held between the claws 102 and the disk supporting area 101*a* of the disk tray 101, and the disk is transferred in the held state.

However, in this constitution of the disk transfer device, there is a problem that disk setting/removal works in which a disk is set to or removed from the tray are very troublesome. That is, in loading a disk to the tray 101 and in unloading a disk from the tray, each engaging claw 102 must be turned always with very careful attention in order to avoid damage to the disk.

Further, in the above-described constitution of the disk transfer device, it is very inconvenient to use one desk drive in both horizontal installation and vertical installation depending upon the purpose to use or the installed place and the like.

Further more, in the above-described constitution of the disk transfer device, the disk is held onto the tray with supported only by a plurality of engaging claws at the lower peripheral portion thereof when it is in the vertical position. Accordingly, it is difficult for the disk to be held with high stability and transferred with no wobbly movements when it is in the vertical position.

The basic object of the present invention is therefore to provide a disk transfer device whereby disk setting/removal works in which a disk is set to or removed from the tray can be performed easily even in vertical installation usage. And another basic object of the present invention is to provide a disk transfer device capable of supporting the disk with high stability and transferring with no wobbly movements even when it is in the vertical position. Further, another basic object of the present invention is to provide a disk transfer device capable of dealing easily with usage in both horizontal installation and vertical installation.

DISCLOSURE OF INVENTION

To achieve the above-described objects, according to a first aspect of the present invention, there is provided a disk transfer device having a disk support member for supporting a disk during it is transferred and a disk support member driving mechanism for driving the disk support member bidirectionally between a first position corresponding to a turntable disposition inside a disk drive and a second position corresponding to a disk loading/unloading position outside the disk drive. The disk support member is provided with a first disk support member for supporting a side face of the disk and a second disk support member for supporting a part of the other side face of the disk, the second disk support member is constituted separately from the first disk support member. And the first and the second disk support member form a pocket portion for receiving a part of the disk.

According to the first aspect of the present invention, the disk can be received and partially held in the pocket defined between the first disk support member and the second disk support member and thus transferred in that state. This allows the disk to be loaded to and unloaded from the disk support members relatively with ease when handled even in the vertical position. Also, it is possible to transfer the disk stably and securely. As the second disk support member is provided separately of the first disk support member, the disk can be held by only the first disk support member with no use of the second disk support member. In the latter case, the disk can easily be loaded on and unloaded from the first disk support member from above when they are placed in the horizontal position.

Further, in a second aspect of the present invention, there is provided a disk transfer device as described in the first aspect, wherein the disk transfer device is further provided with a transfer mode switching mechanism capable of switching the disk transfer mode between a first transfer mode for holding and transferring the disk with only the first disk support member and a second transfer mode for holding and transferring the disk with both of the first disk support member and the second disk support member.

According to the second aspect of the present invention, basically the same function and effect as the first aspect can be obtained. Specifically, the disk transfer mode can be switched, by the transfer mode switching mechanism, between the above-mentioned first transfer mode and the above-mentioned second transfer mode. Therefore, when the disk drive is placed either in the horizontal position or in the vertical position, its transfer action can readily be carried out. And, so-called layout free can be achieved.

Further more, in a third aspect of the present invention, there is provided a disk transfer device as described in the second aspect, wherein the transfer mode switching mechanism switches the disk transfer mode so that the disk is transferred in the first transfer mode when it is in a horizontal position or in a tilting position tilted at an angle within a predetermined value, while the disk is transferred in the second transfer mode when the disk is in a tilting posture tilted at an angle over the predetermined value.

According to the third aspect of the present invention, basically the same function and effect as the second aspect can be obtained. Specifically, the disk transfer mode can be switched, by the transfer mode switching mechanism, from one to the other depending on the angle of a disk tilted from the horizontal position. This allows the transfer of the disk to be suitably switched between the first transfer mode and the second transfer mode in response to the angle of tilting the disk drive.

Still further, in a fourth aspect of the present invention, there is provided a disk transfer device as described in the third aspect, wherein the disk support member driving mechanism is connected with the first disk support member, while, the disk transfer mode switching mechanism is provided on the second disk support member, and a part of driving force of the disk support member driving mechanism is transmitted to the second disk support member through the disk transfer mode switching mechanism in the second transfer state.

According to the fourth aspect of the present invention, basically the same function and effect as the third aspect can be obtained. Specifically, the first disk support member is linked to and can be driven by the disk support member driving device continuously throughout the disk transfer action. On the other hand, the second disk support member receives a part of the driving force via the transfer mode switching mechanism from the disk support member driving device only during the second transfer mode. That is, it is possible to switch reliably the transmission mode of the driving force to the second disk support member when the disk transfer mode is switched.

Still further, in a fifth aspect of the present invention, there is provided a disk transfer device as described in the fourth aspect, wherein the disk transfer mode switching mechanism is provided with a switching lever which is vertically hanging down with its own weight for swing motion freely in relation to the second disk support member.

According to the fifth aspect of the present invention, basically the same function and effect as the fourth aspect can be obtained. Specifically, the switching lever provided in the transfer mode switching mechanism is vertically hanging down with its own weight for swing motion in relation to the second disk support member. In other words, even when the disk drive with its second disk support member is tilted from the horizontal position, the switching lever remains unchanged as vertically hanging down with its own weight. Therefore, when the tilting state of the second disk support member is changed, its tilting state in relation to the switching lever is changed. Thereby, it is possible to switch automatically the disk transfer mode between the first transfer mode and the second transfer mode in response to a change in the position of the second disk support member relative to the switching lever which remains vertical.

Still further, in a sixth aspect of the present invention, there is provided a disk transfer device as described in the fifth aspect, wherein a first lock member is further provided, the first lock member is to prevent a swing motion of the switching lever when only the first disk support member is driven, and the first lock member is to release a preventive state in which the swing motion of the switching lever is prevented when the first disk support member is at the first position.

According to the sixth aspect of the present invention, basically the same function and effect as the fifth aspect can be obtained. Specifically, when the first disk support member only is driven, the swing motion of the switching lever is inhibited by the first locking member. This allows the first disk support member never to be interrupted by the switching lever when the first disk support member is returned back to its first position after the disk drive is shifted to the vertical position from the horizontal position where the first disk support member has been drawn out to the second position. While the first disk support member is at its first position, the movement of the switching lever remains not inhibited and can thus be proceeded without difficulty for switching the disk transfer action mode.

Still further, in a seventh aspect of the present invention, there is provided a disk transfer device as described in the fifth or sixth aspect, wherein a second lock member is further provided, the second lock member is to prevent a swing motion of the switching lever when both of the first and the second disk support member are driven. And the second lock member is to release a preventive state in which the swing motion of the switching lever is prevented when both of the first and the second disk support member are at the first position.

According to the seventh aspect of the present invention, basically the same function and effect as the fifth or sixth aspect can be obtained. Specifically, when both the first and second disk support members are driven, the swing motion of the switching lever is inhibited by the second locking member. This allows the two, first and second, disk support members never to be interrupted by the switching lever when the two disk support members are returned back to their first position after the disk drive is shifted to the vertical position from the horizontal position where the two disk support members have been drawn out to their second position. While the two disk support members are at their first position, the movement of the switching lever remains not interrupted and can thus be proceeded without difficulty for switching the disk transfer action mode.

Still further, in a eighth aspect of the present invention, there is provided a disk transfer device as described in any one of the first to the third aspects, wherein the disk transfer device is further provided with an urging mechanism capable of urging the disk held by both of the first and the second disk support member toward the first disk support member.

According to the eighth aspect of the present invention, basically the same function and effect as any one of the first to the third aspect can be obtained. Specifically, the disk held between the first disk support member and the second disk support member can remain pressed, by the urging mechanism, against the first disk support member. This allows the disk to be held with higher stability and transferred with no wobbly movements even when it is in the vertical position. Accordingly, it is possible to determine the distance between the first disk support member and the second disk support member to relatively large. And, as there is spaced by a relative large distance between both the first and the second disk support member, the disk can be loaded and unloaded at the distance between the two disk support members with much smoothness and thus protected from accidental injury. As the result, the handling of the disk will be facilitated.

Still further, in a ninth aspect of the present invention, there is provided a disk transfer device as described in the eighth aspect, wherein the urging state in which the disk is urged toward the first disk support member is released when the disk is at the first position.

According to the ninth aspect of the present invention, basically the same function and effect as the eighth aspect can be obtained. Specifically, as the disk is freed from being pressed against the first disk support member at the first position corresponding to the turn table in the disk drive. Therefore, at the first position, the disk is never retained between the first disk support member and the urging mechanism. Accordingly, there is no fear of trouble caused by an interruption with the first disk support member and the urging mechanism when the disk is loaded onto the turn table.

Still further, in a tenth aspect of the present invention, there is provided a disk transfer device as described in the ninth aspect, wherein the urging mechanism is provided with a disk guide having a contact portion capable of contacting directly a part of the peripheral portion of the disk held by both of the first and the second disk support member. The urging mechanism is also provided with an urging member capable of urging the disk guide toward the first disk support member. The disk guide is mounted to the second disk support member for pivotal movement, and the disk guide is capable of pivoting about a mounting point thereof in a plane parallel to the disk.

According to the tenth aspect of the present invention, basically the same function and effect as the ninth aspect can be obtained. Specifically, disk guide having a contact portion capable of contacting directly a part of the peripheral portion of the disk held by both of the first and the second disk support member is capable of pivoting in a plane parallel to the disk. And this disk guide is urged toward the first disk support member by the urging member. Accordingly, the disk when pressed and retained against the first disk support member will be protected from any injury on its (surface for information signal recording) disk side.

Still further, in a eleventh aspect of the present invention, there is provided a disk transfer device as described in the tenth aspect, wherein the disk transfer device is further provided with a clamp board covering the second disk support member when both of the first and the second disk support member are disposed at the first position. While the disk guide is provided with a projection capable of engaging with a groove provided in the clamp board. And, when both of the first and the second disk support member are disposed at the first position, the projection of the disk guide is guided along the groove of the clamp board, thereby the disk guide is turned toward a predetermined direction. Also, thereby the urging state in which the disk is urged toward the first disk support member is released.

According to the eleventh aspect of the present invention, basically the same function and effect as the tenth aspect can be obtained. Specifically, the disk guide is provided with a projection capable of engaging with a groove provided in the clamp board, and the projection of the disk guide is guided by the groove formed in the clamp board thereby the rotational position of the disk guide is changed. And, the urging state of the disk against the first disk support member is released when both of the first and second disk support members are disposed at the first position. That is, the urging state of the disk against the first disk support member and the released state thereof can be reliably switched to each other by a relatively simple constitution of an engagement between the projection provided on the disk guide and the guide groove provided in the clamp board.

BRIEF DESCRIPTION OF DRAWINGS

FIGS. 42(a), (b) and (c) are parts of explanatory view showing a series of steps for clamping between the damper and the turn table a small size disk which is held with the holding projections on the small diameter support region of the main tray;

BEST MODE FOR CARRYING OUT THE INVENTION

Figure 1:
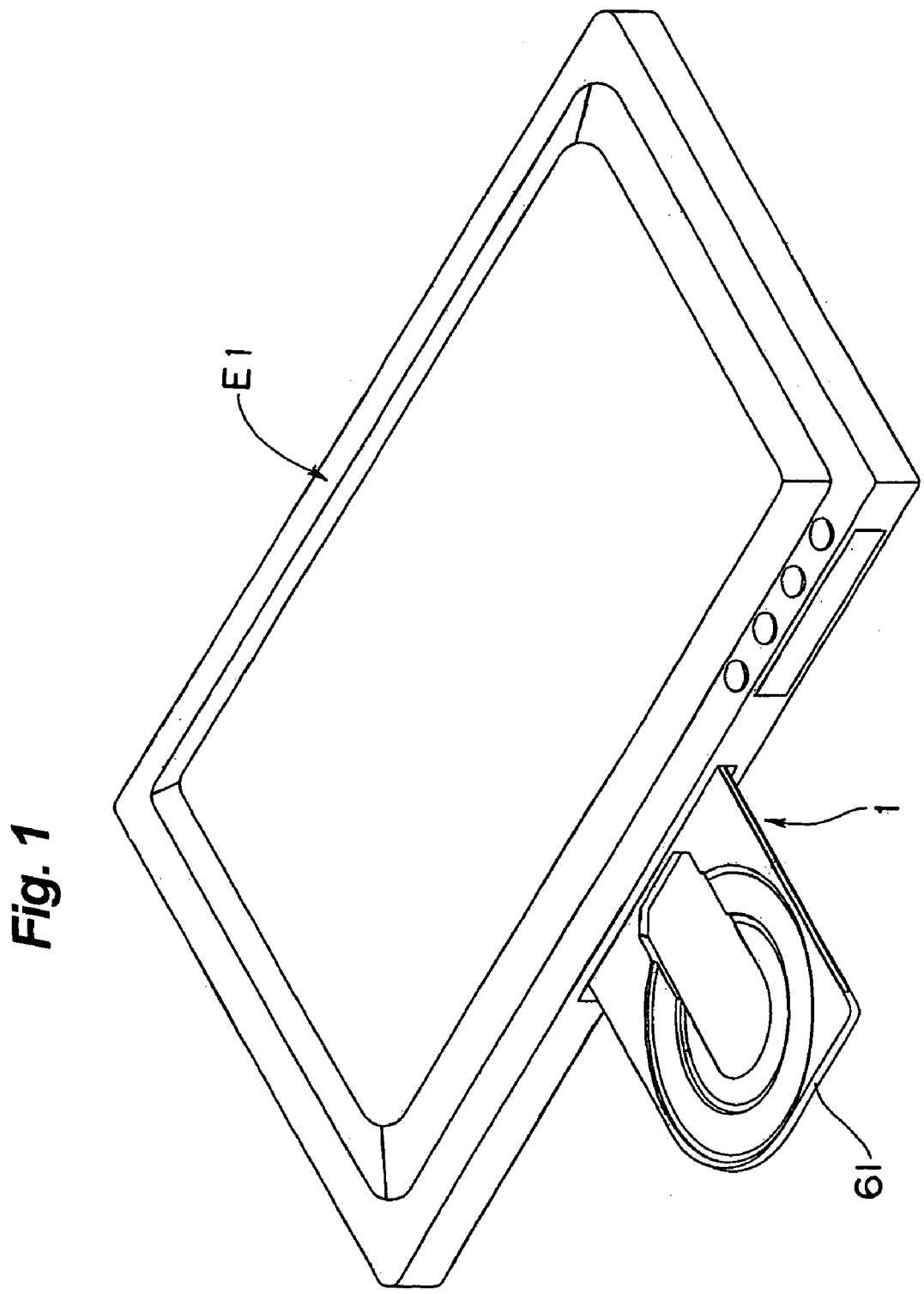
FIG. 1 is a perspective view of a horizontal type personal computer equipped with a disk drive according to one embodiment of the present invention.
Figure 2:
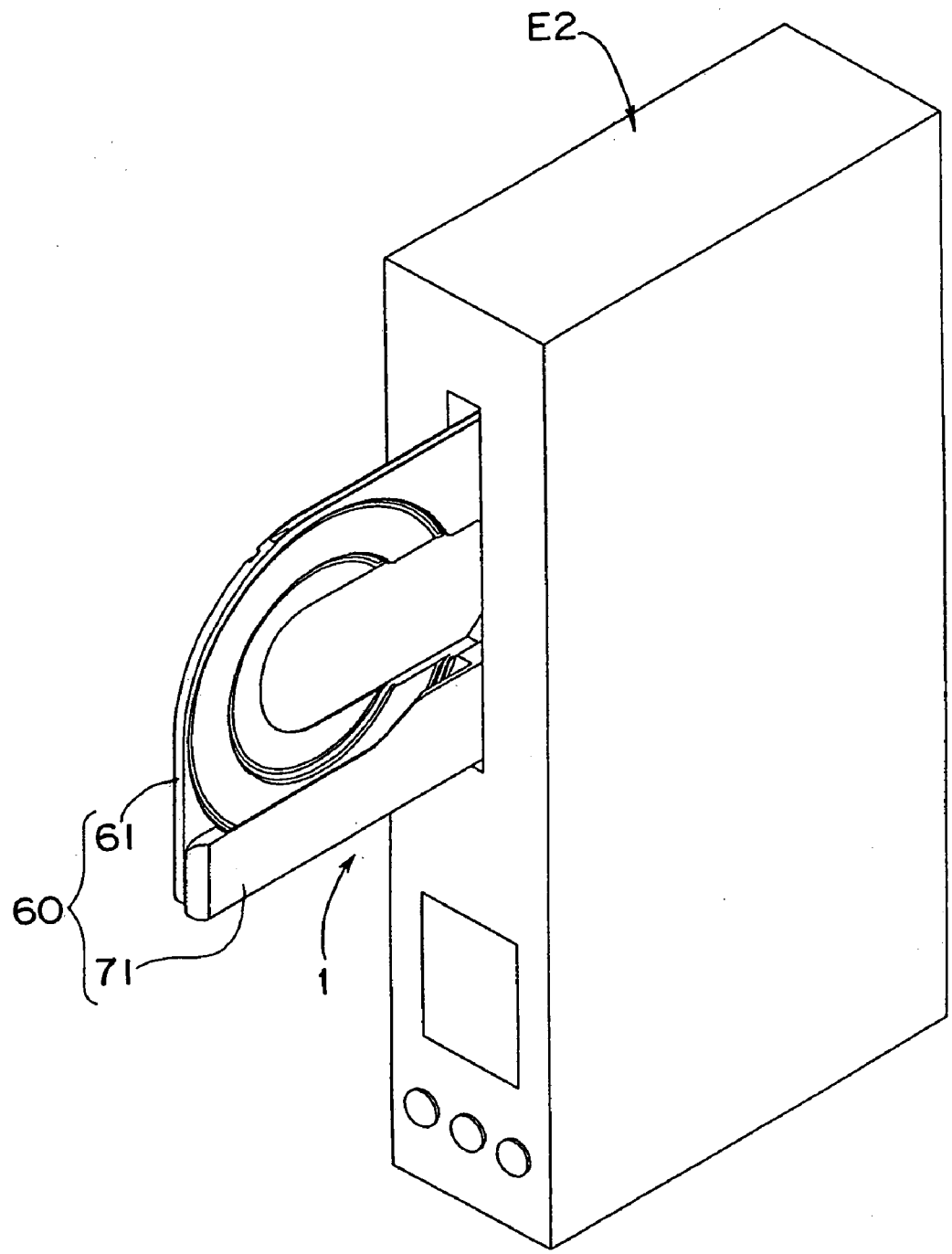
FIG. 2 is a perspective view of a vertical type personal computer equipped with the disk drive of the embodiment.
Figure 3:
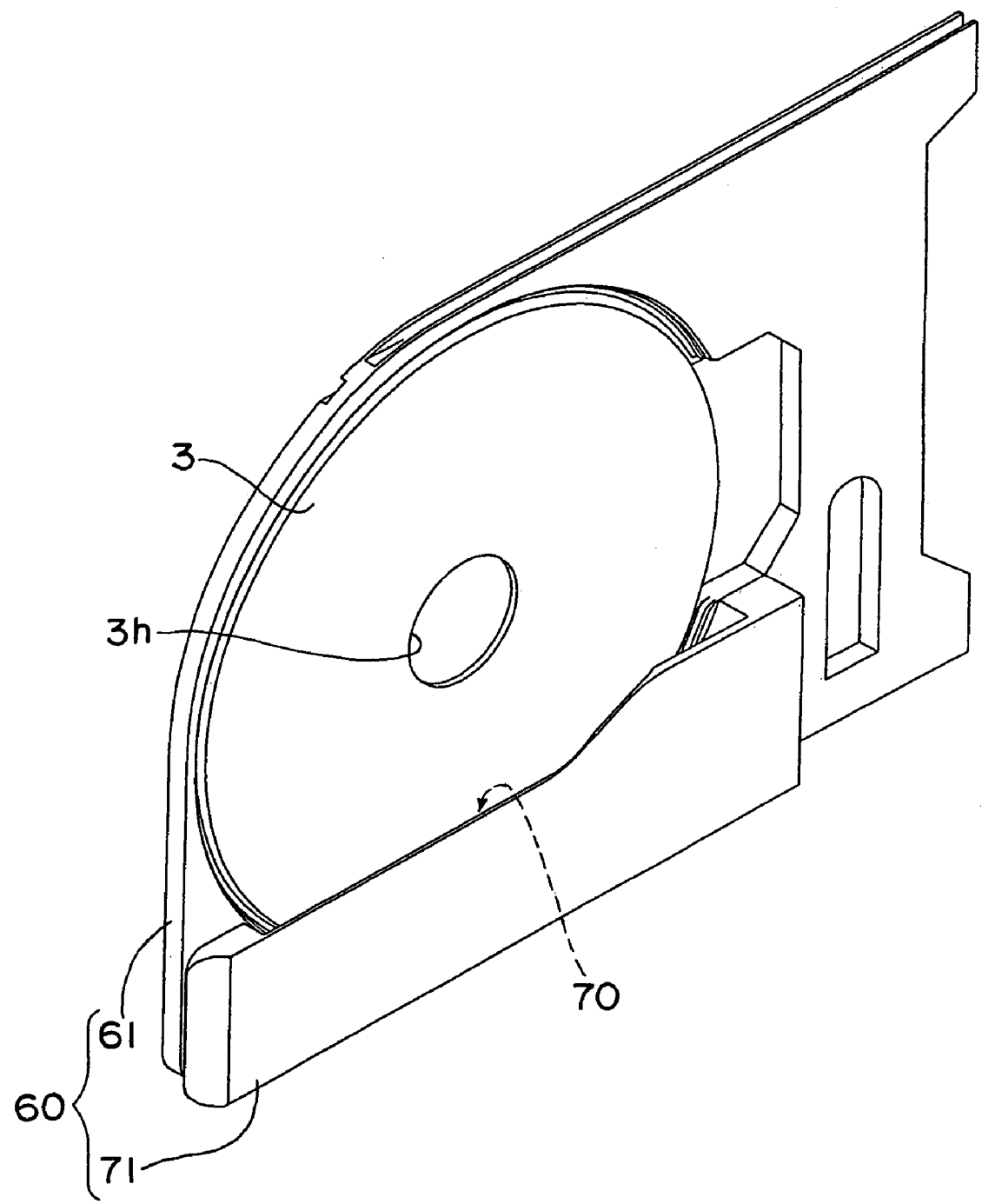
FIG. 3 is an enlarged perspective view of a disk and a disk tray drawn out from the vertical type personal computer.

Hereinafter, one preferred embodiment of the present invention will be described in more detail referring to the accompanying drawings. FIGS. 1 and 2 are perspective views of disk loading apparatuses E1 and E2 (e.g. personal computers) respectively which are loaded with so-called CDs or DVDs as data recording mediums. FIG. 1 illustrates a personal computer E1 of so-called horizontal type with a disk loaded in a substantially horizontal position. FIG. 2 illustrates a personal computer E2 of so-called vertical type with a disk loaded in a substantially vertical position. FIG. 3 is an enlarged perspective view showing a disk 3 held in disk trays 61 and 71 (a tray unit 60) which are drawn out from the vertical type personal computer E2.

Each of the personal computers E1 and E2 includes a disk drive 1 employing a disk transfer device of the present invention. The disk drive 1 is applicable to either the horizontal type personal computer E1 or the vertical type personal computer E2 as will be explained later in more detail.

In order to achieve such applicability, as shown in FIGS. 2 and 3, the disk drive 1 is provided with a try unit 60 having a main tray 61 and a sub tray 71 formed separately from the main tray 61. The main try 61 is to support one surface of the disk 3, and the sub tray is to support a part of the other surface of the disk 3. Detailed construction and the like of the tray unit 60 will be explained later.

The disk drive 1 may also be applied without difficulty to any system with its disk loading apparatus operated in both horizontal and vertical positions depending on the location and condition of the use. In other words, the disk drive 1 is so-called two-way layout free. Further, even when the tray unit 60 drawn out of the disk drive 1 in a vertical position is placed in a horizontal position, it can be drawn in and received in the disk drive 1 without difficulty. Furthermore, when the tray 61 (main tray) drawn out of the disk drive 1 in a horizontal position is placed in a vertical position, it can be drawn in and received in the disk drive 1 without difficulty. That is, the disk drive 1 is arranged effectively responsive to so-called perfect layout free requirement.

Figure 4:
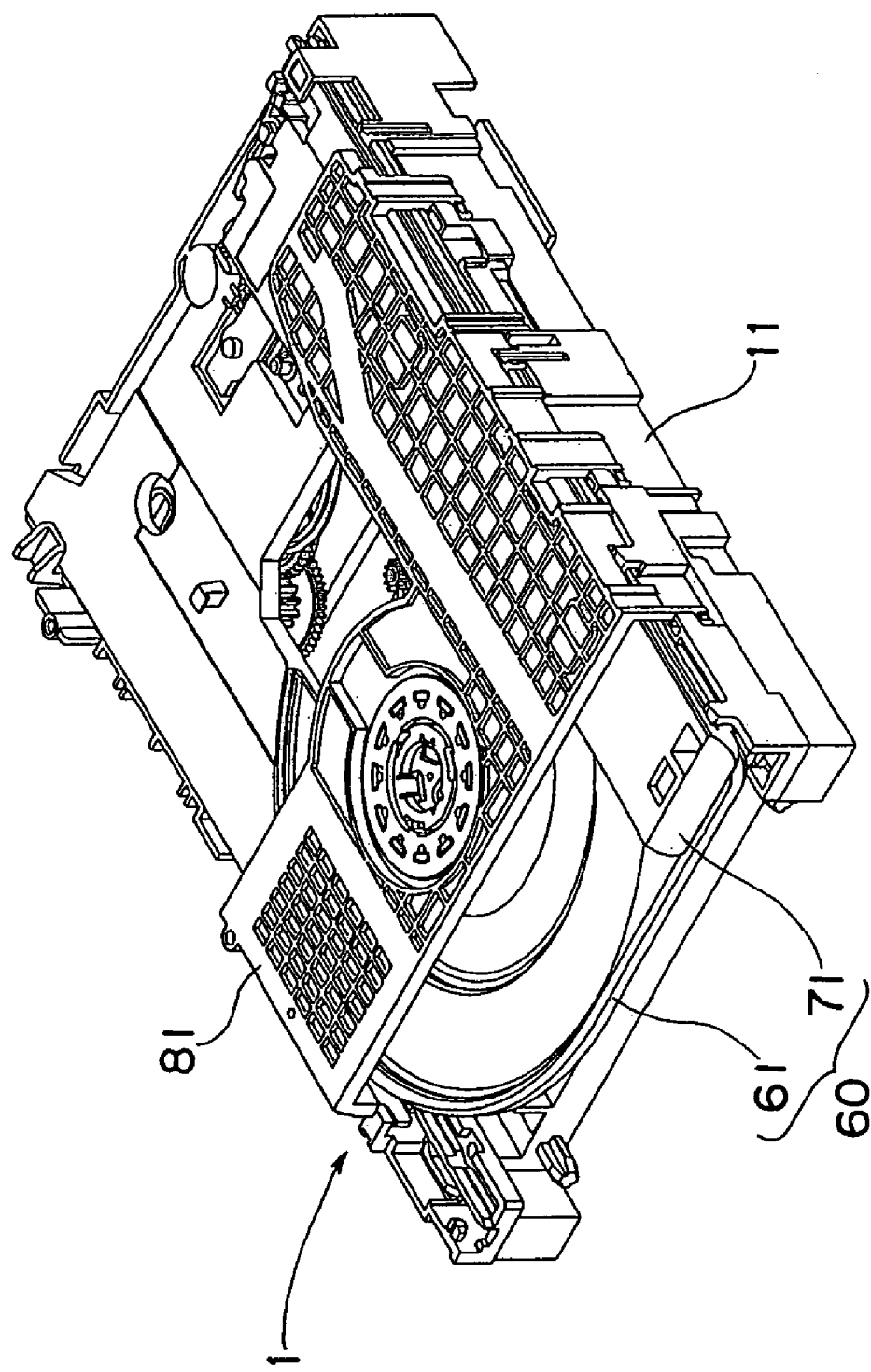
FIG. 4 is a perspective view of the disk drive placed in the horizontal position with the tray retracted therein.
Figure 5:
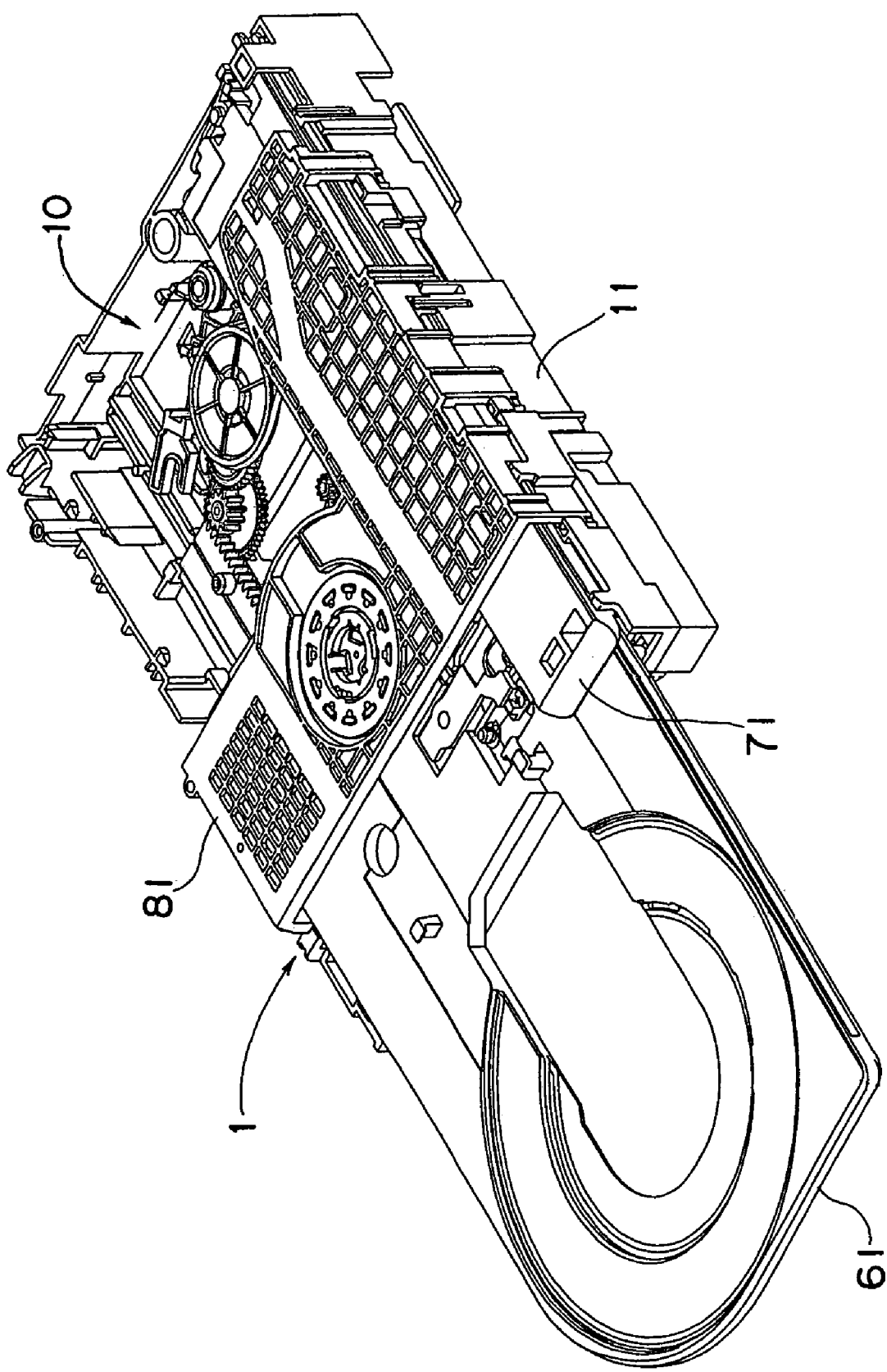
FIG. 5 is a perspective view of the disk drive placed in the horizontal position with the tray drawn out therefrom.
Figure 6:
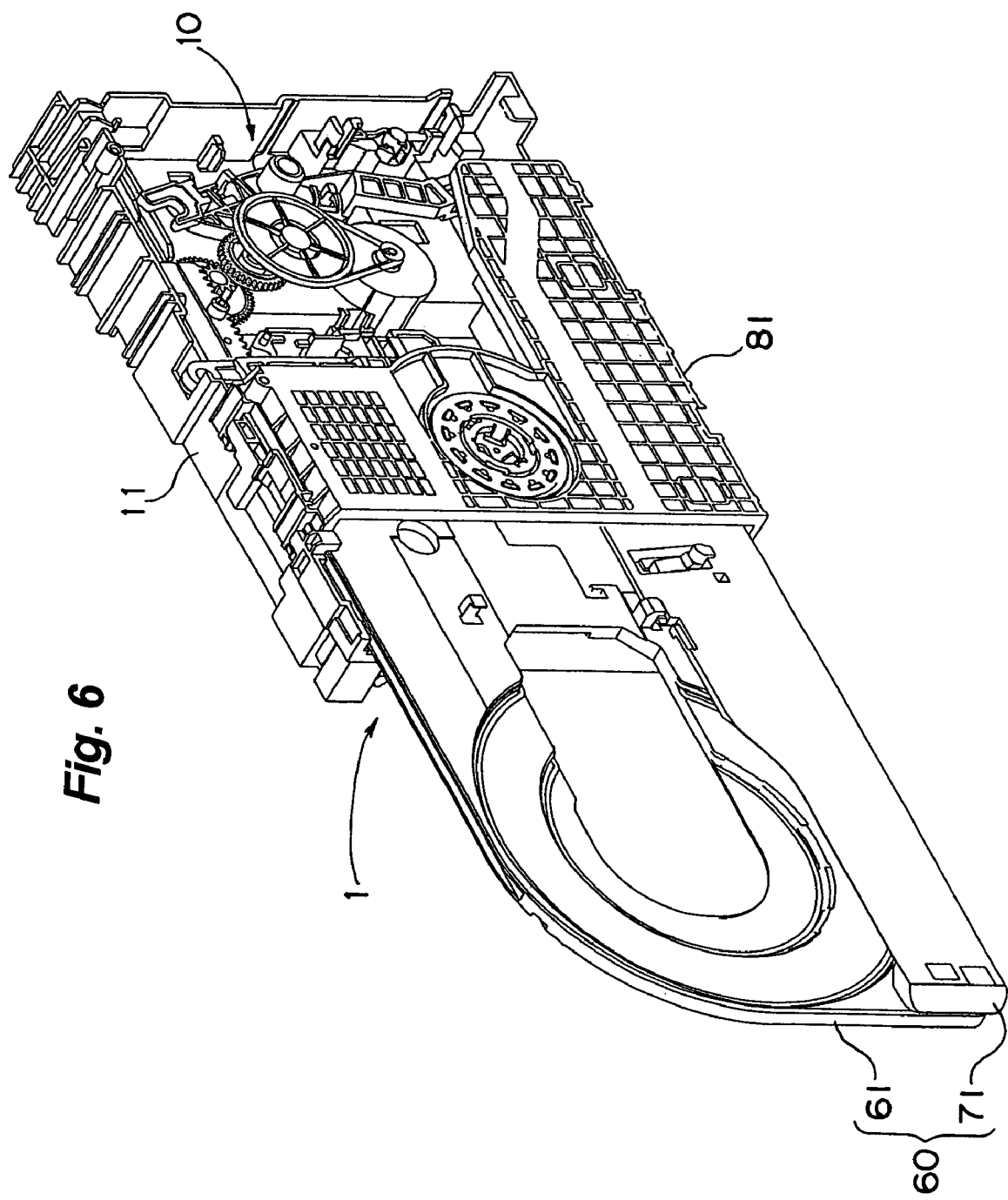
FIG. 6 is a perspective view of the disk drive placed in the vertical position with the tray drawn out therefrom.

FIGS. 4 and 5 are perspective views of the disk drive which is placed in a horizontal position with its tray drawn in and out respectively. FIG. 6 is a perspective view of the disk drive 1 placed in a vertical position with its tray drawn out.

As apparent from the drawings, in the disk drive 1 according to the present invention, only the main tray 61 is driven when it is in the horizontal position, and the disk 3 is transferred while loaded on the main tray 61. When the disk drive 1 is placed in the vertical position, both the main tray 61 and the sub tray 71 are driven, and the disk 3 is transferred while held by the both trays 61 and 71.

It is to be noted that the side of the disk drive 1 from which the disk tray 61, 71 are drawn out the disk drive 1 is hereafter referred to as the forward side of the disk drive 1 and the reverse side of the disk drive 1 to which the disk tray 61, 71 are retracted in the disk drive 1 is hereafter referred to as the rear side of the disk drive 1.

Figure 7:
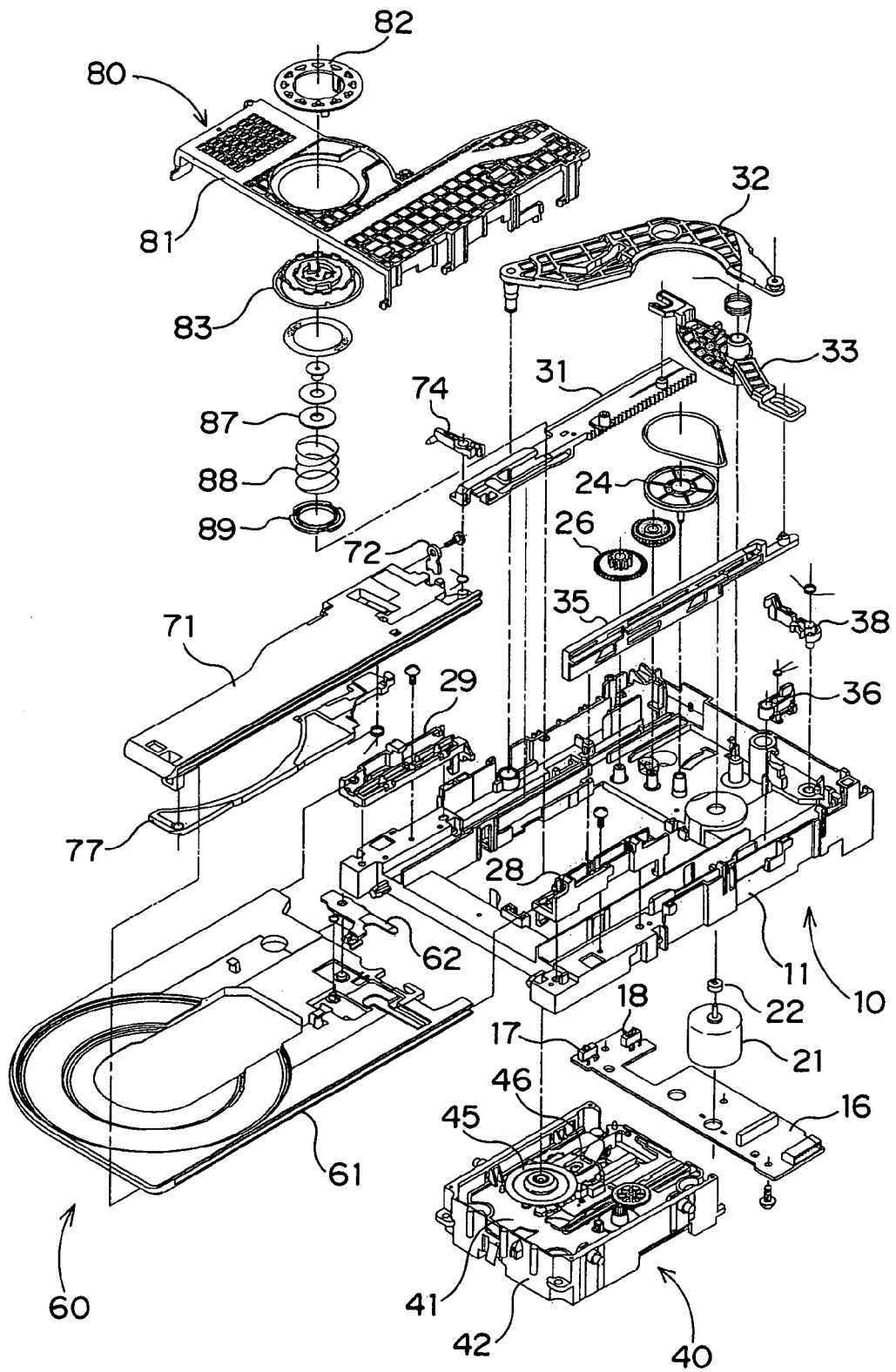
FIG. 7 is an exploded perspective view of the disk drive placed in the horizontal position.

FIG. 7 is an exploded perspective view of the disk drive 1 placed in the horizontal position. As shown in this drawing, the disk drive 1 comprises a base unit 10, a traverse unit 40, the tray unit 60, and a clamp unit 80 as its fundamental units.

FIGS. 8, 9, 10, and 11 are enlarged exploded perspective views showing the base unit 10, the traverse unit 40, the tray unit 60, and the clamp unit 80 in the disk drive 1 respectively.

As shown in FIGS. 4-11, some components of the disk drive 1 (e.g. drive arm 32, change lever 33, clamp base plate 81 which will be explained later) are actually provided with various type of ribs formed on the surface thereof, for the purpose of reducing the weight. However, in the following detail drawings and the like, those surface ribs will be occasionally eliminated in order to avoid excessive complexity of the drawings.

The base unit 10 includes a drive base 11 provided as a mounting base on which primary components in the disk drive 1 are mounted. As shown in detail in FIG. 8, the overall shape of the drive base 11 is substantially a rectangular frame shape in a plan view. The traverse unit 40 is to be accommodated into an inner opening 11H of the drive base 11.

Figure 9:
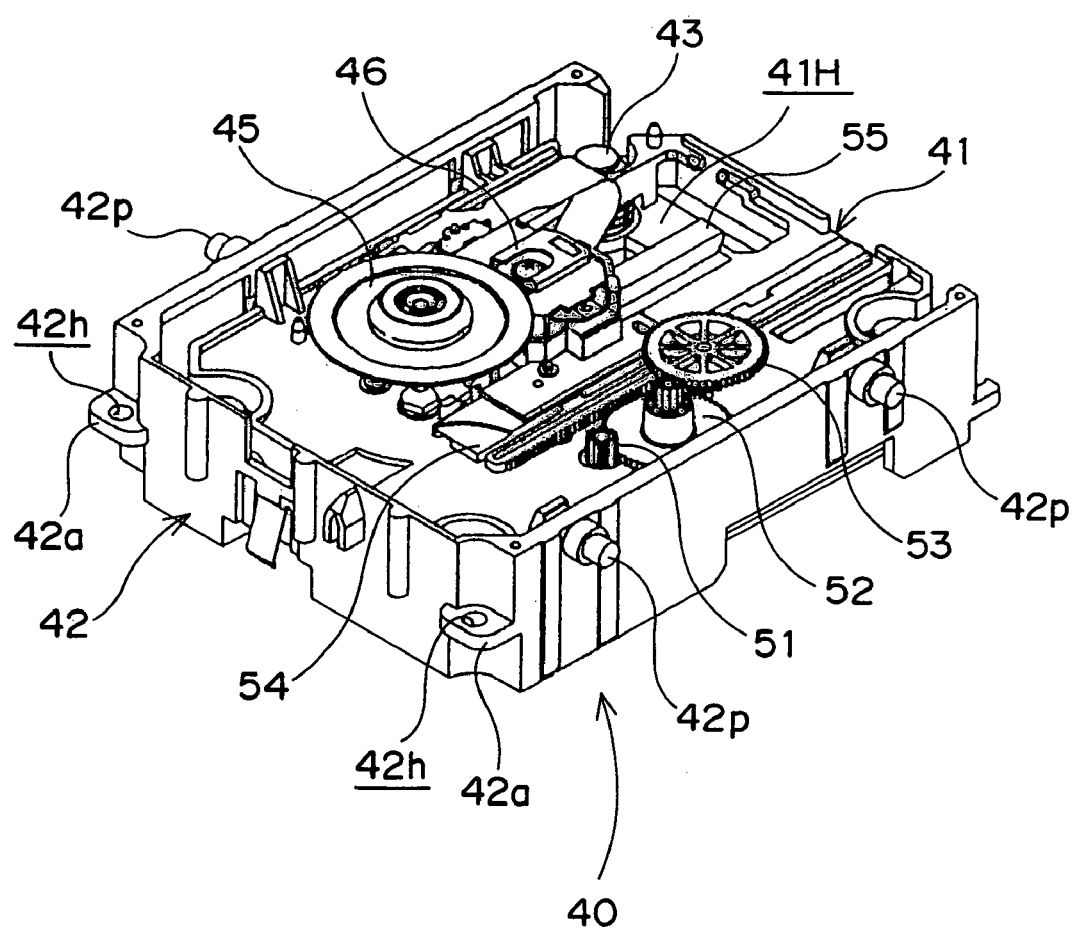
FIG. 9 is an enlarged, exploded perspective view of a traverse unit provided in the disk drive.

As shown in detail in FIG. 9, the traverse unit 40 includes a traverse base 41 provided as a mounting base on which major components of a drive mechanism for rotating a disk and a recording/reproducing mechanism for recording and/or reproducing data signals on the disk. As will be explained later in more detail, the disk drive 1 is capable of recording and/or reproducing not only a normal disk of 12 cm in nominal diameter (a large size disk 3) but also a small size disk of 8 cm in nominal diameter.

The traverse unit 40 also includes a traverse base 41 on which traverse components such as a turntable 45 and a pickup device 46 etc. are mounted. An intermediate frame 42 is provided outwardly of the traverse base 41.

Figure 12:
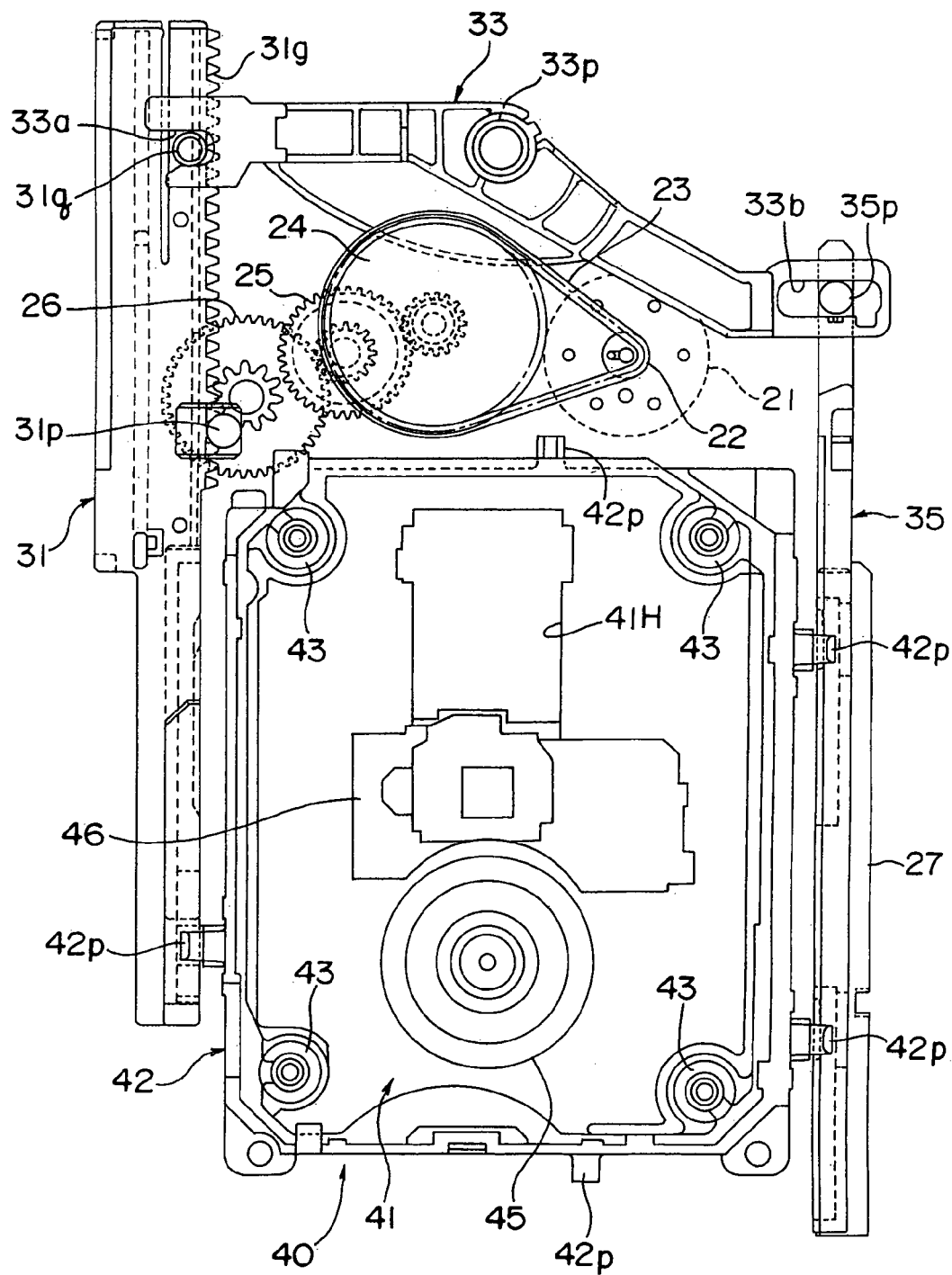
FIG. 12 is an explanatory plan view showing the traverse unit and a part of a tray driving mechanism.

FIG. 12 is an explanatory plan view showing the traverse unit 40 and a part of a tray driving mechanism. As illustrated in FIG. 12, the intermediate frame 42 is provided with floating bushings 43 at the four inside corners thereof. The floating bushing 43 is formed by an elastic member, such as rubber member, or by combining a spring with the elastic member.

The traverse base 41 is supported by the four floating bushings 43 so that the traverse base 41 can float (is supported in a floating condition) relative to the intermediate frame 42 within a specific range (that is, within the elasticity of the floating bushing 43). Since the floating mechanism is well known, more detailed illustration and explanation will be omitted. The intermediate frame 42 also has four retaining plates 42a (See FIG. 9) at the four outside corners thereof, though not particularly utilized in this embodiment, for retaining to the intermediate frame 42 by screws or the like inserting through corresponding holes 42h.

The intermediate frame 42 has a plurality of guide pins 42p (See FIGS. 9 and 12) provided on the outer side walls thereof. The intermediate frame 42 is supported by the drive base 11 through the guide pins 42p so that it can be lifted up and down relative to the drive base 11. In other words, the traverse base 41 (of the traverse unit 40) is coupled by the intermediate frame 42 to the drive base 11 in a flowing state and can thus be lifted up and down. This inhibits the transfer of vibrations from the drive base 11 to the traverse unit 40. The lifting mechanism of the traverse unit 40 against the drive base 11 will be explained later in more detail.

The traverse base 41 carries, as illustrated in detail in FIG. 9, the turn table 45 for loading and rotating a disk and the pickup device 46 for recording and playing back the disk loaded on the turn table 45. The pickup device 46 is driven by a driving mechanism which comprises a gear assembly including a motor gear 51, an intermediate gear 52, and an output gear 53 and a rack plate 54 having rack teeth for engagement with a small toothed wheel of the output gear 53. Moreover, a guide rod 55 is provided extending into an opening 41H of the traverse base 41.

The guide rod 55 and the rack plate 54 extend in parallel to a radial direction of the turn table 45 (that is, a radial direction of the disk supported on the turn table 45).

The pickup device 46 is coupled integral with the rack plate 54 and slidably engaged with the guide rod 55. Accordingly, the pickup device 46 can be moved together with the rack plate 54 along the guide rod 55.

The motor gear 51 is fixedly joined to the output shaft of an electric motor (not shown). The driving force of the electric motor when energized is transmitted via the gear assembly (including the motor gear 51, the intermediate gear 52 and the output gear 53) to the rack plate 54. Thereby, the pickup device 46 is driven together with the rack plate 54 along the radial direction of the turn table 45 for recording and reproducing data signals on the disk loaded on the turn table 45.

Although not shown, the traverse base 41 has two electric motors, a spindle motor for driving the turn table 45 and another motor for driving the pickup device 46, and a controller circuit board mounted on the back side thereof for controlling the actions of the turn table 45 and the pickup device 46. The controller circuit board and its function for controlling the actions of the turn table 45 and the pickup device 46 are equal to those well known in the art and will be explained in no more detail.

Figure 13:
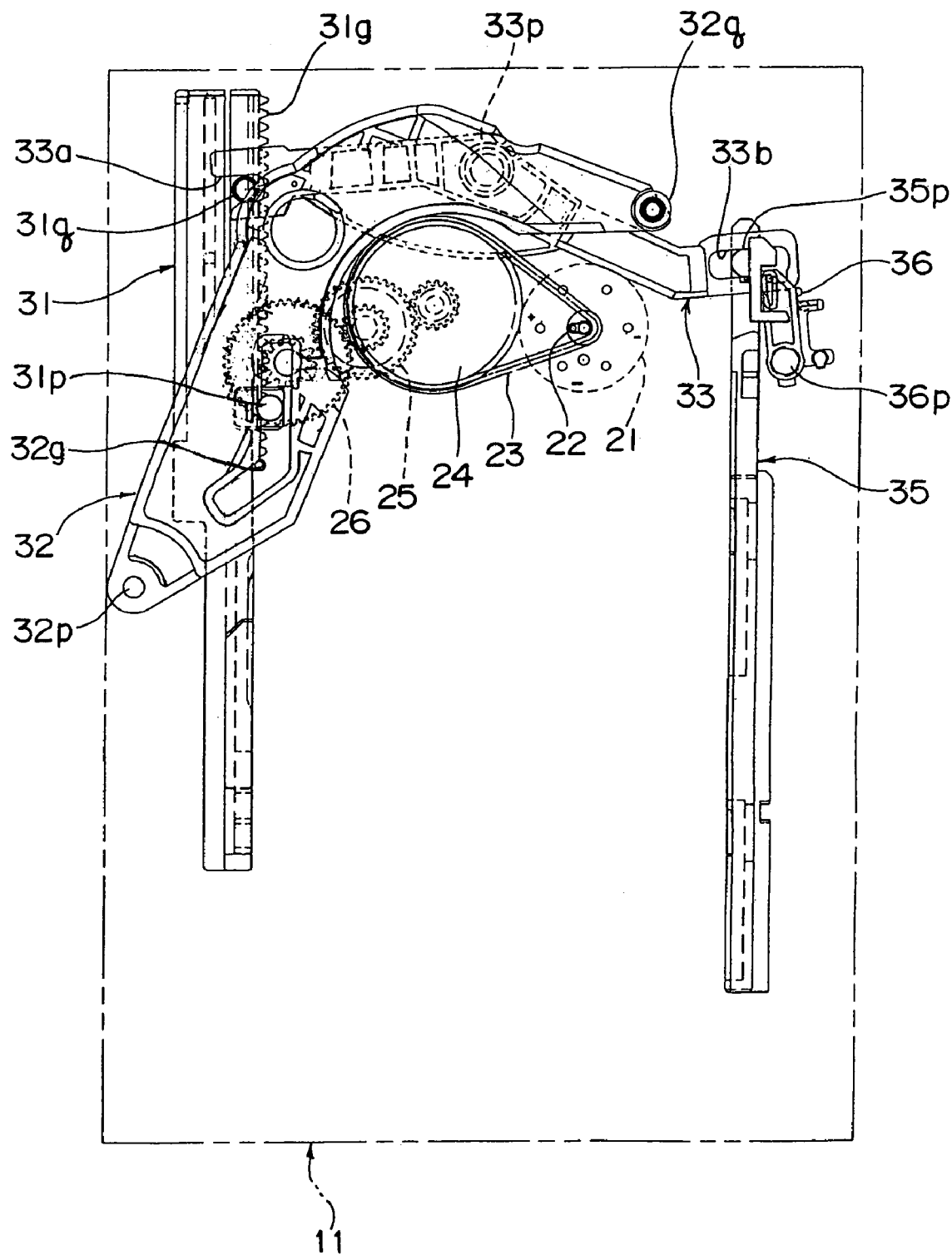
FIG. 13 is an explanatory plan view of the tray driving mechanism.

FIG. 13 is an explanatory plan view showing the tray driving mechanism. The base unit 10, as shown particularly in FIGS. 8 and 13, includes a driving rack 31 acting as a sliding member for sliding movement along the tray forward and backward directions in the drive base 11 (in the frontward and rearward directions of the disk drive 1) and a driving arm 32 for driving the main tray 61.

Figure 8:
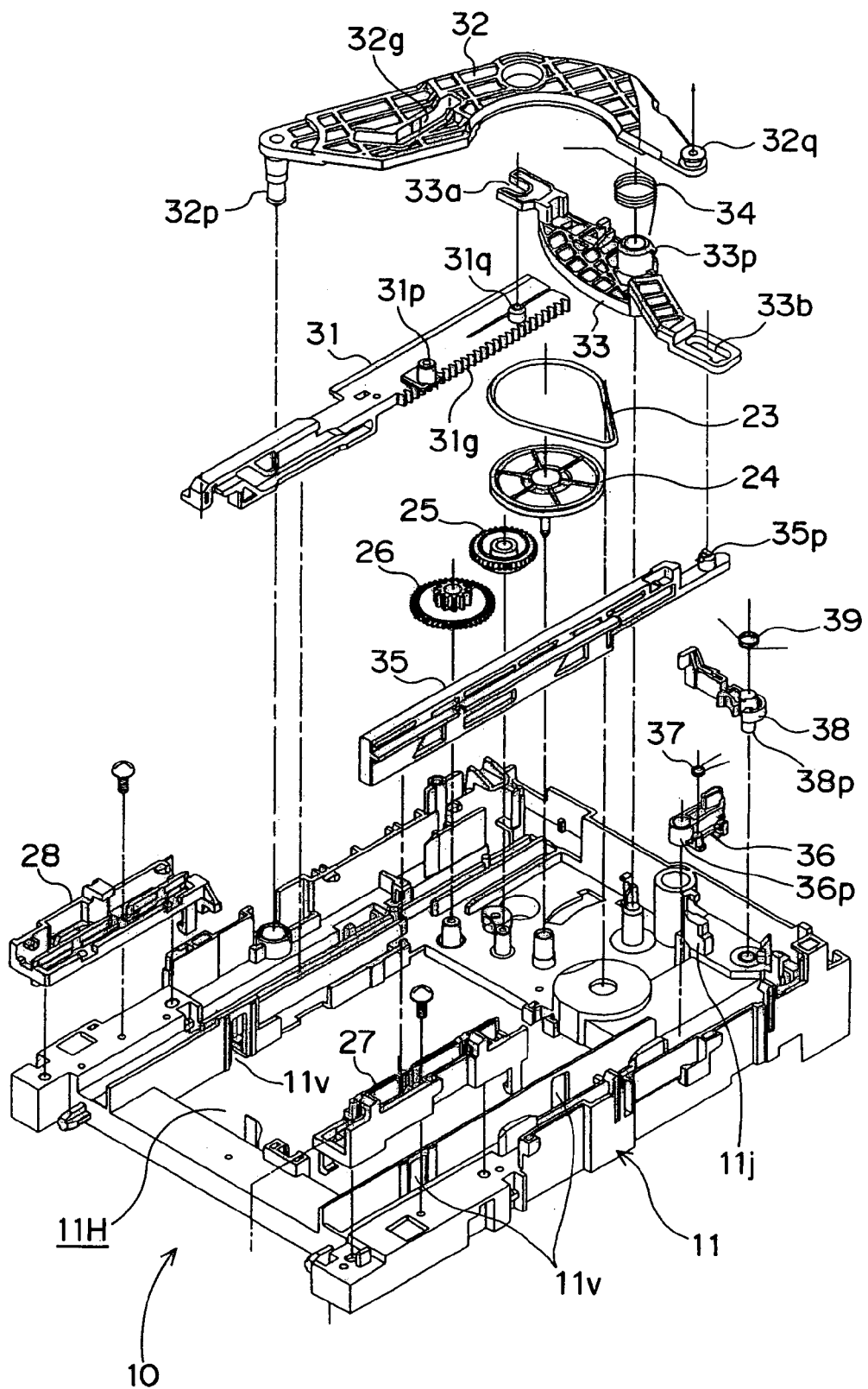
FIG. 8 is an enlarged, exploded perspective view of a base unit provided in the disk drive.

As shown in FIG. 8, the driving arm 32 is pivotably joined at one end by a pivot pin 32p to the drive base 11 (for pivotal movement). And, the other end of the driving arm 32 is jointed by a driving pin 32q to the main tray 61 (refer to FIGS. 14-16 which will be explained later). More specifically, the driving arm 32 is supported for pivotal movement in a plane parallel to the drive base 11 about the pivot pin 32p. Also, the driving arm 32 has a guide slot 32g of a predetermined shape and a predetermined length provided in the middle portion thereof. As its guide slot 32g stays in engagement with a first pin 31p of the driving rack 31, the driving arm 32 is linked to the driving rack 31 (refer to FIGS. 13-16).

The guide slot 32g of the driving arm 32 acts as a first connecting portion for connecting the driving arm 32 with a sliding member (driving rack 31). The driving pin 32q acts as a second connecting portion for connecting the driving arm 32 with a first disk support member (main tray 61).

As shown in detail in FIGS. 7, 12 and 13, the drive base 11 also includes a sliding mechanism for actuating the sliding movement of the driving rack 31. The sliding mechanism comprises an electric motor 21, a motor pulley 22, a driving belt 23, and an assembly of gears 24, 25 and 26. The gear assembly consists of a pulley gear 24, an output gear 26 and an intermediate gear 25 connected between the pulley gear 24 and the output gear 26. T pulley gear 24 is to be driven by the motor 21 through the motor pulley 22 fixed to an output shaft of the motor 21 and the driving belt 23. And, the output gear 26 is provided with a small diameter toothed wheel meshed with the rack teeth 31g of the driving rack 31.

When the electric motor 21 is energized, its driving force is transmitted via the motor pulley 22, the driving belt 23, and the gear assembly (the pulley gear 24, the intermediate gear 25 and the output gear 26) to the driving rack 31. Thereby, the driving rack 31 is driven to slide frontwardly and rearwardly of the disk drive 1. The direction of the sliding movement of the driving rack 31 can be switched by shifting the direction of the rotation of the electric motor 21.

As shown in FIG. 7, the electric motor 21 is mounted from the back to the drive base 11 through a motor mounting plate 16. Provided on the motor mounting plate 16 are an open switch 17 switched on for drawing out the tray from the disk drive 1 and a play switch 18 switched on for retracting the tray and recording or playing back the disk on the tray. The direction of the rotation of the electric motor 21 can be determined by switching on either of the two switches 17 and 18.

As shown in FIGS. 8, 12 and 13, the drive base 11 includes a sub rack 35 provided opposite to the driving rack 31. The sub rack 35 is to act as a sub slide member which is driven associated with the slide member (driving rack 31). The sub rack 35 extends in parallel to the driving rack 31 and is slidably mounted on the drive base 11 for forward and backward movement (frontwardly and rearwardly of the disk drive 1). A lock lever 36 is provided at the side of rear portion of the sub rack 35 (refer to FIGS. 8 and 13). The lock lever 36 is mounted on the drive base 11 for pivotal movement about a pivot 36p. The lock lever 36 remains urged by a spring 37 (FIG. 8) so that its distal end is turned towards the sub rack 35.

The lock lever 36 is to inhibit an unwanted forward movement of the main tray 61, when the main tray 61 remains at its first position in the disk drive 1. With the main tray 61 staying at the first position, the lock lever 36 is engaged at its distal end with a corresponding engaging tab 61m (See following FIG. 26) of the rear end of the main tray 61 which is thus inhibited from forward movement.

When the sub rack 35 is slid backward, the lock lever 36 turns to unlock the main tray 61. As the sub rack 35 is further slid backward, its engaging recess 35j (See following FIG. 19) comes into engagement with the distal end of the lock lever 36.

As shown in FIGS. 8, 12 and 13, the drive base 11 also includes a change lever 33 arranged pivotable by the sliding action of the driving rack 31. The change lever 33 is mounted on the drive base 11 for pivotal movement in a plane parallel to the drive base 11 about its pivot 33p.

The change lever 33 has a first engaging portion 33a provided at one end thereof for engagement with a second pin 31q of the driving rack 31 and a second engaging portion 33b provided at the other end for engagement with the rear end pin 35p of the sub rack 35. The change lever 33 remains urged by a spring 34 (refer to FIG. 8) towards a direction to pivot for driving the sub rack 35 to slide backward. The change lever 33 and the urging spring 34 act as a sub slide drive mechanism for driving the sub sliding member (sub rack 35) associated with a sliding movement of the sliding member (driving rack 31).

When the main tray 61 is at the first position in the disk drive 1, the first engaging portion 33a of the change level 33 remains engaged with the second pin 31q of the driving rack 31. At the time, the sub rack 35 is held at its forward position with the rear end pin 35p engaging with the second engaging portion 33b of the change lever 33.

As the driving rack 31 is slid backward by a given distance, the engagement between the first engaging portion 33a of the change lever 33 and the second pin 31q of the driving rack 31 is canceled. Accordingly, the change lever 33 remaining urged by the spring 34 causes the sub rack 35 to move backward.

As the result, the startup of (the main tray 61 of) the tray can be determined by the sliding movement of the driving rack 31 together with the change lever 33, the sub rack 35 and the lock lever 36.

Furthermore, as shown in FIG. 8, the drive base 11 includes a left guide piece 27 for guiding the sliding movement of the sub rack 35 while supporting its front end and a right guide piece 28 for guiding the sliding movement of the driving rack 31 while supporting its front end, both located at the left and right of the front end of the drive base 11 respectively. The two, left and right, guide pieces 27 and 28 also act as a part of guiding mechanism for forward and backward sliding movement of the tray unit 60.

Figure 14:
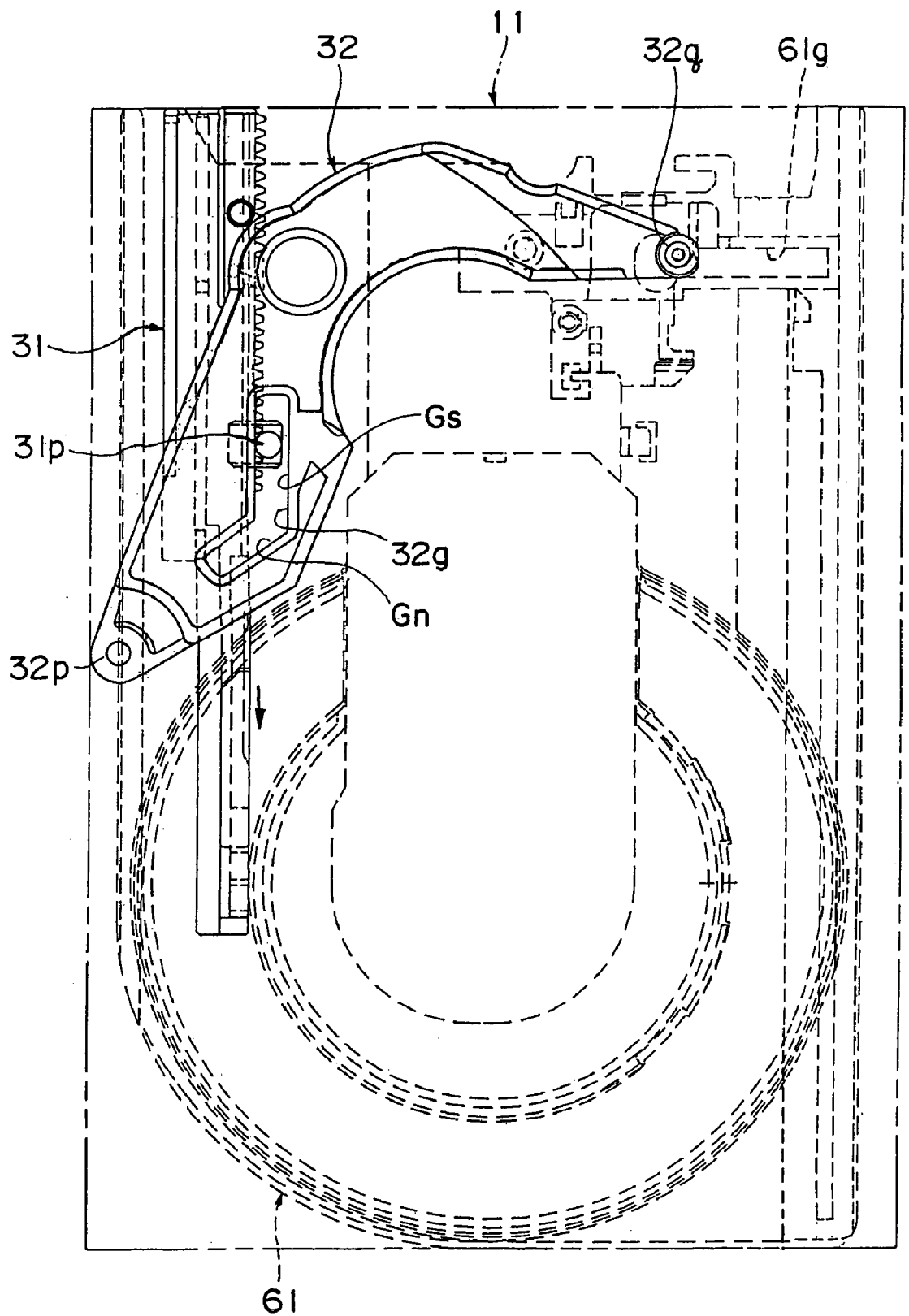
FIG. 14 is an explanatory plan view of a driving arm and a driving rack with the tray retracted.
Figure 15:
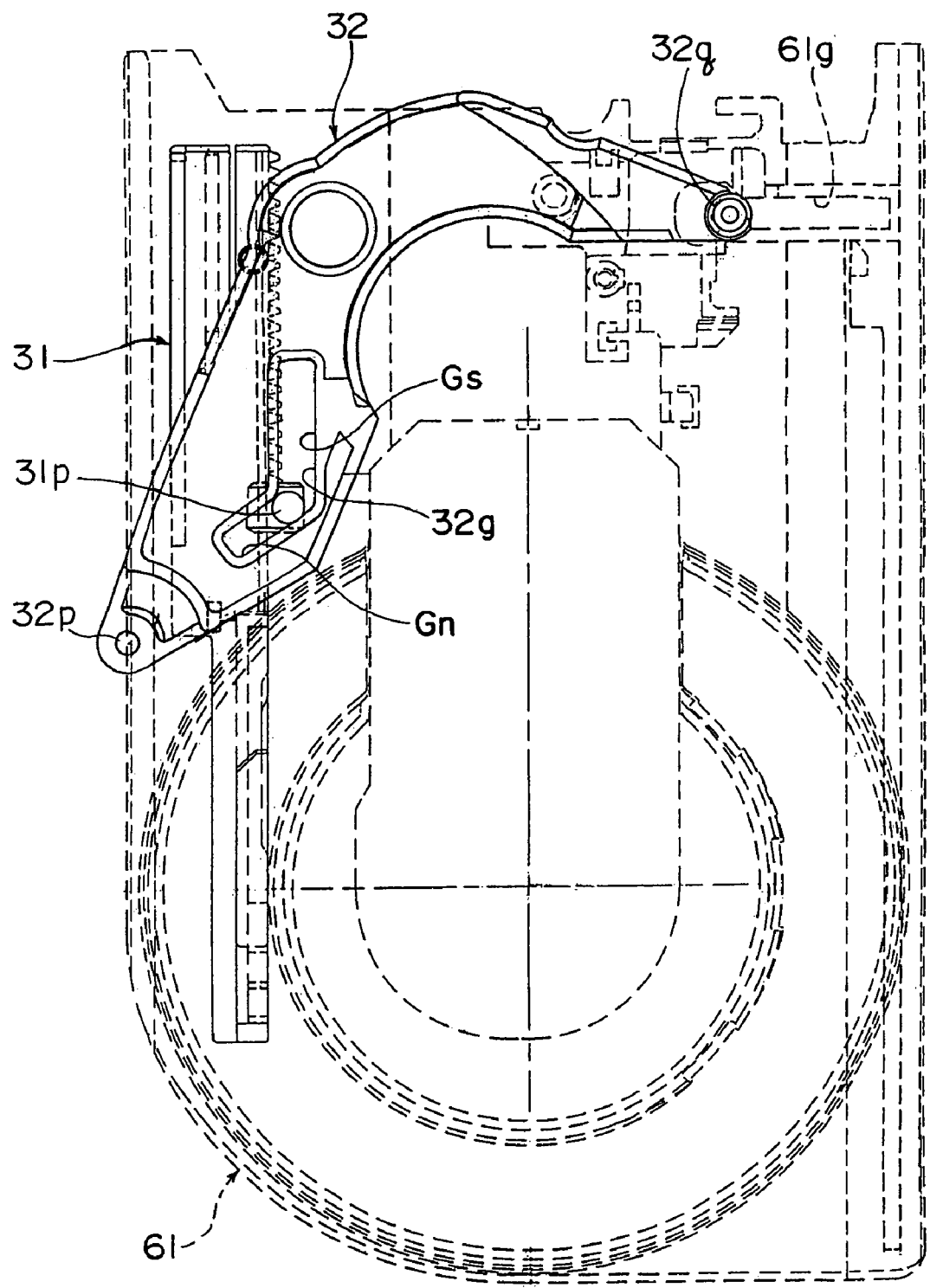
FIG. 15 is an explanatory plan view of the driving arm and the driving rack with the tray stood by just before the forward movement.
Figure 16:
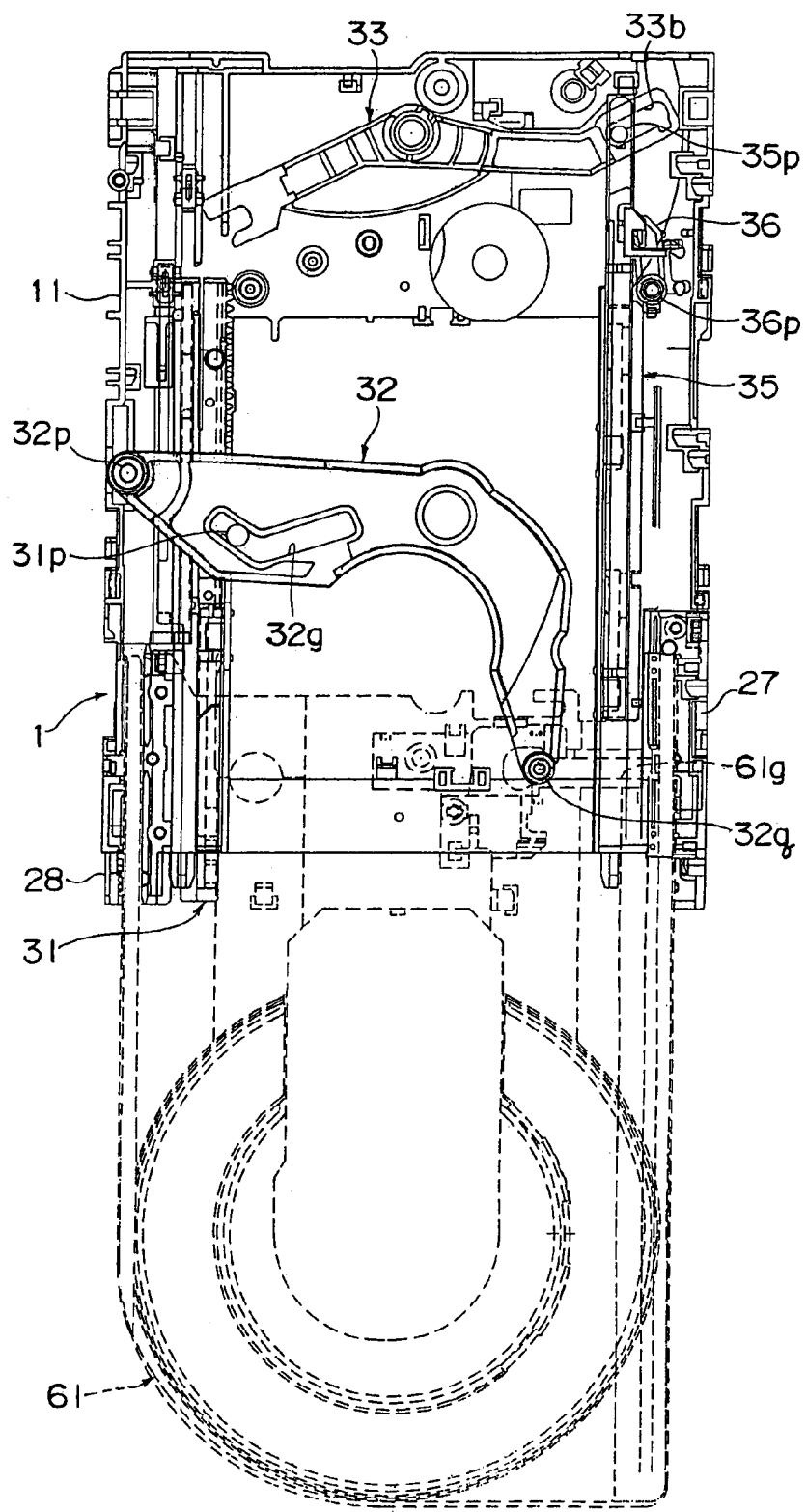
FIG. 16 is an explanatory plan view of the driving arm and the driving rack with the tray drawn out.

FIGS. 14, 15 and 16 are explanatory plan views showing the driving arm and the driving rack. FIG. 14 is for tray retracted state, FIG. 15 is for tray stand by state just before the forward movement and FIG. 16 is for tray drawn out state respectively. It is to be noted that the sub tray 71 is omitted in order to simplify the drawings in FIGS. 14-16.

As shown in FIG. 14, when the driving motor 21 is energized for rotation in one direction with the driving rack 31 remaining respectively at the backward position and the tray 61 remaining at a (first) position corresponding to the location of the turn table 45 in the disk drive 1, its driving force is transmitted to the driving rack 31, and the driving rack 31 is driven to slide forward. Meanwhile, the guide slot 32g of the driving arm 32 remaining engaged with the first pin 31p of the driving rack 31 consists of a frontwardly and rearwardly extending linear region Gs extending frontward and rearward direction and an oblique portion Gn extending obliquely from the front end of the linear region Gs to the outward front end. While the first pin 31p stays in the linear region Gs of the guide recess 32g, driving force is not transmitted to the driving arm 32 even when the driving rack 31 moves forward. That is, the driving arm 32 can never be urged and turned in any direction by the driving force regardless of the sliding movement of the driving rack 31.

When the first pin 31p of the driving rack 31 departs from the linear region Gs and reaches the oblique region Gn of the guide slot 32g as shown in FIG. 15, the driving arm 32 starts to turn about the pivot 32p by the forward movement of the driving rack 31. As the driving pin 32q at the other end of the driving arm 32 remains engaged with a long slot 61g of the main tray 61, the pivotal movement of the driving arm 32 transfer the driving force via the driving pin 32q to the main tray 61. This allows the main tray 61 (or the tray unit 60 including the main tray 61 and the sub tray 71) to start sliding forward.

That is, while the first pin 31p of the driving rack 31 stays in the frontwardly and rearwardly extending linear region Gs of the guide recess 32g in the driving arm 32, driving force is not transmitted to the driving arm 32 even when the driving rack 31 slides. In other words, the driving arm 32 is inhibited to turn in that condition. The frontwardly and rearwardly extending linear region Gs of the guide recess 32g formed in the driving arm 32 acts as a drive inhibiting mechanism for inhibiting a motion of the first disk support member (main tray 61) caused by the driving arm 32 in accordance with the sliding position of the sliding member (driving rack 31).

When the driving rack 31 further travels forward, as shown in FIG. 16, the pivotal movement of the driving arm 32 is increased hence accelerating the forward sliding movement of the tray 61 until it is fully drawn out from the drive unit 1. As the result, the tray 61 is advanced to the (second) position where the disk can be loaded and unload at the outside of the disk drive 1.

When the electric motor 21 is rotated in a reverse direction, the driving rack 31 travels backward and the tray 61 is retracted into the disk drive 1 until it arrives at the first position over the turn table 45.

By the foregoing manner, the tray 61 can be moved forward and backward between its first and second positions.

As described, the main tray 61 (or the tray unit 60 including the main tray 61 and the sub tray 71) is operated by the driving rack 31 and the driving arm 32 provided in the disk drive 1 and mounted on the drive base 11. Therefore, it is not necessary to provide driving racks nor driving gears etc. on the back side of the tray 61. Of course, no lubricant or grease will be needed for those. Accordingly, the back face of the tray 61 can remain free and flat. When the disk drive 1 is placed in the vertical position with the tray 61 exposed at the back face, there is no possibility to soil hands or close of the user, also, its appearance can remain favorable as compared with any conventional disk drive.

It is essential for avoiding any undesired collision between the turn table 45 and the tray unit 60 during the tray forward and backward movement to hold the traverse unit 40 as a parts unit provided with the turn table at its downward position. The downward movement of the traverse unit 40 is carried out while the driving arm 32 remains inactivated. It is carried out while the first pin 31$p$ of the driving rack 31 stays moving in the frontwardly and rearwardly extending linear region Gs of the guide slot 32$g$ in the driving arm 32.

Figure 17:
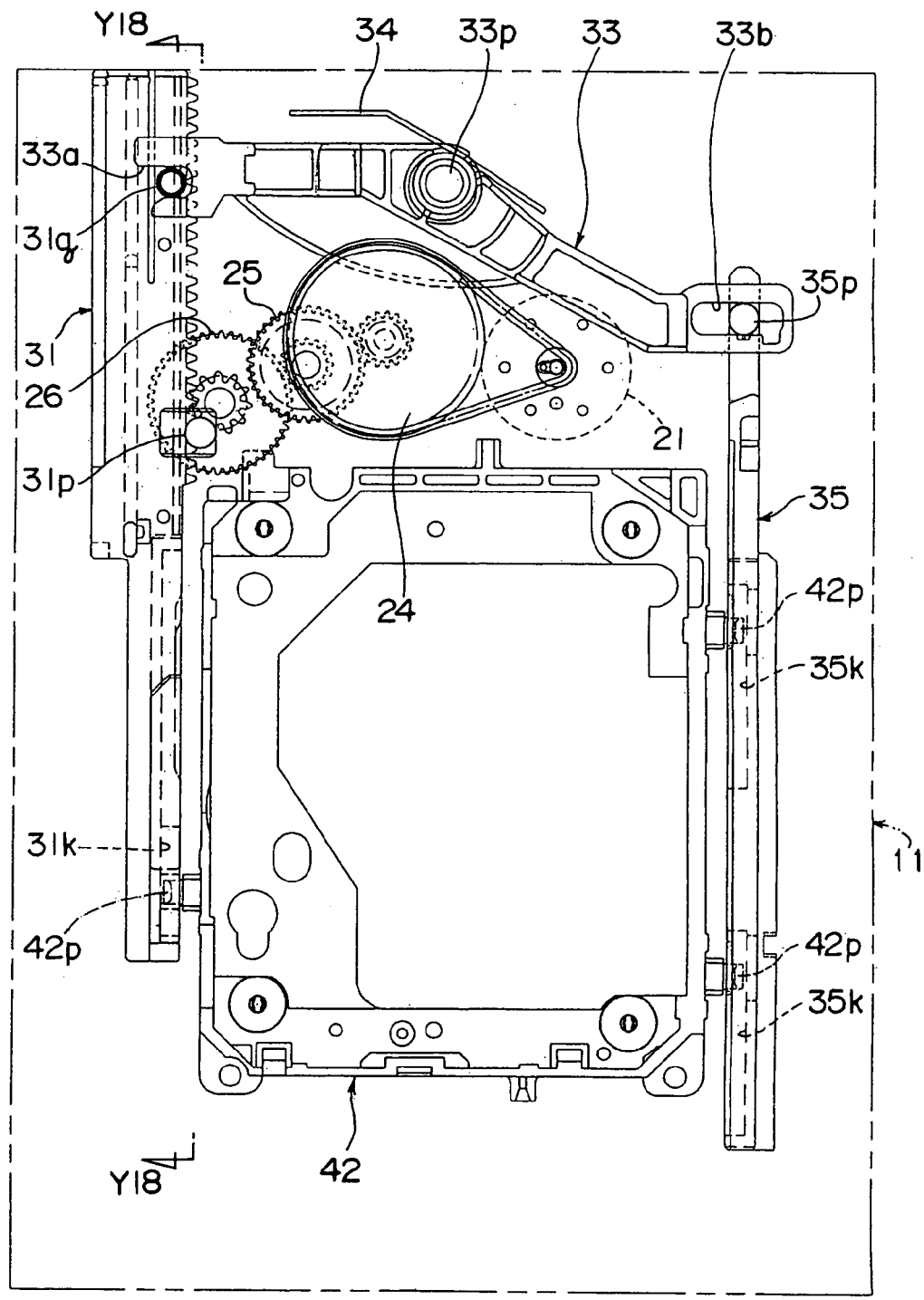
FIG. 17 is an explanatory plan view of the driving arm, a sub rack, and an intermediate frame with the tray retracted.
Figure 18:
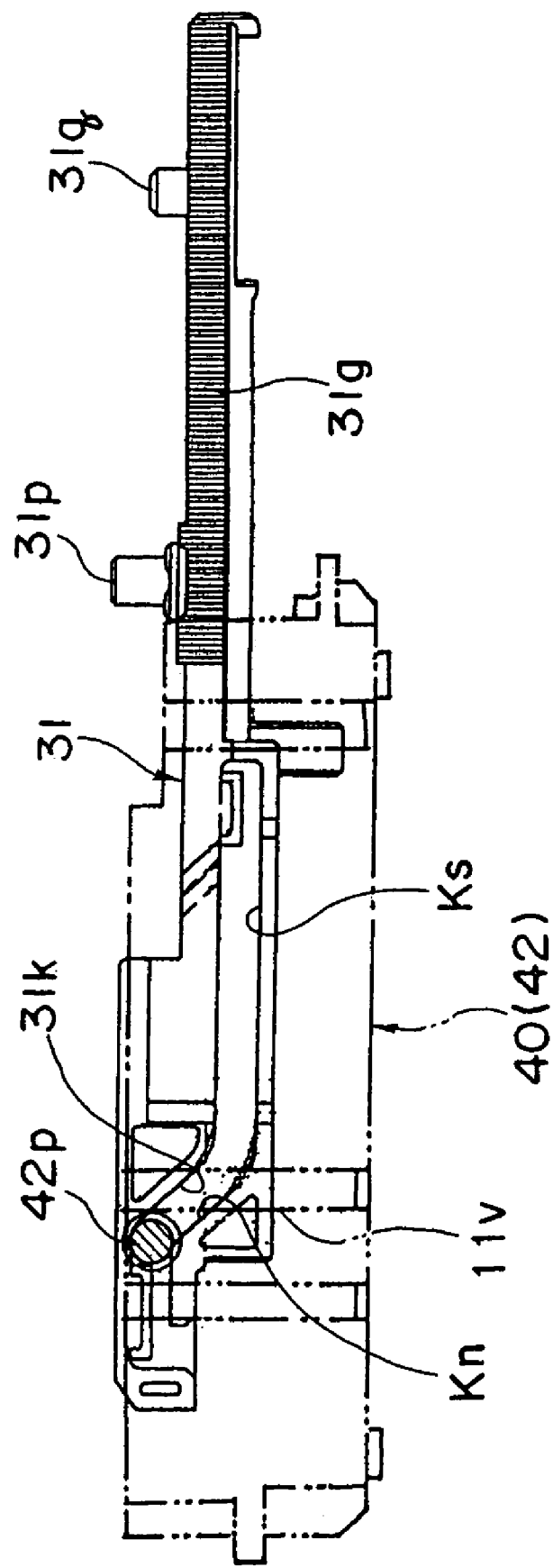
FIG. 18 is an explanatory view seen along the arrows Y18-Y18 in FIG. 17.

FIG. 17 is an explanatory plan view of the driving arm, the sub rack, and the intermediate frame with the tray retracted. And, FIG. 18 is a cross sectional view taken along the line Y18-Y18 of FIG. 17. Furthermore, FIG. 19 is an explanatory plan view of the driving rack, the sub rack, and the intermediate frame with the tray starting the forwarding action and FIG. 20 is a cross sectional view taken along the line Y20-Y20 of FIG. 19.

Figure 19:
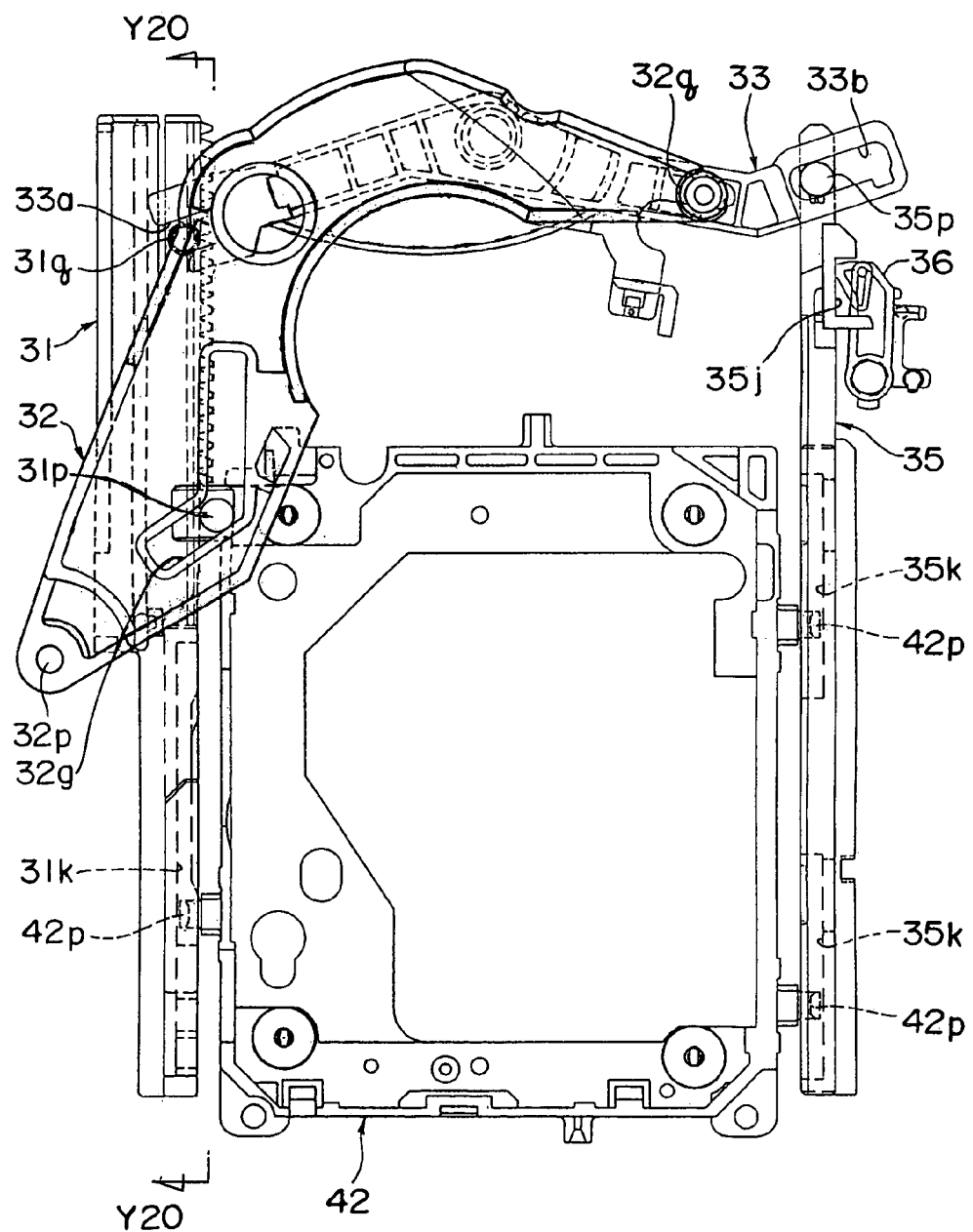
FIG. 19 is an explanatory plan view of the driving rack, the sub rack, and the intermediate frame with the tray starting the forwarding action.
Figure 20:
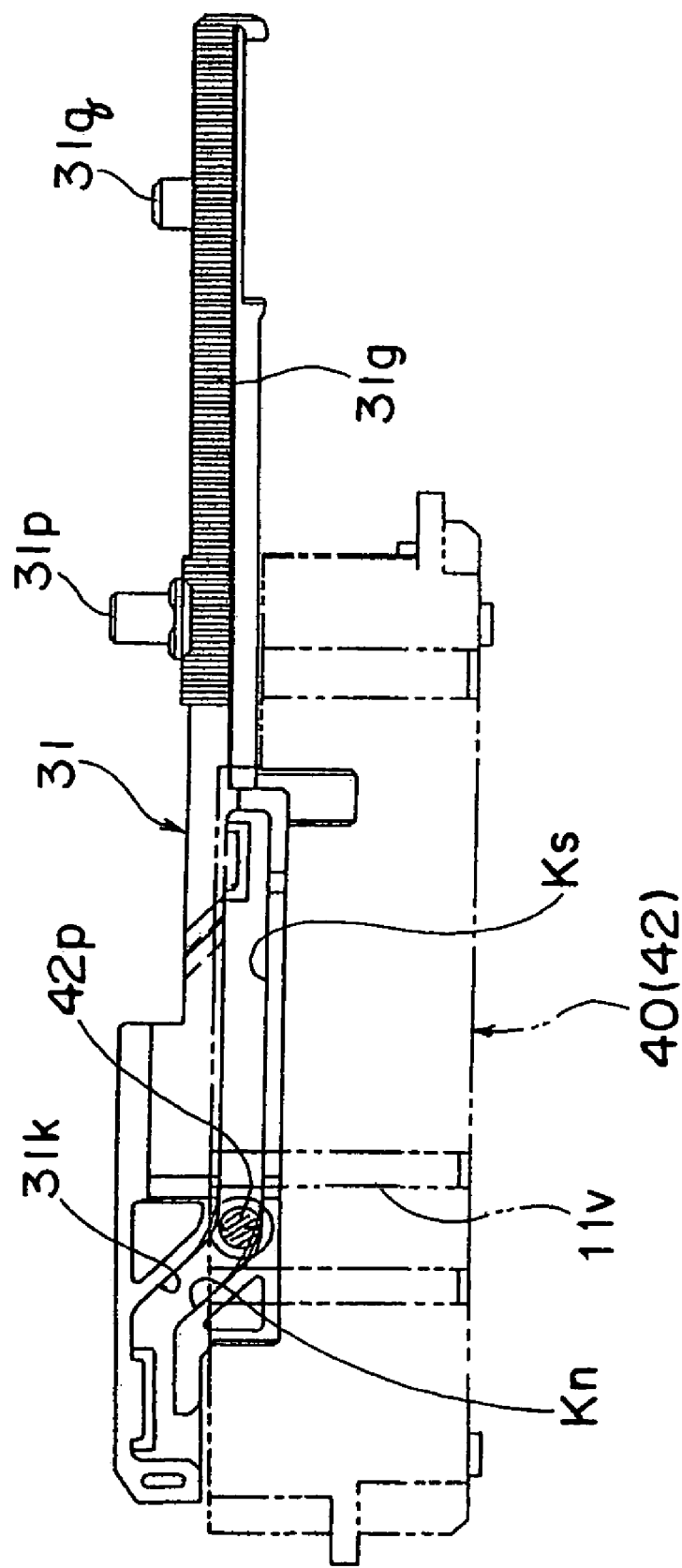
FIG. 20 is an explanatory view seen along the arrows Y20-Y20 in FIG. 19.

As shown in FIGS. 17 and 19, the pins 42$p$ projecting from both, left and right, sides of the intermediate frame 42 of the traverse unit 40 (that is, supporting pins provided on each side portion of the parts unit 40) are engaged with corresponding vertical slots 11$v$ (See FIG. 8) provided in the vertical walls of the drive base 11 so that they can slide upward and downward. In addition, the distal ends of the pins 42$p$ are inserted into two groups of corresponding guide slots 31$k$ and 35$k$ provided on the inside surfaces of the driving rack 31 and the sub rack 35 respectively for engagement.

More particularly as shown in FIGS. 18 and 19, the guide slot 31$k$ in the driving rack 31, for example, has a relatively long linear shape (a frontwardly and rearwardly extending linear region Ks) at the rear and an upwardly oblique linear or curved shape (an oblique region Kn) at the front.

When the tray unit 60 is at the first position in the disk drive 1 (See FIGS. 17 and 18), one of the pins 42$p$ of the intermediate frame 42 remain in the upwardly oblique region Kn of the guide slot 31$k$ and hence the traverse unit 40 stays at the upward position. This defines the recording/reproducing position of the turn table 45.

As the driving rack 31 is slid forward, the pin 42$p$ moves downward along the guide slot 31$k$ thus lowering the traverse unit 40 (See FIGS. 19 and 20). At the downward position, the tray unit 60 is contemplated not to interrupt the turn table 45 during its sliding movement.

The second pin 31$q$ of the driving rack 31 is engaged with the first engaging portion 33$a$ of the change lever 33. Accordingly, the change lever 33 is turned in a counter-clockwise direction as the driving rack 31 moved forwards. Since the second engaging portion 33$b$ at the other end of the change lever 33 is engaged with the rear end pin 35$p$ of the sub rack 35, the sub rack 35 is slid backward as the change lever 33 turns in the counter-clockwise direction as described above.

The guide slot 35$k$ of the sub rack 35 has a relatively long linear shape at the front and an upwardly oblique linear or curved shape at the rear which are opposite to the two regions of the guide slot 31$k$ of the driving rack 31 as is not illustrated.

Accordingly, when the tray unit 60 is at the first position in the disk drive 1, the pins 42$p$ of the intermediate frame 42 stay in the upward oblique regions of the corresponding guide slots 35$k$ and the traverse unit 40 is hence held at the upward position. As the sub rack 35 is slid backward, the pins 42$p$ move downward along their corresponding guide slots 35$k$ thus lowering the traverse unit 40.

As described, the driving rack 31 and the sub rack 35 are disposed respectively so that they oppose to side faces of the traverse unit 40 which are parallel to each other. Each supporting pin 42$p$ provided on the side face of the traverse unit 40 is engaged with the guide slot 31$k$ of the driving rack 31 or the guide slot 35$k$ of the sub rack 35, and the slide movement of the traverse unit 40 is guided. Thereby, it is possible for the traverse unit 40 to conduct stable lifting upward and downward motion reliably.

Further, as described, the sliding movement of the driving rack 31 allows both of the right and left pins 42$p$ of the intermediate frame 42 to travel almost at once between the upward position and the downward position, hence changing upward and downward position of the traverse unit 40. For lifting upward the traverse unit 40 located at downward position, the electric motor 21 should be rotated in the other direction to move the driving rack 31 in a reverse of the above-mentioned forward direction (in the backward direction).

Pins 42$p$ protruded respectively from the side face of the intermediate frame 42 of the traverse unit 40 and guide slots 31$k$, 35$k$ provided in the driving rack 32, the sub rack 35 respectively act as a lifting upward and downward mechanism for lifting the parts unit (traverse unit 40) upward and downward in associated with the slide movement of the slide member (driving rack 31).

As explained above, the disk drive 1 is provided with the lifting upward and downward mechanism for lifting the parts unit (traverse unit 40) upward and downward in associated with the slide movement of the slide member (driving rack 31). Also, it has the drive inhibiting mechanism for inhibiting a motion of the main tray 61 caused by the driving arm 32 in accordance with the sliding position of the driving rack 31. During the tray unit 60 located at the first position that corresponds the location of the turn table 45, until the driving rack 31 reaches to a predetermined position, the motion of the main tray 61 is inhibited by the drive inhibiting mechanism, and the traverse unit 40 is lowered (accordingly, the turn table is lowered at the same time) by the lifting upward and downward mechanism. When the driving rack 31 reaches to the predetermined position, the inhibition by the drive inhibiting mechanism is released, and the main tray 61 can be driven by the driving arm 32. Therefore, the tray unit 60 is never driven until the turn table 45 reaches the lower position, and the interruption between the turn table 45 and the tray unit 60 can be avoided reliably.

For drawing out the tray unit 60 or moving the driving rack 31 in the forward direction, that is, for moving the driving rack 31 forwardly, the end of lowering the traverse unit 40 is set substantially equal in timing to or slightly earlier than the start of turning the driving arm 32.

As described, the lifting up and down of the traverse unit 40 (that is, the lifting up and down of the turn table 45) and the sliding movement of the tray unit 60 can be conducted as a series of motion by simply controlling the sliding movement of the driving rack 31. Therefore, it is possible to allow those motions to occur smoothly in series by means of a relatively simple constitution.

Figure 10:
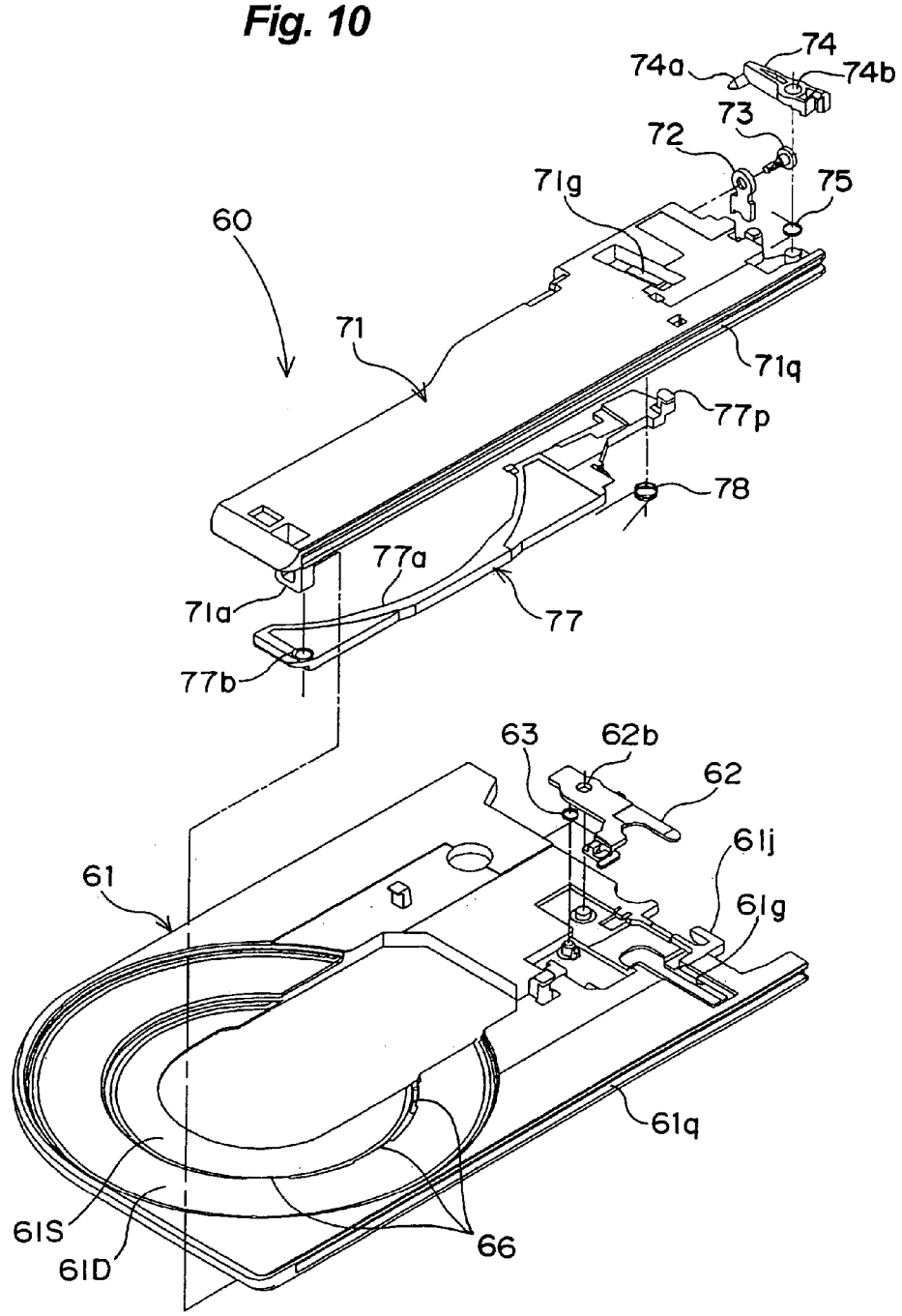
FIG. 10 is an enlarged, exploded perspective view of a tray unit provided in the disk drive.

The construction of the tray unit 60 will be explained. The tray unit 60 includes, as best shown in FIGS. 3 and 10, the main tray 61 acting as a first disk support member for supporting one side of the disk 3 and the sub tray 71 provided separately from the main tray 61. The sub tray is to act as a second disk support member for supporting the other side of the disk 3. When the disk drive 1 is placed in the vertical position as shown in FIG. 3, the main tray 61 and the sub tray 71 arranged substantially in parallel to each other form a pocket 70 in which the disk 3 is loaded partially (at a lower half).

The primary components of the tray unit 60 including the main tray 61, the sub tray 71, and a disk guide 77 described later are preferably made of a plastic material such as synthetic resin.

If, at least either one of the main tray 61 and the sub tray 71 (preferably, both of them, more preferably, all of the primary components of the tray unit 60 including the disk guide 77) is made of a substantially transparent plastic material, the appearance of the tray unit 60 is remarkably improved, and it looks so nice. As explained above, it is not necessary to provide any components for driving such as driving racks nor driving gears etc. on the main tray 61 (especially, on the back side thereof). Accordingly, when at least a part of disk supporting surface of the main tray 61 is made of a substantially transparent plastic material, it is possible for users to confirm visually whether a disk 3 or a disk 5 is held in it or not, even from back side of the main tray 61. Thereby, it is possible to provide users with a disk transfer device which is very easy to use and very convenient. It is to be noted that, for example, acrylic resign can be used as the substantially transparent plastic material.

As best shown in FIG. 10, the main tray 61 has a large diameter support region 61D thereof for supporting a large size disk (of 12 cm in the diameter) and a small diameter support region 61S thereof for supporting a small size disk (of 8 cm in the diameter). The small diameter support region 61S is stepped down by a predetermined distance from the large diameter support region 61D thus to come closer to the turn table 45.

Further, as shown well in FIG. 10, the large diameter support region 61D is configured to support the most outward annular portion of a large size disk 3 except a center hole 3h and its adjacent portion. The small diameter support region 61S is also configured to support the most outward annular portion of a small size disk.

The small diameter support region 61S of the main tray 61 also has claws 66 thereof provided for holding the peripheral edge of the lower side of a small size disk. They are capable of engaging with the peripheral edge of the lower side of a small size disk even when the disk drive 1 is in an inclined condition of which the angle of inclination is over a predetermined value from the horizontal direction. The claws 66 are preferably provided two or more (three in this embodiment) at the lower half of the tray in the disk drive 1 when is placed in the vertical position. Alternatively, the single claw 66 may be provided at the lowermost of the tray if its size is appropriate. The function of the claws 66 will be explained later in more detail.

The tray unit 60 is provided with a disk guide 77 and a urging spring 78 as an urging mechanism capable of urging against the main tray 61 the disk 3 (of a large diameter) held between the main tray 61 and the sub tray 71. The disk guide 77 is to be disposed between the main tray 61 and the sub tray 71 and has an arc shape contact portion 77a capable of contacting directly a part of the edge of the disk 3.

In particular, the disk guide 77 is mounted to the sub tray 71 for pivotal movement about a pivot 77b provided at the front end thereof. More specifically, the disk guide 77 is capable of pivoting in a plane parallel to the sub tray 71 (that is, parallel to the disk 3). The disk guide 77 is always urged by the urging spring 78 towards a direction to pivot toward the center of the main tray 61.

Figure 21:
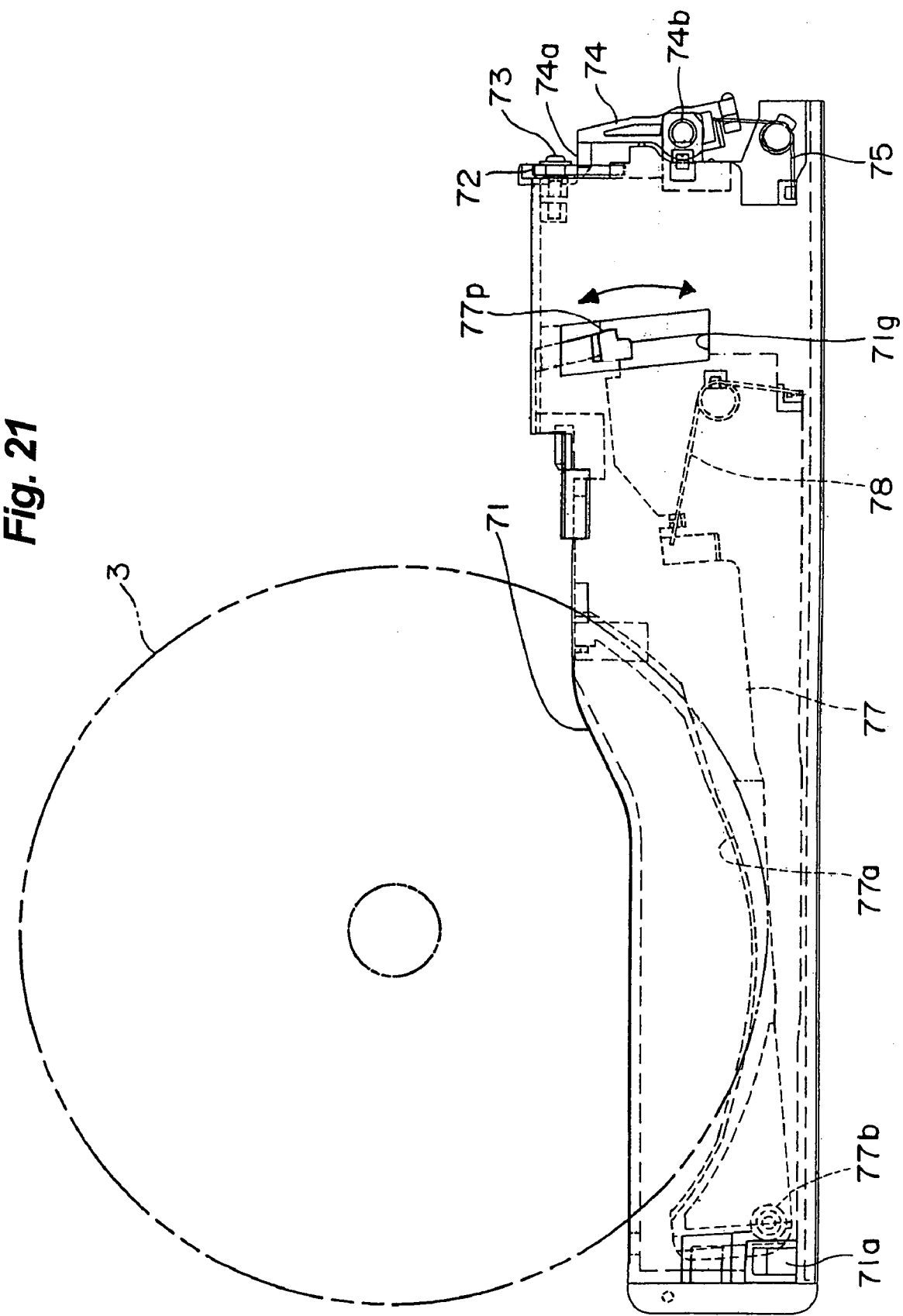
FIG. 21 is an explanatory side view of a disk guide and a sub tray in the tray unit.
Figure 22:
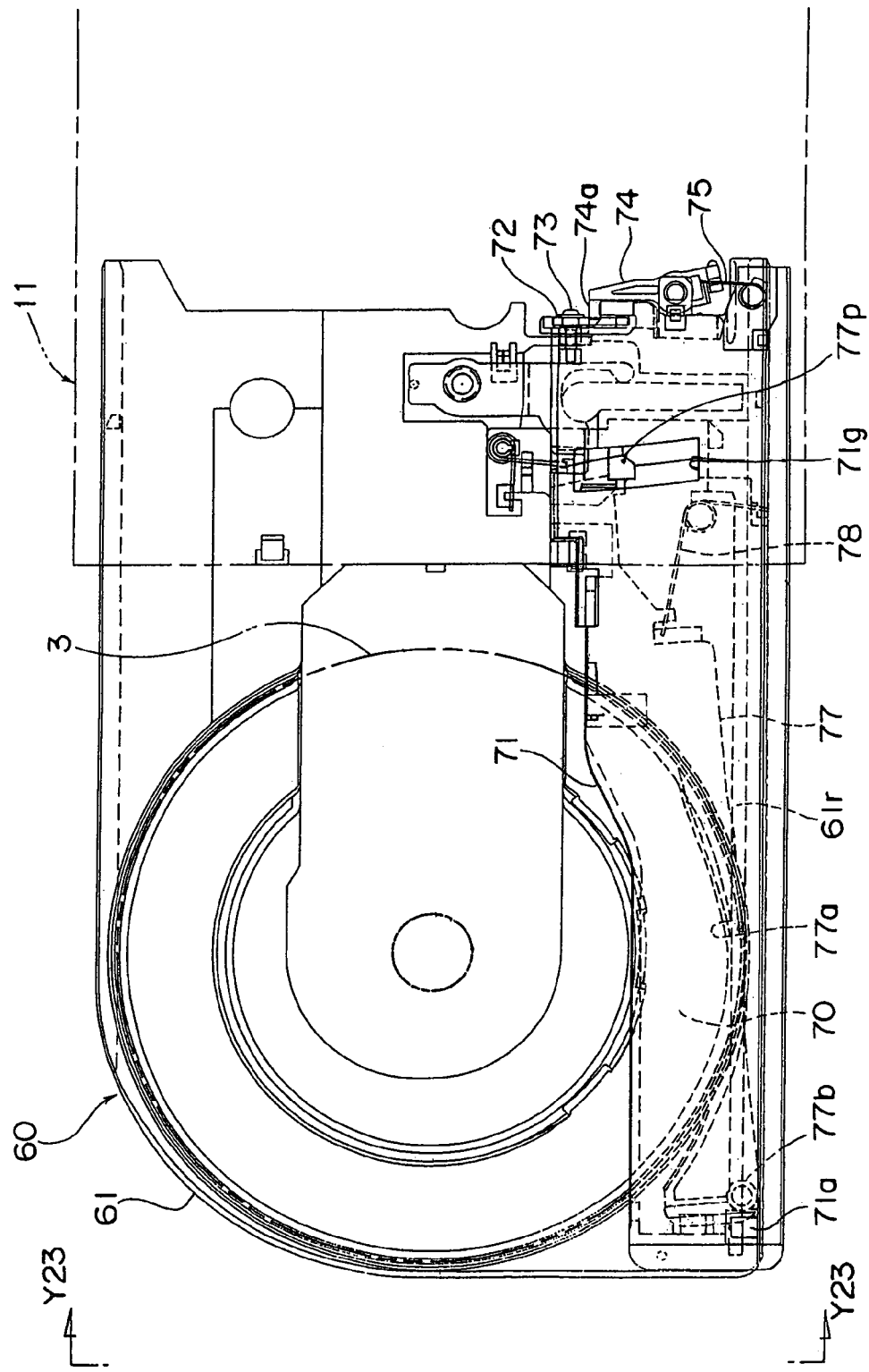
FIG. 22 is an explanatory side view of the tray unit drawn out from the disk drive placed in the vertical position.

FIG. 21 is an explanatory side view of the disk guide 77 and the sub tray 71 in the tray unit 60, and FIG. 22 is an explanatory side view of the tray unit 60 drawn out from the disk drive 1 placed in the vertical position. Further, FIG. 23 is an explanatory front view, seen from the arrows Y23-Y23 direction in FIG. 22, of the tray unit 60 drawn out from the disk drive 1 placed in the vertical position.

As shown in these drawings, the disk 3 is partially received (the lower part thereof is received) in the pocket 70 between the main tray 61 and the sub tray 71 and then urged upwardly while held directly by the contact portion 77a of the disk guide 77. As shown more specifically in FIGS. 21 and 22, this allows the disk 3 to be held stable in the pocket 70 as sandwiched between the upper step of the large diameter support region 61D of the main tray 61 and the contact portion 77a of the disk guide 77.

Figure 23:
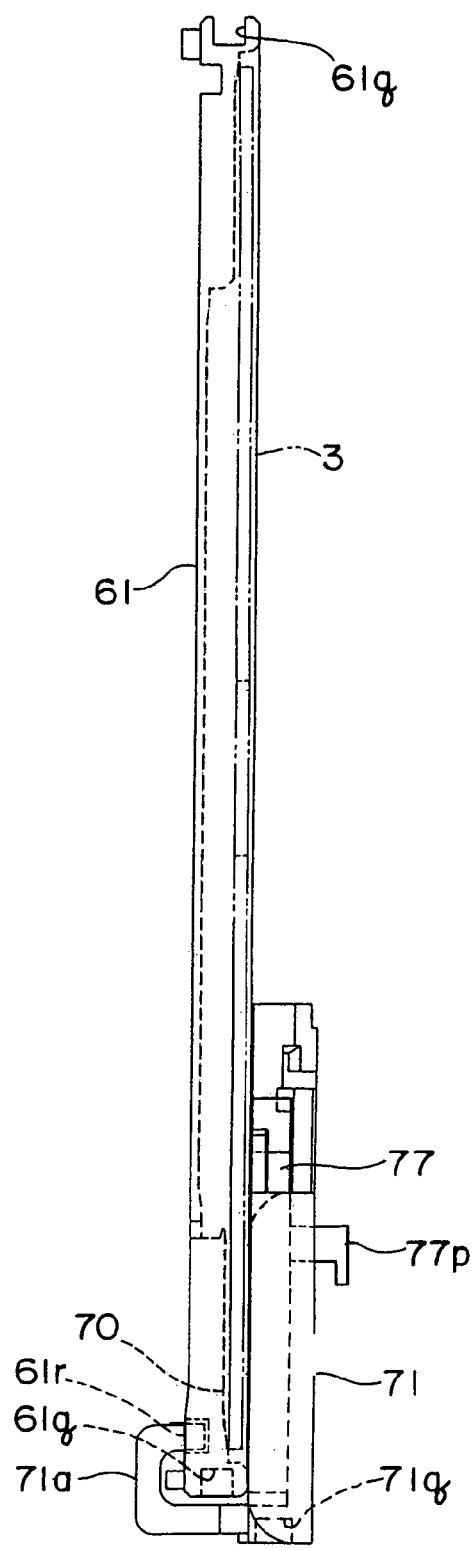
FIG. 23 is an explanatory view seen along the arrows Y23-Y23 in FIG. 22, showing the front side of the tray unit drawn out from the disk drive placed in the vertical position.

As best shown in FIG. 23, the sub tray 71 has an engaging portion (hook) 71a provided at the end thereof for engagement with the edge of the main tray 61. While the main tray 61 has a guide groove 61r (sub tray guide groove) provided in a close to the edge thereof which extends along the direction of sliding movement (frontwardly and rearwardly of the disk drive 1). With its engaging portion 71a received by the guide groove 61r, the sub tray 71 can remain engaged with and slide forward and backward in relation to the main tray 61.

The tray unit 60 in this embodiment allows the disk 3 to be supported by the main tray 61 and the sub tray 71 and to be transferred while held between the main tray 61 and the sub tray 71. Accordingly with the disk drive 1 placed in the vertical position, the disk 3 can be loaded and unloaded on the two disk trays 61 and 71 with relatively ease and transferred with stability.

More particularly, the main tray 61 and the sub tray 71 form a pocket 70. A part of the disk 3 is received and supported in the pocket 70 defined between the main tray 61 and the sub tray 71. And, the disk can be transferred in this supported state. Accordingly, even when the disk drive 1 is placed in the vertical position, the disk 3 can easily be loaded and unloaded on the two disk trays 61 and 71 and transferred with much stability.

Since the sub tray 71 is provided separately of the main tray 61, the disk 3 can thus be supported by simply the main tray 61 with no use of the sub tray 71. Accordingly with the disk drive 1 placed in the horizontal position, the disk 3 can be loaded and unloaded from above onto the main tray 61 without difficulty.

In particular, the tray unit 60 is provided with the urging mechanism formed by the disk guide 77 and the a urging spring 78, thereby, the disk 3 held between the main tray 61 and the sub tray 71 can remain pressed against the main tray 61. This allows the disk 3 to be held with higher stability and transferred with no wobbly movements even when it is in the vertical position. Accordingly, it is possible to determine the distance between the main tray 61 and the sub tray 71 to relatively large. And, as there is spaced by a relative large distance between the main tray 61 and the sub tray 71, the disk 3 can be loaded and unloaded at the distance (the pocket 70) between the two trays 61 and 71 with much smoothness and thus protected from accidental injury. As the result, the handling of the disk 3 will be facilitated.

In addition, the disk guide 77 has the contact portion 77a for contacting directly a particular portion of the peripheral edge of the disk 3 held between the main tray 61 and the sub tray 71. The disk guide 77 is able to turn in a plane parallel to the disk 3, and remains urged against the main tray 61 by the a urging spring 78. Accordingly, the disk 3 when pressed and retained against the main tray 61 will be protected from any injury on its (surface for information signal recording) disk side.

The disk guide 77 also has a projection 77p protruding toward the sub tray 71. When the disk guide 77 is assembled to the sub tray 71, the projection 77p is accepted by a corresponding elongated slot 71g provided in the sub tray 71. The elongated slot 71g is so shaped as to follow along a turning locus of the projection 77p when the disk guide 77 turns about its turning support 77b.

Figure 24:
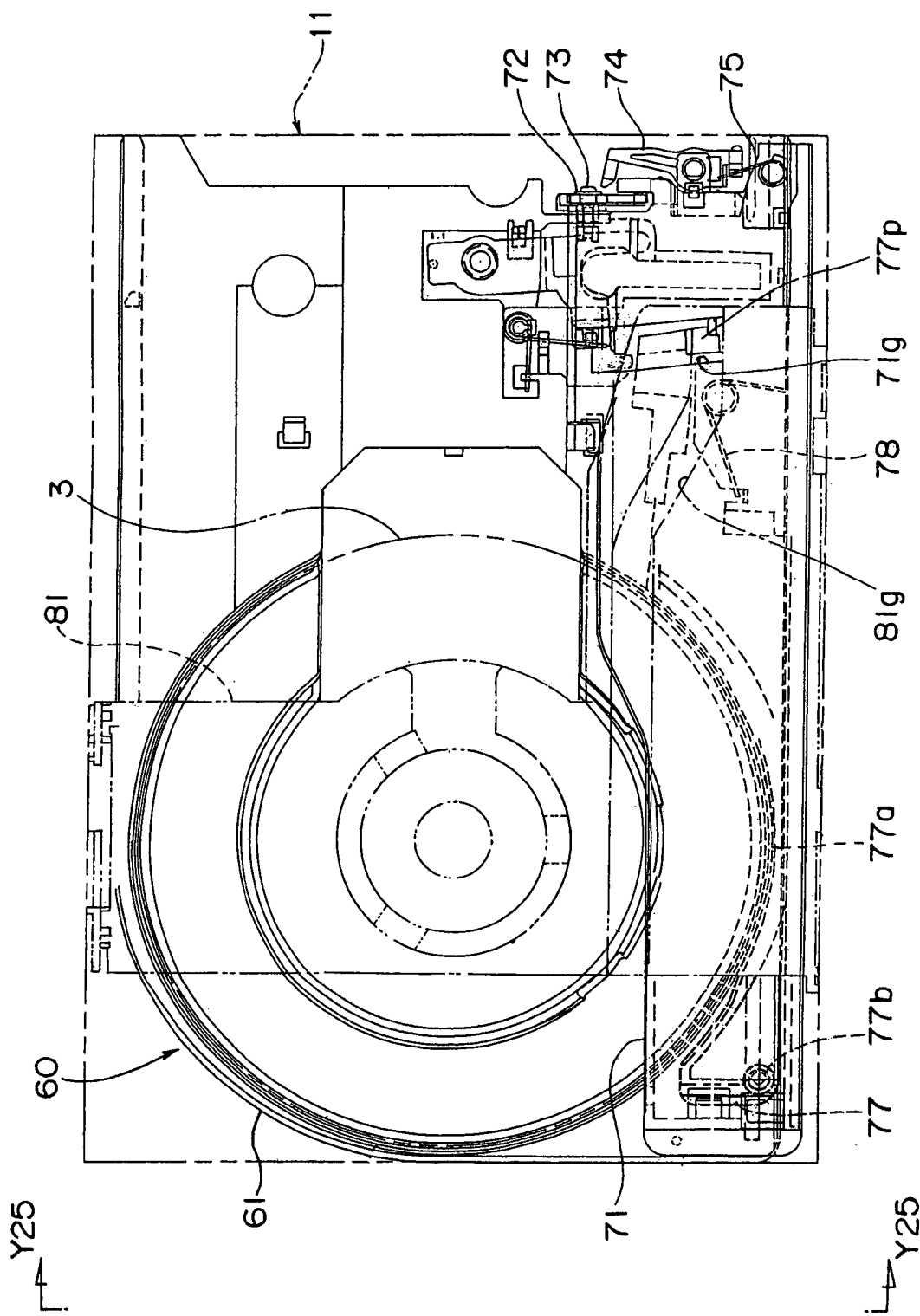
FIG. 24 is an explanatory side view of the tray unit retracted into the disk drive placed in the vertical position.

FIG. 24 is an explanatory side view of the tray unit 60 retracted into the disk drive 1 placed in the vertical position. And, FIG. 25 is an explanatory side view of the tray unit 60, seen along the arrows Y25-Y25 in FIG. 24, retracted into the disk drive 1 placed in the vertical position.

As shown in these drawings, the sub tray 71 remains covered with a clamp board 81 when the tray unit 60 is retracted and disposed at a position (the first position) corresponding to the position at which the turn table 45 is disposed in the disk drive 1. The clamp board 81 has a guide groove 81g provided on the back side thereof for engagement with the projection 77p of the disk guide 77. The guide recess 81g extends substantially straight in forward and rearward direction from the front end to a midway, and then extends in inclined direction outwardly to the rear end.

The straight region of the guide groove 81g is so configured as to stay substantially equal in the location to the projection 77p, in the assembled state of the disk drive 1, when the disk guide 77 is urged to pivot toward the center of the main tray 61 by the a urging spring 78 (See FIG. 22).

Figure 25:
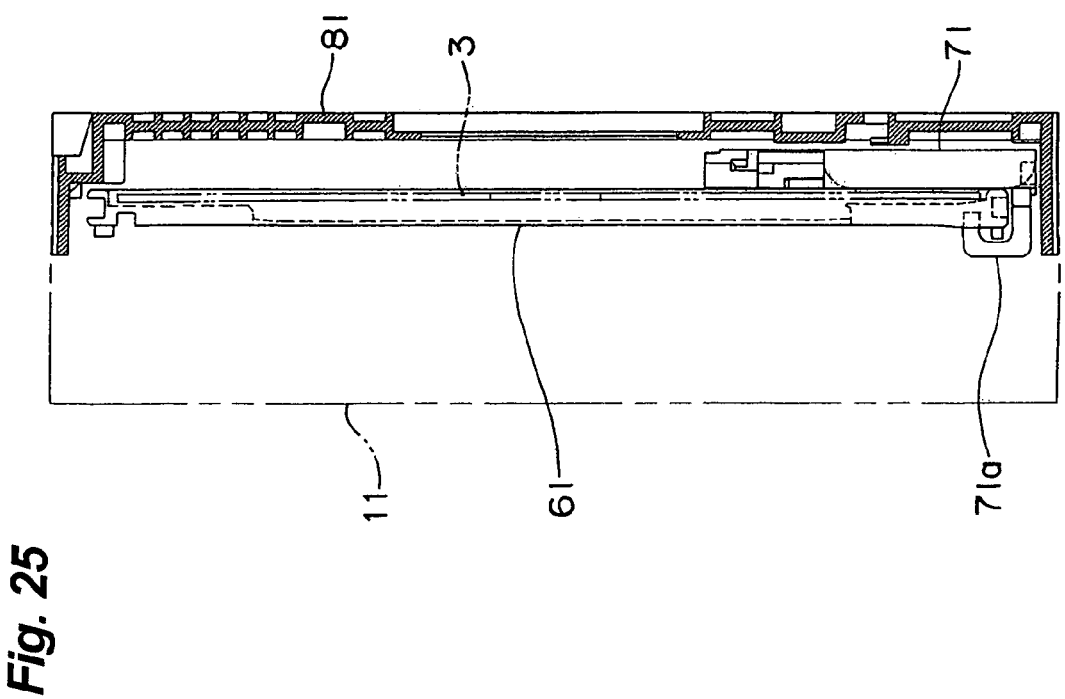
FIG. 25 is an explanatory view seen along the arrows Y25-Y25 in FIG. 24, showing the front side of the tray unit retracted into the disk drive placed in the vertical position.

Therefore, when the tray unit 60 drawn out from the disk drive 1 placed in the vertical position as shown in FIG. 22 for example, is retracted from its outside position towards the first position (retracted position) as shown in FIGS. 24 and 25, the projection 77p of the disk guide 77 travels straight without changing the position of the disk guide 77 remaining urged by the a urging spring 78 as is guided by the straight region of the guide groove 81g. As the tray unit 60 is moved further inwardly, the projection 77p travels outwardly as is guided by the inclined region of the guide groove 81g.

That is, the projection 77p moves outwardly along the elongated slot 71g of the sub tray 71. As its projection 77p is shifted outwardly, the disk guide 77 turns downward about the pivot 77b as resisting against the urging force of the a urging spring 78 as shown in FIGS. 21, 22, and 24. Thus, the turning position of the disk guide 77 is changed. As the result, the pressing of the disk 3 against the main tray 61 is canceled thus releasing the disk 3.

As the disk 3 is freed from being pressed against the main tray 61 at the first position corresponding to the turn table 45 in the disk drive 1. Therefore, at the first position, the disk 3 is never retained between the main tray 61 and the disk guide 77. Accordingly, there is no fear of trouble caused by an interruption with the main tray 61 and the disk guide 77 when the disk is loaded onto the turn table 45.

More specifically, the pressing state of the disk 3 against the main tray 61 and the released state thereof can be reliably switched to each other by a relatively simple constitution of an engagement between the projection 77p provided on the disk guide 77 and the guide groove 81g provided in the clamp board 81.

The main tray 61 in the tray unit 60 has the elongated slot 61g for engagement with the driving pin 32q of the driving arm 32 as best shown in FIG. 10. Also, a tray slider 62 is provided on the rear end of the main tray 61 for pivotal movement about a pivot 62b and remains urged by a spring 63. The tray slider 62 is located adjacent to the elongated slot 61g and functions to offset a positional error of (especially of the driving pin 32q) the driving arm 32 in the assembled state of the disk drive 1.

Also, as shown in FIG. 10, a sensor lever 72 is mounted to the rear end of the sub tray 71 by a retaining screw 73. The sensor lever 72 is made of preferably a metal plate. A lock lever 74 (vertical lock lever) is mounted to the sub tray 71 for pivotal movement about a pivot 74b to lock the sensor lever 72. The vertical lock lever 74 remains urged by an urging spring 75.

Further, as shown in FIG. 8, a lock lever 38 (horizontal lock lever) is mounted to the rear end of the drive base 11. The horizontal lock lever is capable of pivotal movement about a pivot 39p and locking the sensor lever 72. The horizontal lock lever 38 remains urged by a spring 39. The action of the sensor lever 72, the vertical lock lever 74, and the horizontal lock lever 38 will be explained later in more detail.

Figure 26:
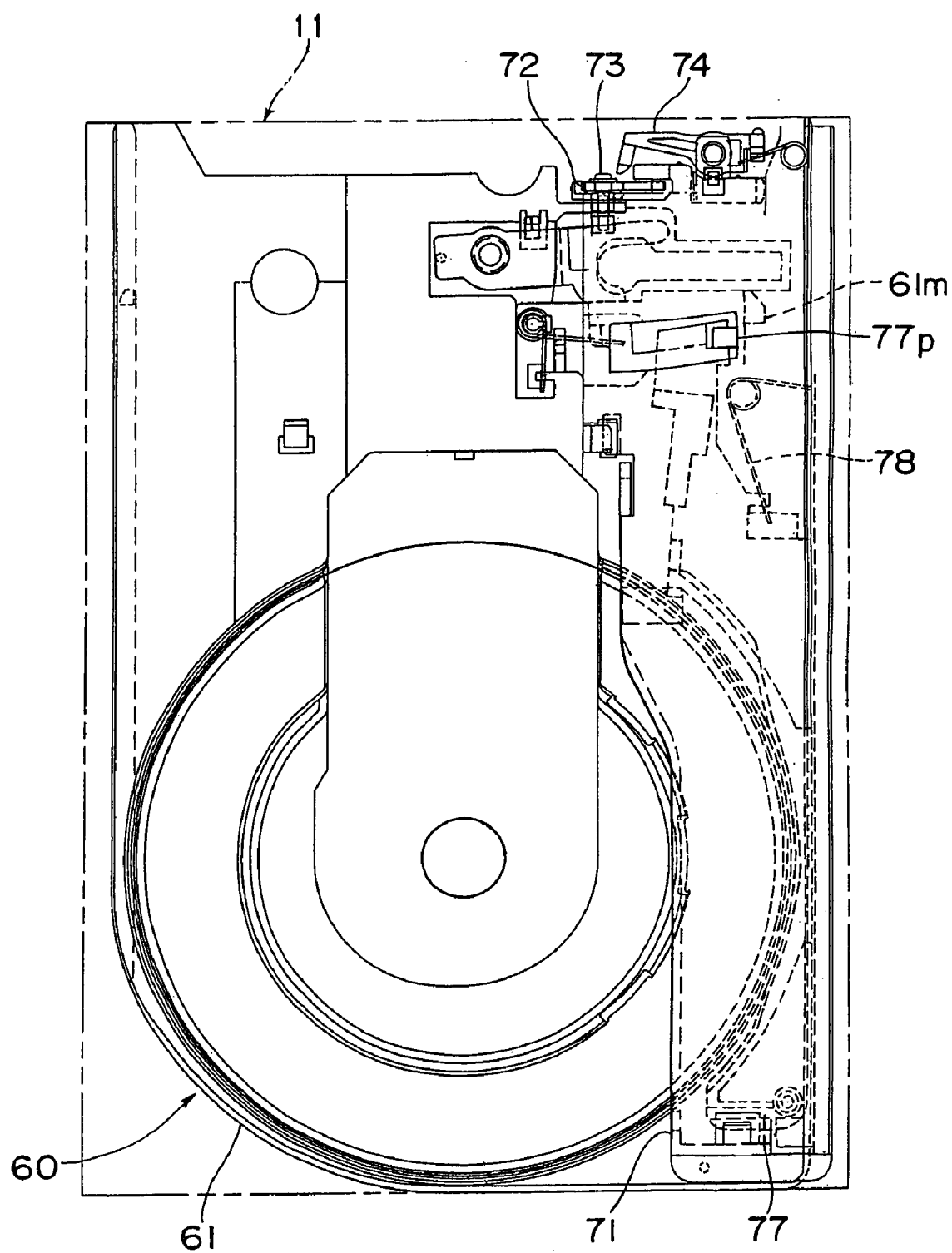
FIG. 26 is an explanatory plan view of the tray unit retracted into the disk drive.
Figure 27:
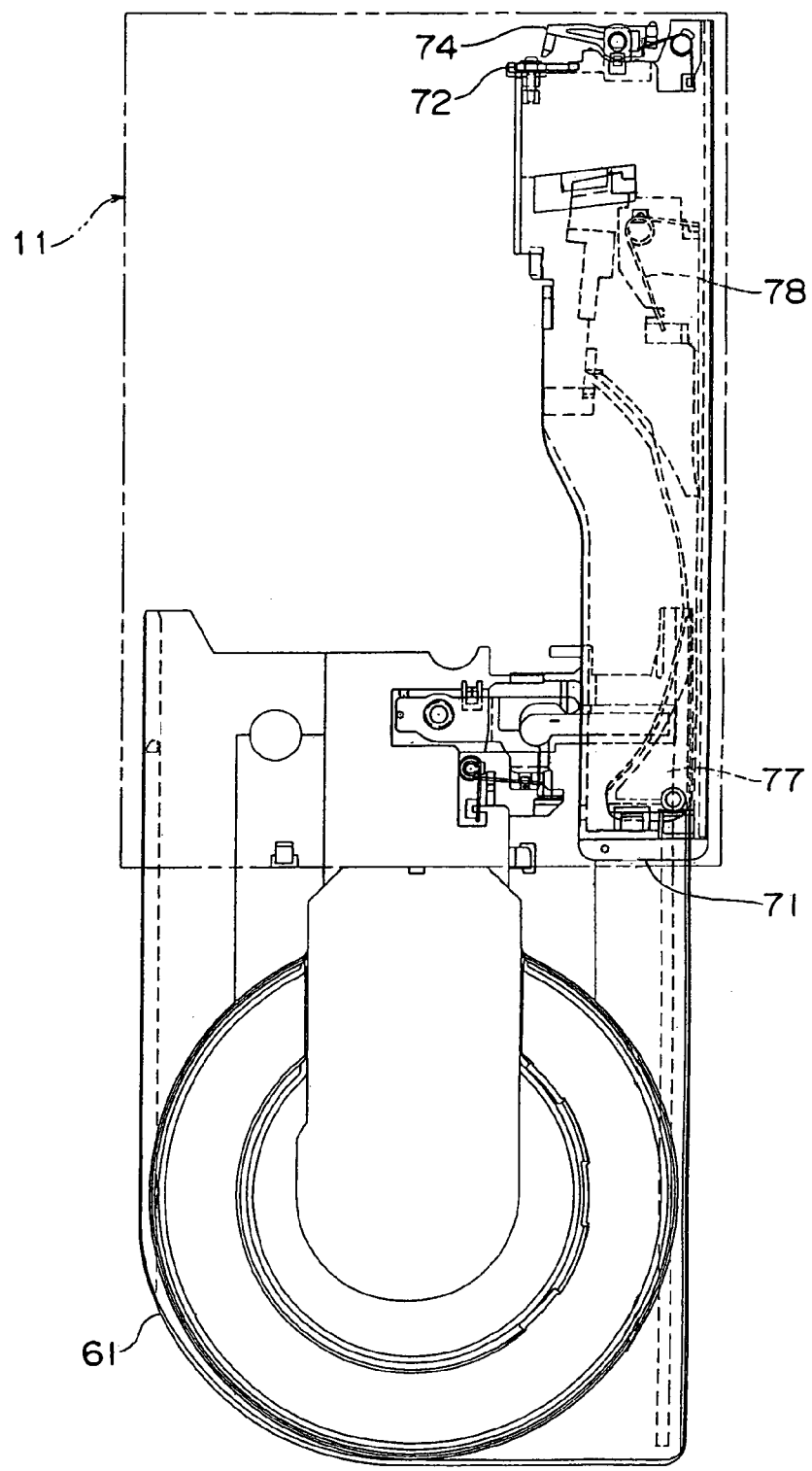
FIG. 27 is an explanatory plan view of the tray unit drawn out from the disk drive placed in the horizontal position.
Figure 28:
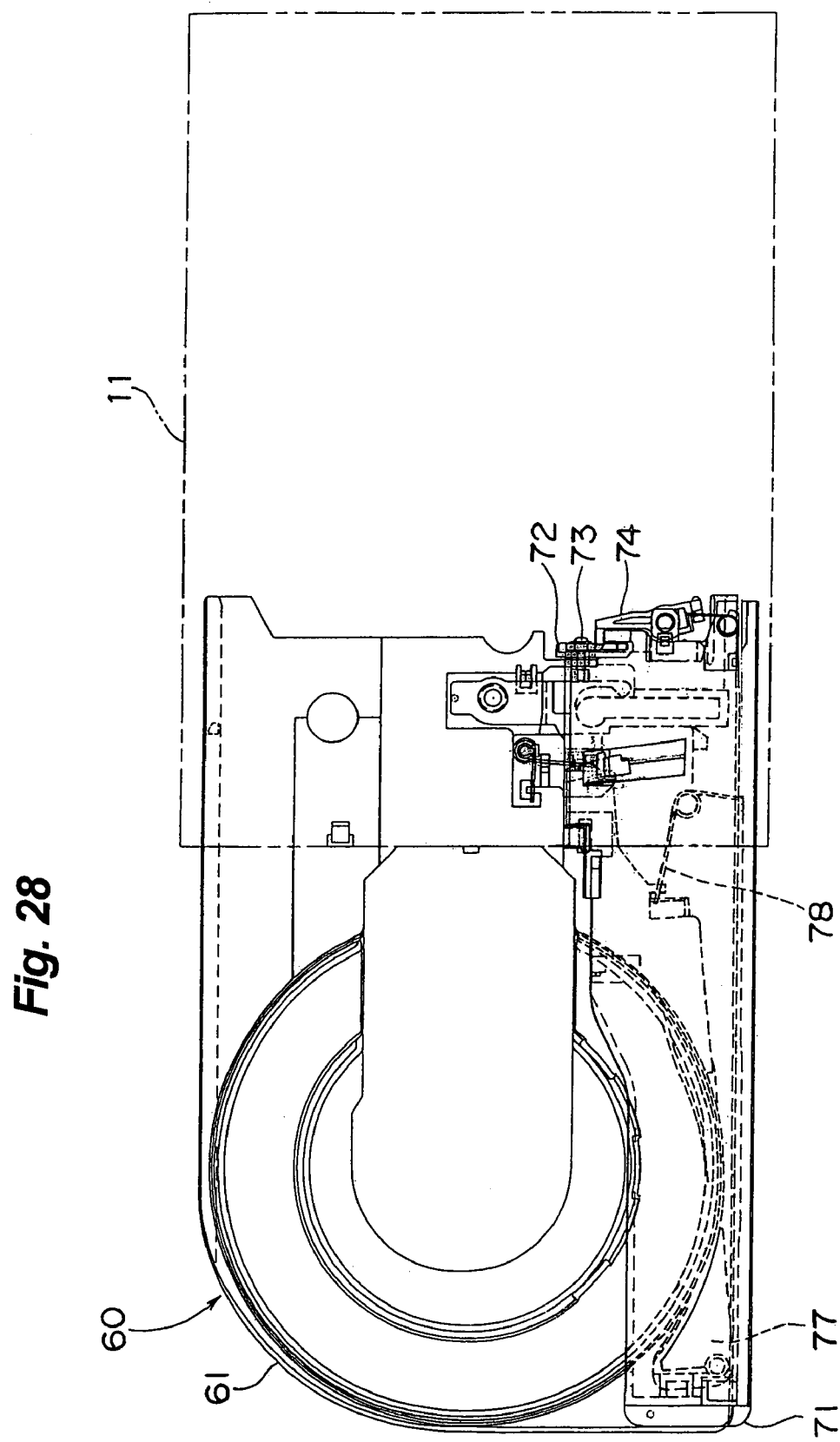
FIG. 28 is an explanatory side view of the tray unit drawn out from the disk drive placed in the vertical position.

FIG. 26 is an explanatory plan view of the tray unit 20 retracted into the disk drive 1, and FIG. 27 is an explanatory plan view of the tray unit 60 drawn out from the disk drive 1 placed in the vertical position. Further, FIG. 28 is an explanatory side view of the tray unit 60 drawn out from the disk drive 1 placed in the vertical position.

As described, according to the disk drive 1 of this embodiment, when the retracted tray (refer to FIG. 26, for example) is drawn out of the disk drive 1 installed in the horizontal position, only the main tray 61 is driven (refer to FIG. 27, for example), and the disk 3 is transferred in a state where it is loaded on the main tray 61. When the disk drive 1 is placed in the vertical position (refer to FIG. 28, for example), both the main tray 61 and the sub tray 71 are driven, and the disk 3 is transferred in a state where it is held between the two trays 61 and 71.

A switching mechanism of the disk transfer between the horizontal position and the vertical position and a driving mechanism for driving the tray unit 60 will now be explained.

As described, the sensor lever 72 is mounted to the rear end of the sub tray 71 by the retaining screw 73 (refer to FIGS. 10, 21, 22, 24, 26-28). The sensor lever 72 is not fixed to the rear end of the sub tray 71 by the retaining screw 73, but is supported by the shaft portion of the retaining screw 73 so that it can swing freely about the shaft portion of the retaining screw 73. More specifically, the sensor lever 72 is supported so that it can swing freely relative to the sub tray 71 while hanging down with its self-weight.

Accordingly, even when the installed position of the disk drive 1 is shifted and its inclination from the horizontal position is changed, thereby the inclination of the sub tray 71 is also changed, the sensor lever 72 remains unchanged as hanging down straight with its self-weight. Therefore, when the inclination of the sub tray 71 is changed, the inclination of the sub tray 71 relative to the sensor lever 72 which always keeps vertical position by its self-weight is varied.

Figure 37:
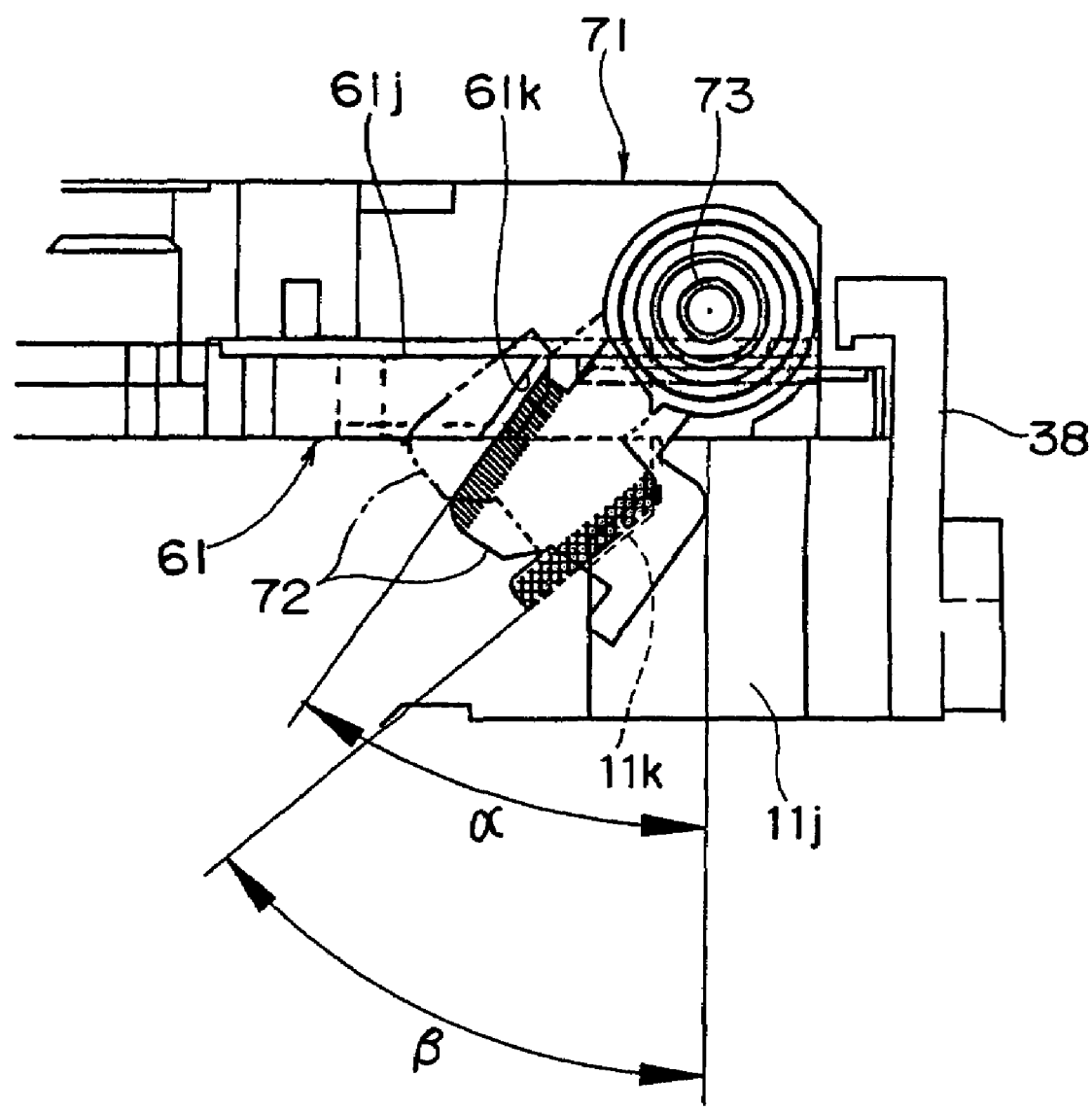
FIG. 37 is an enlarged explanatory view of the rear end of the tray unit and a sensor lever.

FIG. 37 is an enlarged explanatory view of the sensor lever 72 in relation to the rear end of the tray unit 60 (including the main tray 61 and the sub tray 71). As shown, the main tray 61 has a lever stopper 61j provided on the rear end thereof. It is capable of stopping the movement of the sensor lever 72. As best shown in FIG. 10, the lever stopper 61j extends in parallel to the rear end of the main tray 61.

The distal end of the lever stopper 61*j* is sloped at an angle of α to have a tilted edge 61*k*.

More preferably, the drive base 11 has a projection piece 11*j* provided on the rear end thereof (refer to FIGS. 10 and 37). It is capable of stopping the movement of the sensor lever 72. The top end of the projection piece 11*j* is sloped at a second angle of β which is greater than the predetermined angle α (the first angle) to have a tilted edge 61*k*.

When the disk drive 1 (with the main tray 61 and the sub tray 71) is tilted from the horizontal position, the sensor lever 72 hanging down straight with its self-weight remains not touching the lever stopper 61*j* before the tilting reaches the first angle α. In other words, the sensor lever 72 never moves into the slot shaped space between the lever stopper 61*j* and the rear end of the main tray 61.

Therefore, at the time, even if the main tray 61 is driven and slid forward as driven by the driving arm 32, the sub tray 71 receives no driving force. In this condition, the sub tray 71 keeps stationary state in the disk drive 1 and only the main tray 61 moves forward (refer to FIG. 27, for example).

When the tilting angle exceeds the predetermined value α, the sensor lever 72 comes into engagement with the lever stopper 61*j*. Until the tilting angle reaches the second predetermined value β, the sensor lever 72 comes into engagement with both the lever stopper 61*j* of the main tray 61 and the projection piece 11*j* of the drive base 11. At the time, as the forward movement of the sensor lever 72 is restricted by the projection piece 11*j*, the tray unit 60 is not allowed to move forward. That is, the tray unit 60 is kept in the status as shown in FIG. 26.

When the disk drive 1 is further tilted so that the tilting angle exceeds the second predetermined value β, the sensor lever 72 departs from the projection piece 11*j* and remains in engagement only with the lever stopper 61*j*. Then, when the main tray 61 is driven and shifted forward, its driving force is transmitted via the lever stopper 61*j* and the sensor lever 72 to the sub tray 71. Thereby, the sub tray 71 moves forward together with the main tray 61 (refer to FIG. 28, for example).

In this embodiment, for example, the two predetermined angles α and β are 35 degrees and 50 degrees respectively. However, they may be modified to any desired combination depending on the shape of the sensor lever 72 and the lever stopper 61*j*.

Since the projection piece 11*j* is provided on the drive base 11, it restricts the sliding movement of the main tray 61 (of the tray unit 60) until the tilting of the disk drive 1 exceeds the angle α and reaches the angle β thus locking the transfer action of the disk.

If the disk transfer action is switched by slight change of tilting angle of the disk drive 1, for the user, the disk transfer action is unintentionally switched. This annoys the user who wants no switching of the disk transfer action, thus resulting in the inconvenient performance and unfavorable reliability of the disk drive 1 in use. The drive disk 1 of this embodiment is provided with a lock region at boundary area in which the disk transfer action is to be switched, thereby it is possible to avoid such unstable condition of the disk drive 1 in use and to eliminate the above disadvantage.

It is to be noted that the horizontal position of the disk drive 1 includes a horizontal position, a substantially horizontal position, and a tilted position at an angle to the horizontal position which is equal to or smaller than the first angle α. Also, the vertical position of the disk drive 1 includes a vertical position, a substantially vertical position, and a tilted position at an angle to the horizontal position which exceeds the first angle α and is equal to or greater than the second angle β.

As described, the transmission of the driving force can be switched between two (first and second) transmission modes, depending on the positional relationship, that is, engagement state, between the sensor lever 72 and the lever stopper 61*j* of the main tray 61. In the first transmission mode, the driving force is transmitted from the driving arm 32 only to the main tray 61. And, in the second transmission mode, the driving force is partially transmitted from the driving arm 32 to the sub tray 71.

In response to the switching of the transmission of the driving force, the disk transfer action can be switched between two (first and second) transfer modes. In the first transfer mode, the disk 3 is supported and transferred only by the main tray 61. And, in the second transfer mode, the disk 3 is supported and transferred by both the main tray 61 and the sub tray 71.

As described, the driving force transmission switching mechanism for transmitting the driving force of the driving arm 32 to the tray unit 60 and the disk transfer switching mechanism for switching the disk transfer mode are thus based on a combination action of the sensor lever 72 and the lever stopper 61*j* of the main tray 61. Also, the sensor lever 72 serves as a switching lever for setting the switching state by the switching mechanisms.

Explained above, the disk transfer mode is switched between the transfer mode (the first transfer mode) where the disk 3 is supported and transferred only by the main tray 61 and the transfer mode (the second transfer mode) allowing the disk 3 to be held and transferred by both the main tray 61 and the sub tray 71. That is, the transmission of the driving force is switched between the first transmission mode where the driving force of the driving arm 32 is transmitted only to the main tray 61 and the second transmission mode where the driving force of the driving arm 32 is partially transmitted to the sub tray 71.

Thereby, the disk drive 1 of this embodiment can favorably be used in both the horizontal position and the vertical position. In other words, the disk drive 1 is adaptable to use in so-called two-way layout free.

The transfer action (that is, the transmission of the driving force) can be switched depending on the angle of the disk drive 1 tilting from the horizontal position. More specifically, depending on the inclination of the disk drive 1, the action of transferring the disk 3 (that is, the transmission of the driving force) can be switched suitably between the first transferring mode (the first transmission mode) to the second transferring mode (the second transmission mode).

Specifically, the main tray 61 can constantly be driven in every action of the disk transfer as is linked with the driving arm 61. The sub tray 71 is however actuated only in the second disk transfer mode by a part of the driving force of the driving arm 32 through the action of the sensor lever 72 and the lever stopper 61*j*. This allows the transmission mode of the driving force to the sub tray 71 to be certainly switched when the transfer mode of the disk 3 is switched between the first transfer mode and the second transfer mode.

Also, the disk drive 1 of this embodiment includes the horizontal lock lever 38 (the first lock member) for allowing the tray (only the main tray 61) to be drawn out from the disk drive 1 placed in the horizontal position and retracted into the same with no difficulty after the position is shifted to the vertical position.

In a reserve action, even if the disk drive 1 is shifted to the horizontal position after its tray unit (including the train tray 61 and the sub tray 71) is drawn out in the vertical position, both the main tray 61 and the sub tray 71 can be retracted without difficulty into the disk drive 1 by the action of the rear vertical lock lever 74 (the second lock member).

Figure 29:
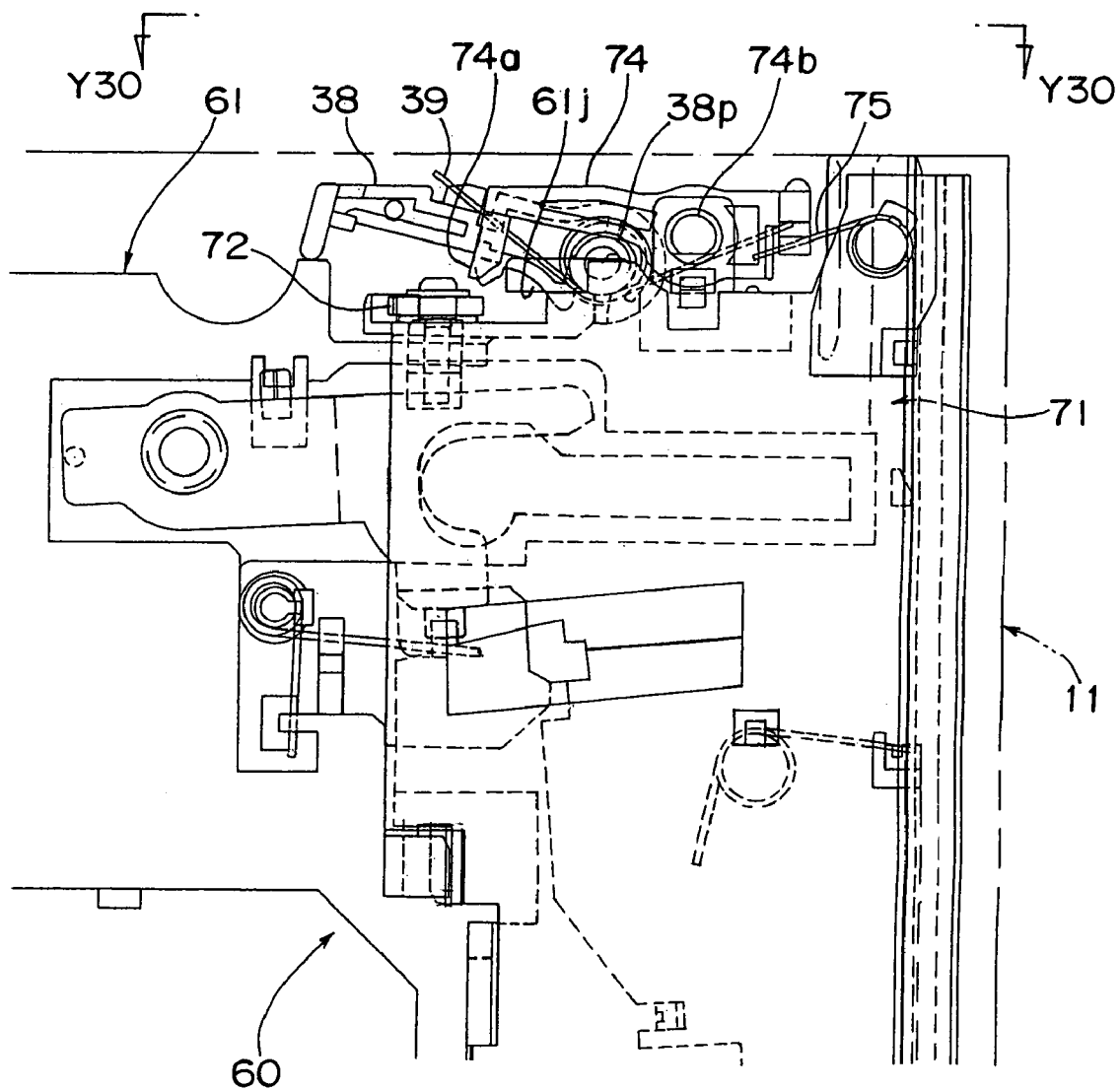
FIG. 29 is an enlarged explanatory view showing the rear portion of the tray unit retracted into the disk drive placed in the horizontal position.
Figure 30:
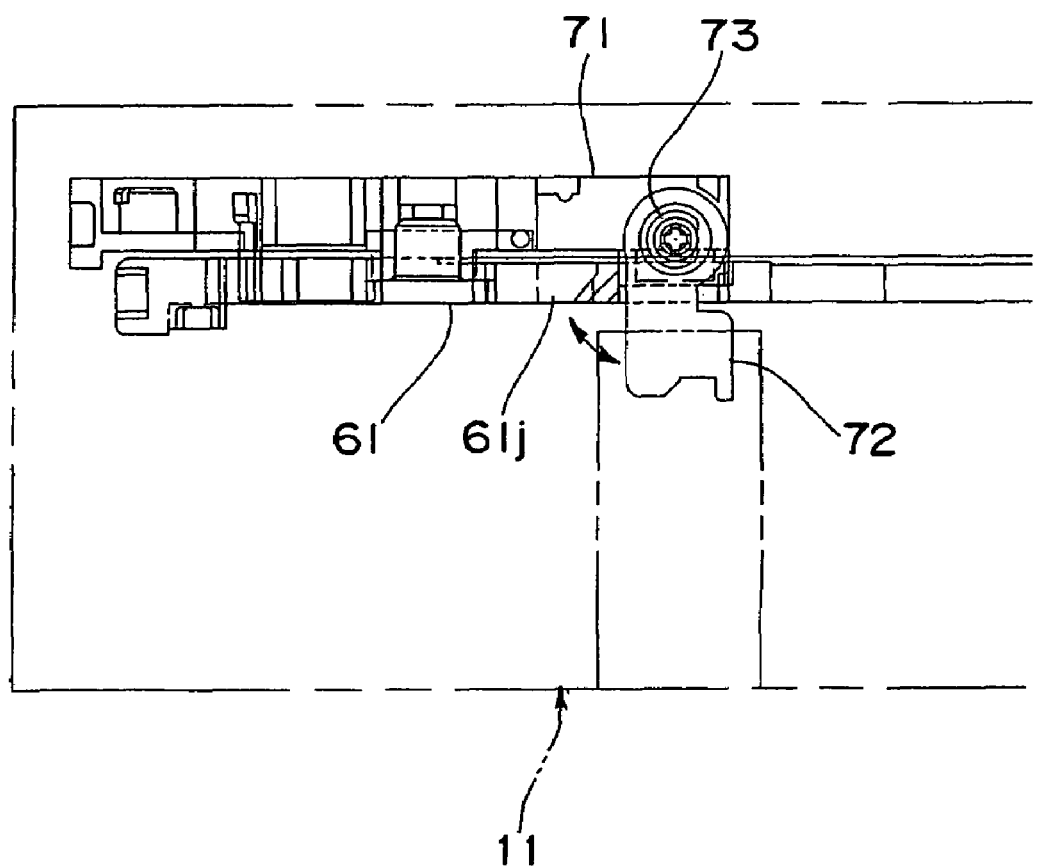
FIG. 30 is an explanatory view seen along the arrows Y30-Y30 in FIG. 29.

FIG. 29 is an explanatory view showing an enlargement of the rear portion of the tray unit 60 fully retracted into the disk drive 1 for e.g. the playback action when the disk drive 1 is placed in the horizontal position. And, FIG. 30 is an explanatory view of the rear portion of the tray unit 60 seen along the arrows Y30-Y30 in FIG. 29.

As illustrated in these drawings, in the fully retracted state of the tray unit 60, the horizontal lock lever 38 is pressed at its distal end by the rear end (of the main tray 61) of the tray unit 60 and not engaged with the sensor lever 72. The horizontal lock lever 38 remains urged by an urging spring 39 so that its distal end turns towards the tray unit 60 (more specifically, towards the sub tray 71). In other words, the horizontal lock lever 38 remains urged by the spring 39 in the counter-clockwise direction in FIG. 29.

The vertical lock lever 74 also remains urged by an urging spring 75 in the same direction as the horizontal lock lever (that its distal end 74*a* is turned towards the tray unit 60). In FIG. 29, as its other end opposite to the distal end 74*a* is however pressed against the wall of the drive base 11, for example, the vertical lock lever 74 remains disengaged from the sensor lever 72. Accordingly, the sensor lever 72 is hanged down straight by its own weight and free in the movement, as shown in FIG. 30.

Figure 31:
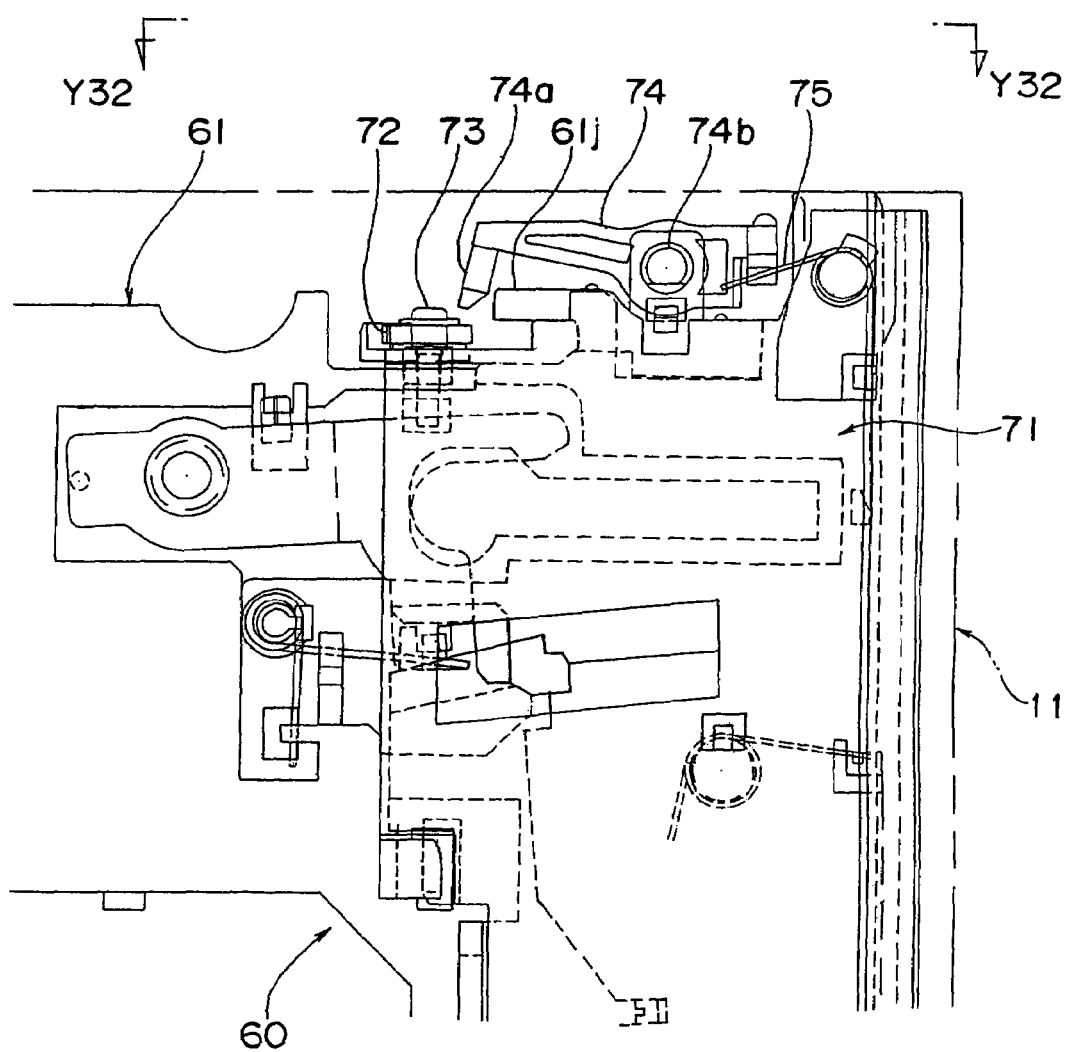
FIG. 31 is an enlarged explanatory view of the rear portion of the tray unit just before drawn out from the disk drive placed in the horizontal position.
Figure 32:
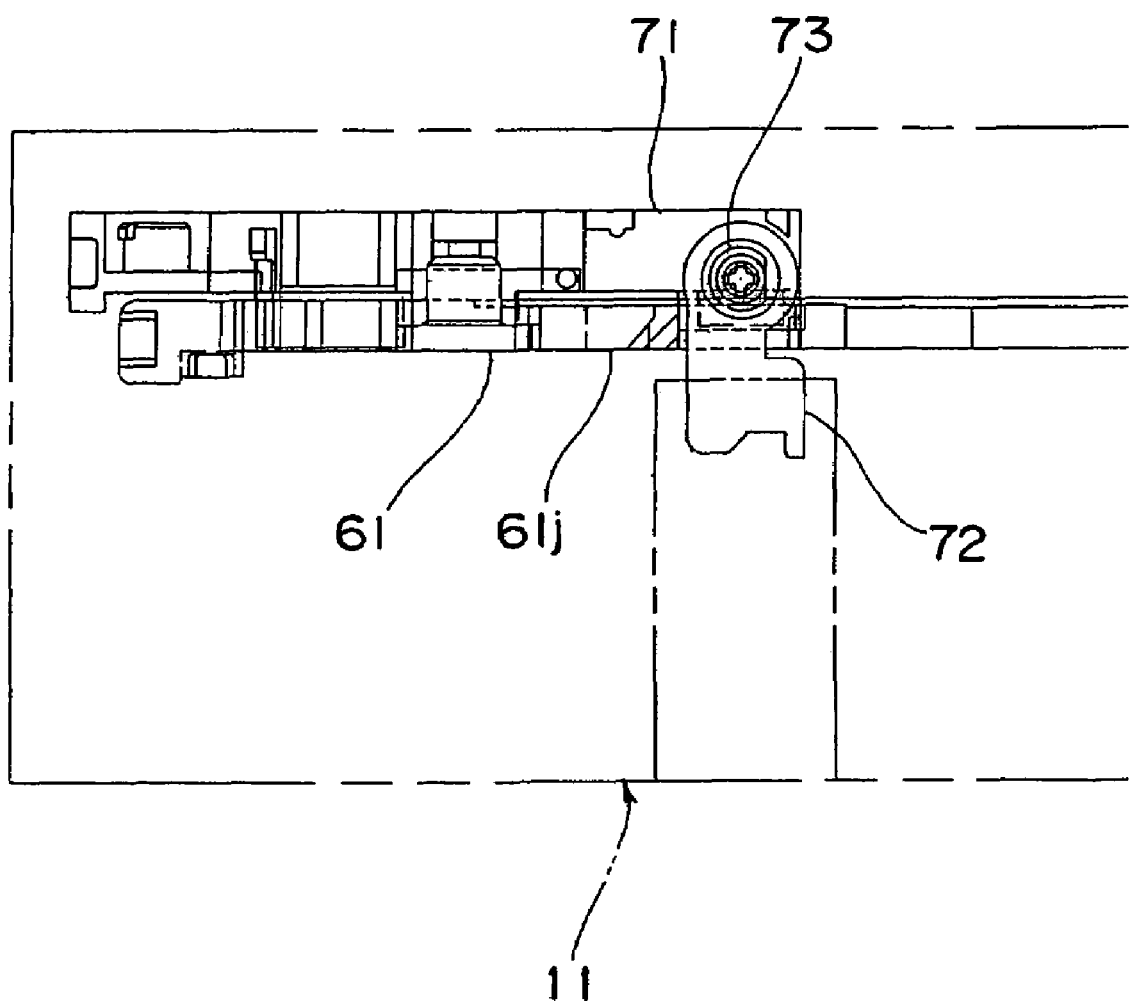
FIG. 32 is an explanatory view seen along the arrows Y32-Y32 in FIG. 31.

FIG. 31 is an enlarged explanatory view of the rear portion of the tray unit 60 just before drawn out from the disk drive 1 placed in the horizontal position, and FIG. 32 is an explanatory view seen along the arrows Y32-Y32 in FIG. 31. Further, FIG. 33 is an explanatory view of the rear portion of the sub tray 71 with the main tray 61 drawn out from the disk drive 1 placed in the horizontal position.

When the tray (only the main tray 61) is drawn out from its inward position shown in FIGS. 29 and 30 in the drive unit 1 placed in the horizontal position, the sensor lever 72 remains still in its hanging down state by its own weight as shown in FIGS. 31 and 32. The sensor lever 72 remains still free in the movement. At the time, the sensor lever 72 is not yet engaged with the horizontal lock lever 38 nor the vertical lock lever 74.

Figure 33:
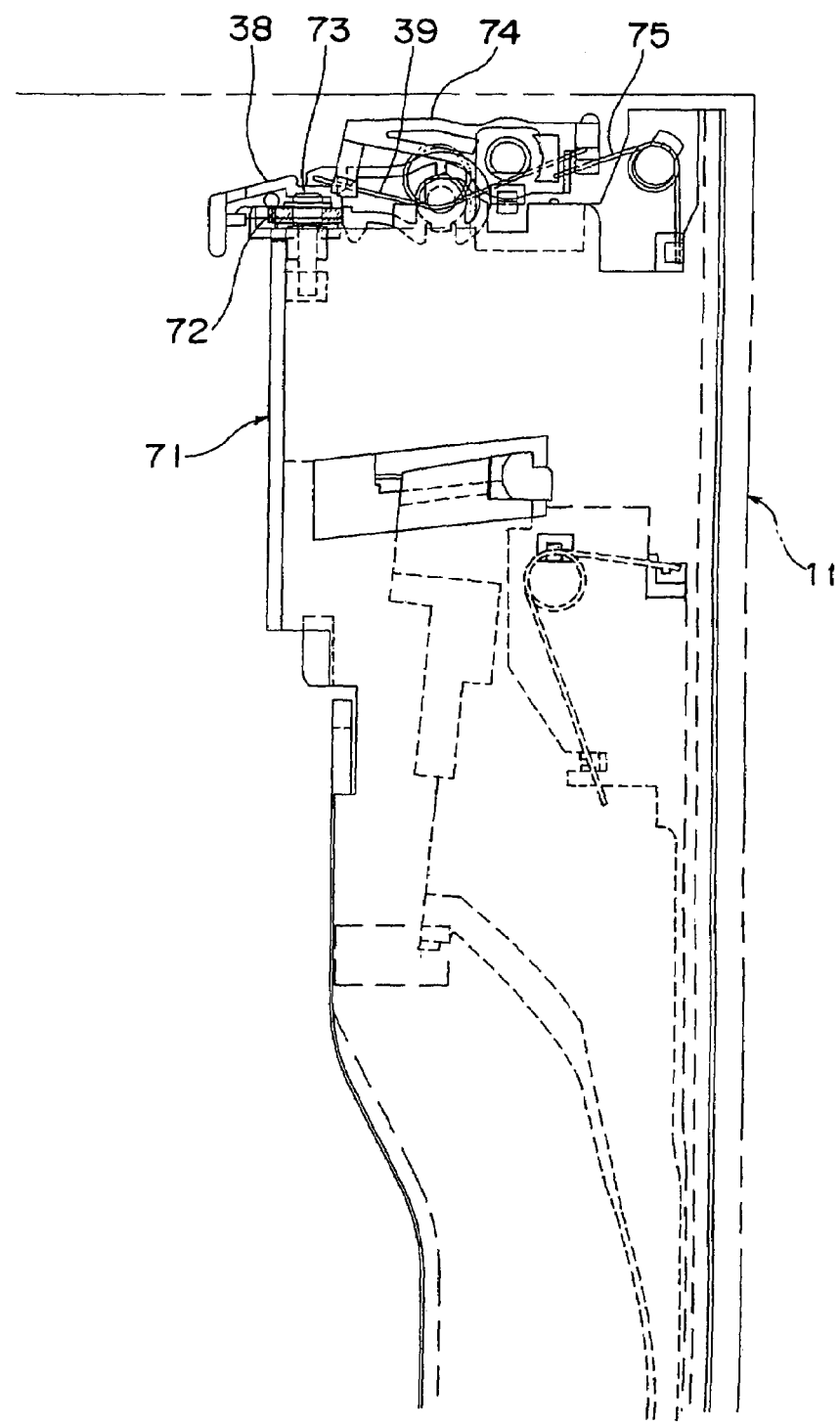
FIG. 33 is an explanatory view of the rear portion of the sub tray with the main tray drawn out from the disk drive placed in the horizontal position.

Then, as shown in FIG. 33, with the main tray 61 drawn out and the sub tray 71 retracted in the disk drive 1, the horizontal lock lever 38 is turned in the counter-clockwise direction in FIG. 33 by the urging force of the spring 39. As the result, the sensor lever 72 while hanging down is locked with the horizontal lock lever 38. That is, the swing motion of the sensor lever 72 is inhibited by the horizontal lock lever 38.

Once the sensor lever 72 has been locked with the horizontal lock lever 38, it will never swing even when the disk drive 1 is shifted from the horizontal position to the vertical position. Accordingly, the main tray 61 can be retracted into the disk drive 1 placed in the vertical position without being interrupted by the sensor lever 72.

As described, when the main tray 61 only is driven, the movement of the sensor lever 72 is inhibited by the horizontal lock member 38. This allows the sensor lever 72 never to interrupt the retracting action of the main tray 61 into the disk drive 1 placed in the vertical position after it is drawn out from the disk drive 1 placed in the horizontal position.

Also, while the main tray 61 remains in the disk drive 1, the swing motion of the sensor lever 72 is enabled but not locked hence permitting any switching action of the sensor lever 72 to determine the disk transfer mode.

Figure 34:
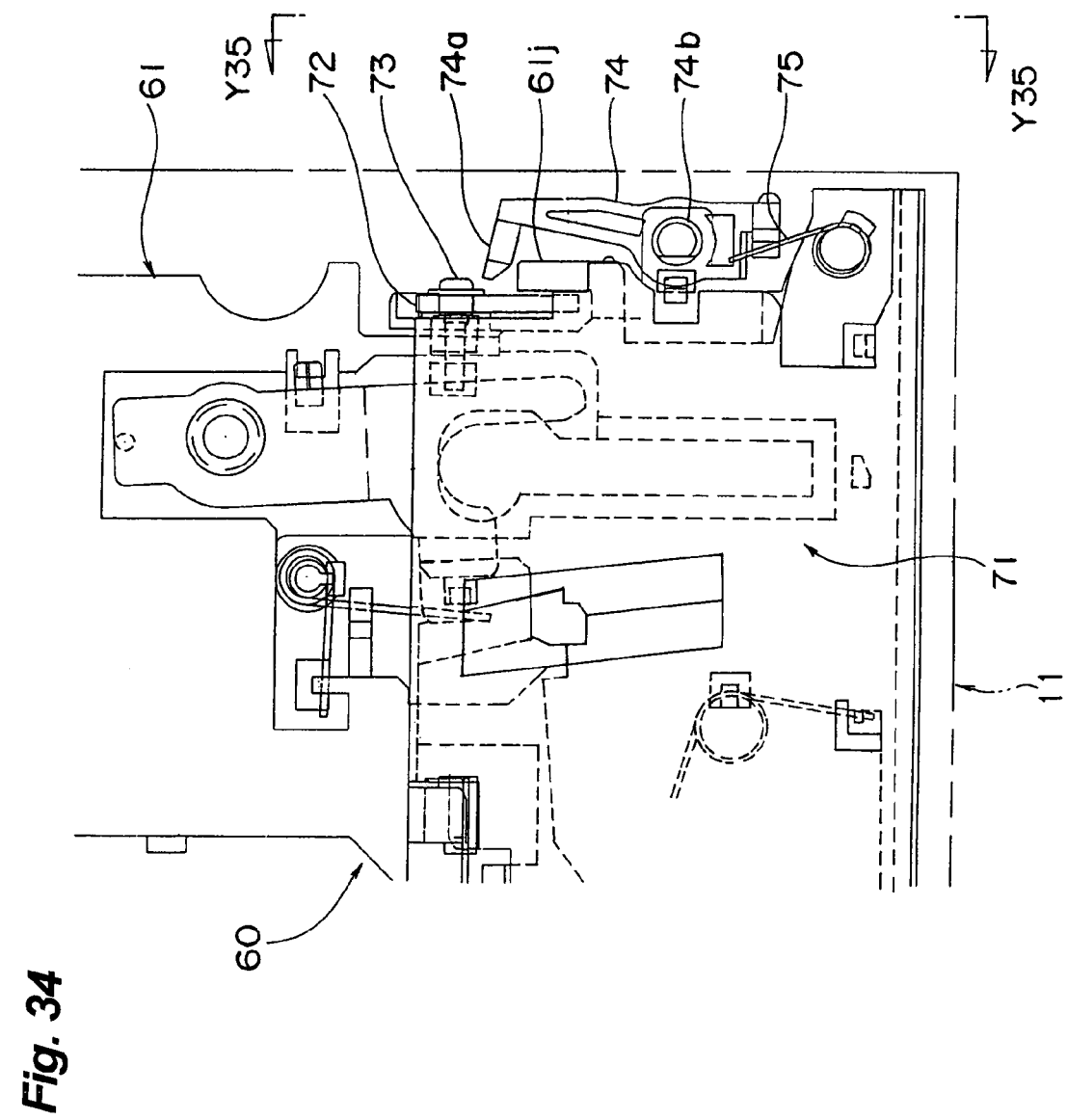
FIG. 34 is an enlarged explanatory view of the rear portion of the tray unit retracted into the disk drive placed in the vertical position.
Figure 35:
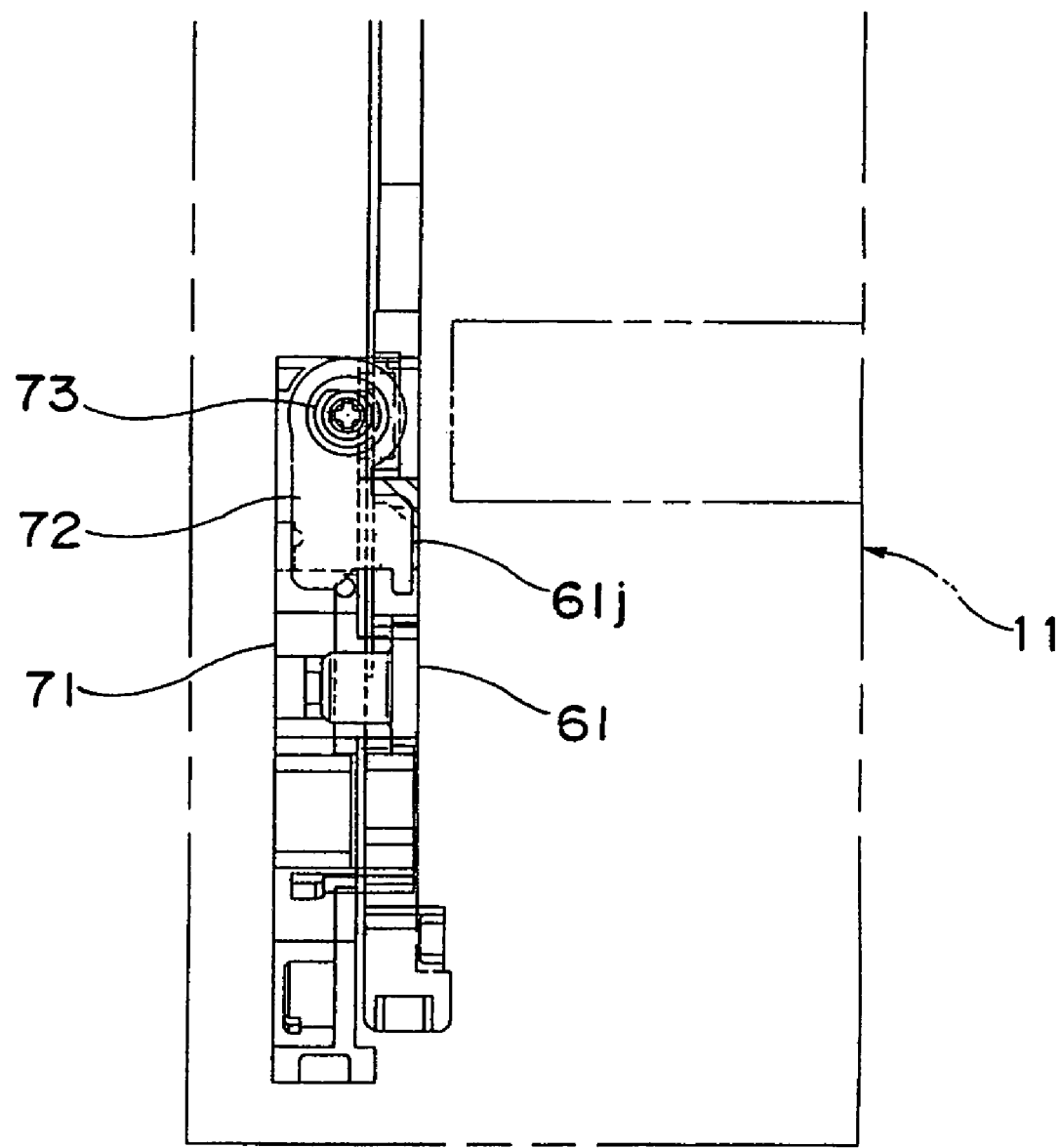
FIG. 35 is an explanatory view seen along the arrows Y35-Y35 in FIG. 34.

FIG. 34 is an enlarged explanatory view of the rear portion of the tray unit retracted into the disk drive placed in the vertical position, and FIG. 35 is an explanatory view seen along the arrows Y35-Y35 in FIG. 34. Further, FIG. 36 is an explanatory view of the rear portion of the tray unit drawn out from the disk drive placed in the vertical position.

As illustrated in these drawings, in this retracted state of the tray unit 60, the vertical lock lever 74 is pressed at an opposed end to the distal end 74*a* against the wall of the drive base 11, for example, and remains disengaged from the sensor lever 72. Accordingly, in this state, as best shown in FIG. 35, the sensor lever 72 is engaged partially with the lever stopper 61*j* of the main tray 61 (as inserted into the slot shaped space between the lever stopper 61*j* and the rear end of the main tray 61). And, the sensor lever 72 is hanging down by its own weight and totally free to swing.

Figure 36:
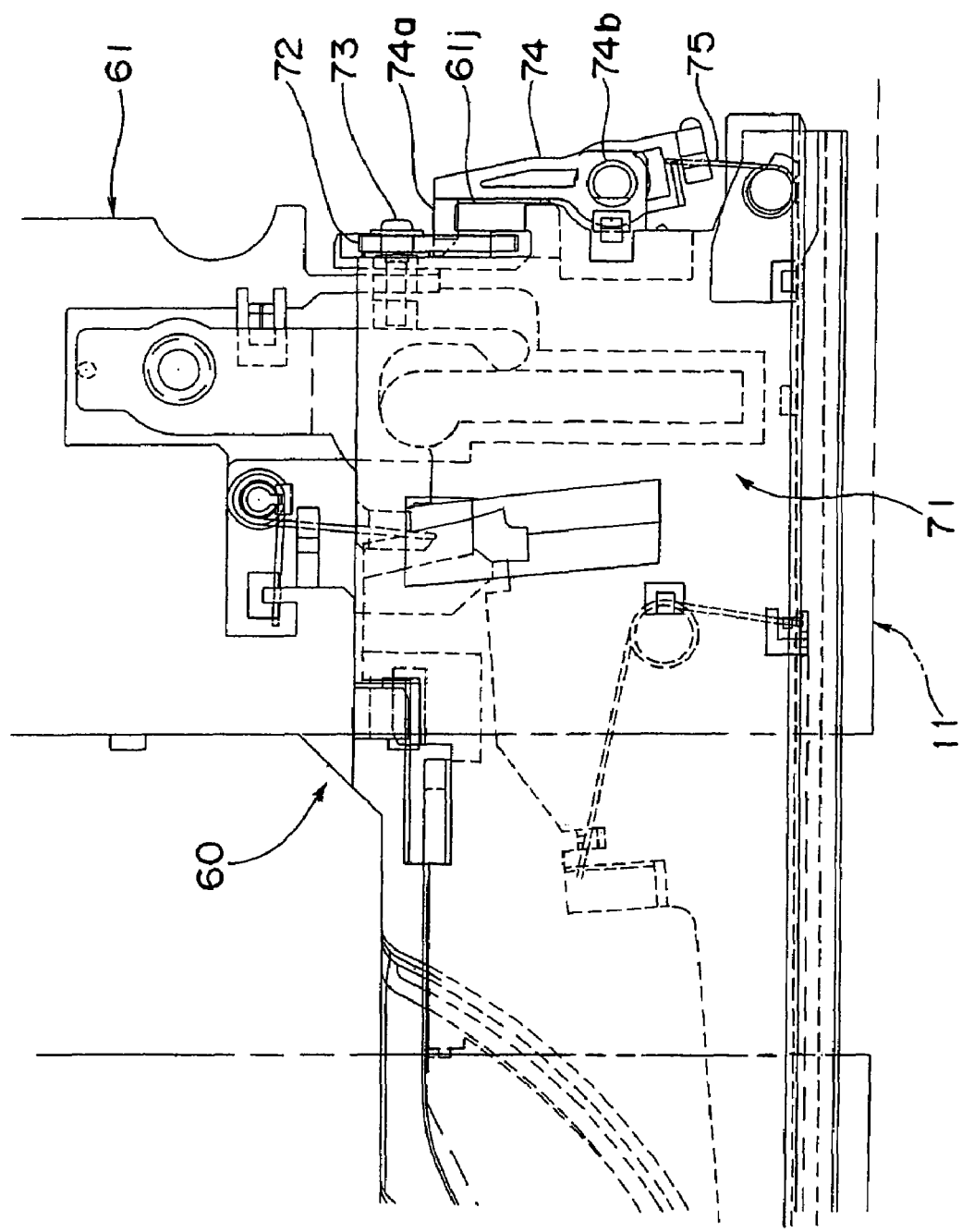
FIG. 36 is an explanatory view of the rear portion of the tray unit drawn out from the disk drive placed in the vertical position.

As shown in FIG. 36, when the tray unit 60 (including the main tray 61 and the sub tray 71) is drawn out from the disk drive 1, the vertical lock lever 34 is turned in the counter-clockwise direction in FIG. 36 by the urging force of the a urging spring 75. This causes the distal end 74*a* of the vertical lock lever 74 to position to one side of the sensor lever 72. As the result, the sensor lever 72 is locked by the vertical lock lever 74, in the hanging down state by its own weight and engaged with the lever stopper 61*j* of the main tray 61. Thereby the sensor lever 72 is inhibited to swing.

Accordingly, in case that the disk drive 1 is shifted from the vertical position to the horizontal position, the sensor lever 72 remains not moved as locked by the vertical lock lever 74 and will never interrupt the retracting action of the tray unit 60 into the disk drive 1 placed in the horizontal position.

As described, when both the main tray 61 and the sub tray 71 are driven, the sensor lever 72 is inhibited to swing by the vertical lock member 74. This allows the sensor lever 72 never to interrupt the retracting action of the two trays 61 and 71 into the disk drive 1 placed in the horizontal position after it is drawn out from the disk drive 1 placed in the vertical position. Also, while both the main tray 61 and the sub tray 71 remain in the disk drive 1, the swing motion of the sensor lever 72 is enabled but not locked hence permitting any switching action of the sensor lever 72 to determine the disk transfer mode.

As described, the action of the horizontal lock lever 38 and the vertical lock lever 74 permits the tray unit 60 to be retracted without difficulty into the disk drive 1 placed in the horizontal position after it is drawn out in the vertical position. Also, the tray 61 (the main tray) can be retracted without difficulty into the disk drive 1 placed in the vertical position after it is drawn out in the horizontal position. Accordingly, the disk drive 1 can effectively respond to so-called perfect layout free requirement.

The action of the clamp unit 80 in the disk drive 1 will then be described together with the transfer of a small size disk (of 8 cm in diameter) when the disk drive 1 is placed in the vertical position.

Figure 11:
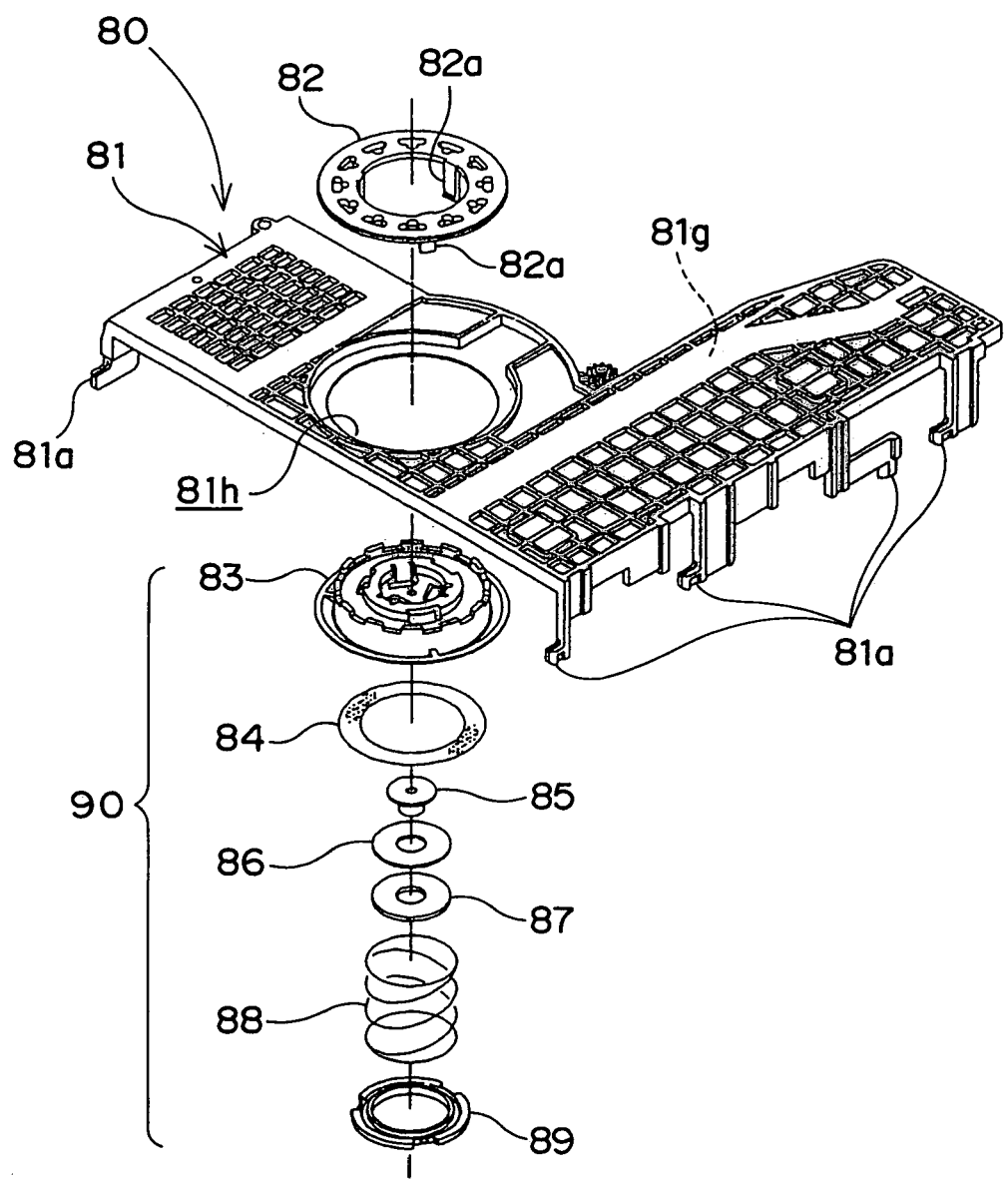
FIG. 11 is en enlarged, exploded perspective view of a clamp unit provided in the disk drive.

As shown in FIGS. 7 and 11, the clamp unit 80 comprises the clamp board 81 assembled to the drive base 11 of the disk drive 1, a damper 90 including a damper body 83, and a spring hook 82 for retaining the damper 90 to the clamp board 81.

The clamp board 81 has a plurality of mounting feet provided on both side ends thereof. Each foot has a claw 81*a* provided on the distal end thereof for engagement with the vertical wall of the drive base 11. As described previously, the guide groove 81*g* is provided on the back side of the clamp board 81 for guiding the forward and backward movement of the projection 77*p* of the disk guide 77.

Also, the clamp board 81 has a round opening 81*h* provided in a center thereof for sustaining the damper 90 through the spring hook 82 (a damper supporting member).

Figure 40:
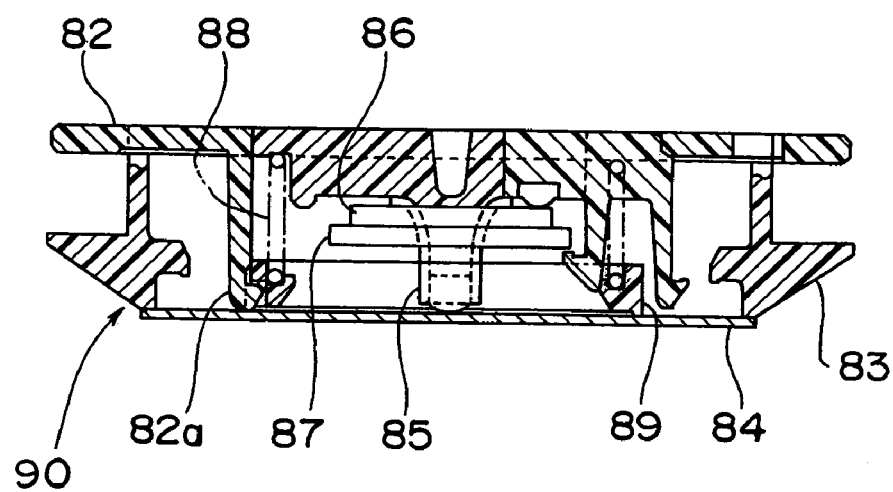
FIG. 40 is an explanatory cross sectional view showing a damper with its spring expanded.
Figure 41:
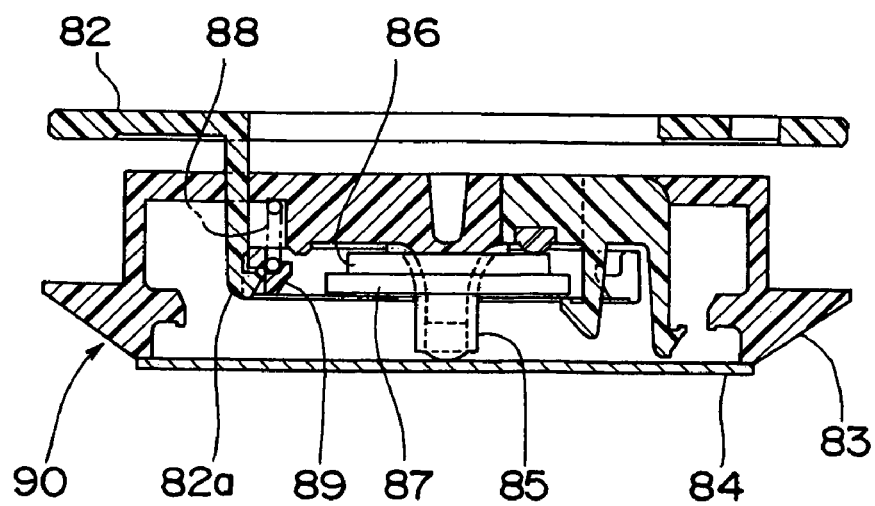
FIG. 41 is an explanatory cross sectional view showing the damper with its spring compressed.

The damper 90 is to cooperate with the turn table 45 for holding the disk. As shown in FIGS. 40 and 41, a damper rubber 85, a washer 86, a magnet 87, a coil spring 88, and a spring holder 89 are assembled in turn to the clamp body 83. And thereafter a damper sheet 84 bonded to an end surface of the assembly, thereby, the damper 90 is constituted.

The damper 90 is inserted from below into the opening 81*h* in the clamp board 81. And, the spring hook 82 is assembled from above to the clamp board 81 to engage the mounting feet 82*a* with the clamp board 81. Thereby, the damper 90 is supported by the clamp board 81 through the spring hook 82.

More specifically, the mounting feet 82*a* of the spring hook 82 are engaged with the spring holder 89 which holds a lower end portion of a coil spring 88. The upper end portion of the coil spring 88 is held in direct contact with the upper inside of the damper body 83. Accordingly, the coil spring 88 is sandwiched between the spring hook 82 as the damper support and the damper 90.

FIG. 40 is an explanatory cross sectional view showing a damper 90 with its spring expanded, and FIG. 41 is an explanatory cross sectional view showing the damper 90 with its spring compressed.

In the normal state where no external force act on the damper 90, as shown in FIG. 40, the coil spring 88 remains in its initial state where it is fully expanded. When the turn table 45 comes to close to the damper 90 so that the magnet force acts between the turn table 45 and the magnet 87, as shown in FIG. 41, the magnet 87 is attracted toward the turn table 45 as resisting against the urging force of the coil spring 88. As the result, the coil spring 88 comes into the compressed state.

While the small size disk 5 is held between the turn table 45 and the damper 90 with its damper body 83 supported by the clamp board 81 through the spring hook 82, the clamper 90 contacting directly the disk 5 remains urged, via the clamper body 83, by the coil spring 88 in a reverse of the disk holding direction (upwardly in FIG. 41).

Figure 38:
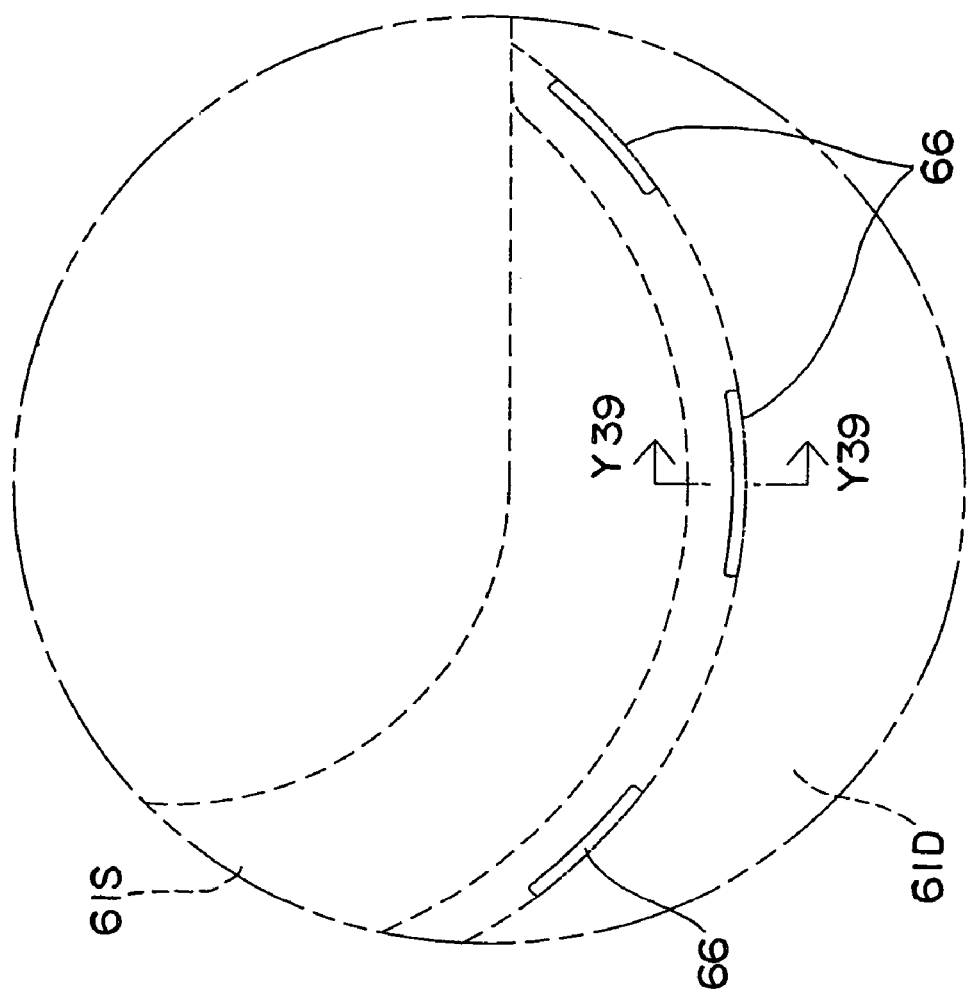
FIG. 38 is an enlarged explanatory view showing a part of a small diameter support region of the main tray.
Figure 39:
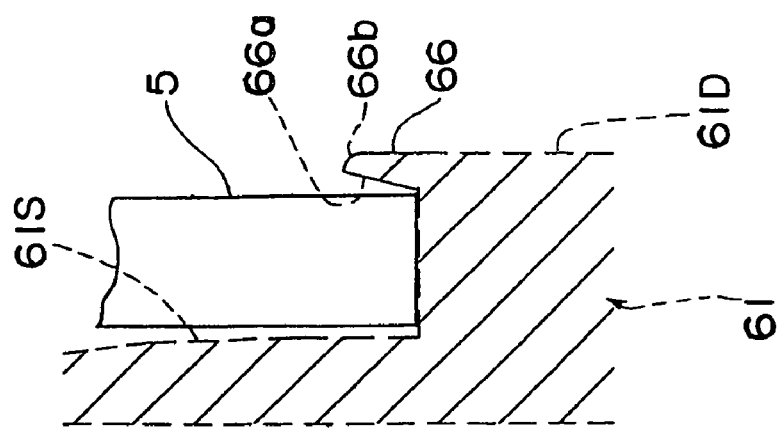
FIG. 39 is an explanatory cross sectional view taken along the line Y39-Y39 of the FIG. 38, showing an enlargement of a holding projection on the small diameter support region.

FIG. 38 is an enlarged view of the small diameter support region 61S of the main tray 61. FIG. 39 is an enlarged cross sectional view showing engaging claws 66 of the small diameter support region 61S. As shown in these drawings, the small diameter support region 61S is stepped down by a predetermined amount towards the turn table 45 from the large diameter support region 61D of the main tray 61.

The engaging claws 66 are provided on the outer periphery of the small diameter support region 61S for holding a small size disk 5. They are capable of retaining the lower outer edge of the small size disk 5, even when the disk drive 1 is placed in inclined state where the inclination is over a predetermined angle range to the horizontal position. Preferably, a plurality of the engaging claws 66 (three in this embodiment) are disposed at a lower half of the region with the disk drive 1 placed in the vertical position. Alternatively, one single engaging claw 66 may be provided at the lowermost end of the region depending on its size.

Each of the engaging claws 66 has two taper surfaces 66*a* and 66*b* provided on both sides thereof. This encourages the small size disk 5 to move in and out over the engaging claws 66 as run along the taper surfaces 66*a* and 66*b*.

FIGS. 42(*a*) to 42(*c*) are explanatory views illustrating a series of steps of sandwiching between the damper 90 and the turn table 45 the small size disk 5 which has been held with the engaging claws 66 on the small diameter support region 61S of the main tray 61.

As shown in these drawings, when the small size disk 5 held at the lower peripheral edge by the engaging claws 66 is loaded onto the turn table 45, the above-mentioned peripheral edge retained by a plurality of the engaging claws 66 climb over the engaging claws 66. Thereby, the small size disk 5 is transferred toward the damper 90, and it is pinched and held between the damper 90 and the turn table 45 by the magnet force.

More particularly, as shown in FIG. 42(*a*), when the damper 90 and the turn able 45 are spaced by more than a certain distance and the small size disk 5 is positioned between them, it is retained by the engaging claws 66 at the lower peripheral edge in a state where it is dropped toward the lowermost area in the small diameter support region 61S of the main tray 61. At the time, the center hole 5*h* of the small size disk 5 is dislocated downwardly from the center of the main tray 61.

Then, as the turn table 45 is moved towards the damper 90, its taper side 45*c* comes engaging with the center hole 5*h* of the disk 5. Accordingly as shown in FIG. 42(*b*), the small size disk 5 is lifted up along the taper side 45*c*. Then, the turn table 45 is attracted towards the damper 90 by the magnetism of the magnet 87 (as denoted by the arrow in FIG. 42(*b*)) thus allowing the small size disk 5 to be sandwiched and held between the damper 90 and the turn table 45.

When the turn table 45 is further moved towards the damper 90, the lower peripheral edge of the small size disk 5 moves over the engaging claws 66 as shown in FIG. 42(*c*). Thereby, the small size disk 5 moves toward the damper 90. More specifically, the small size disk 5 moves with its lower peripheral edge running along the taper surface 66*a* of each engaging claw 66 to pass smoothly over the claw 66. In the steps of FIGS. 42(*b*) and 42(*c*), the damper 90 remains urged by the urging force of the coil spring 88 in a reverse of the disk holding direction.

The size and shape of the engaging claws 66 including the width, the height (a projected amount) and the shape of the taper surfaces 66*a*, 66*b* are so determined suitably as to be run over by the lower peripheral edge of the small size disk 5. Also, they are so determined suitably as to securely hold the small size disk 5 on the small diameter support region 61S in transfer of the disk 5 when the disk drive 1 is placed in the vertical position.

Figure 43A:
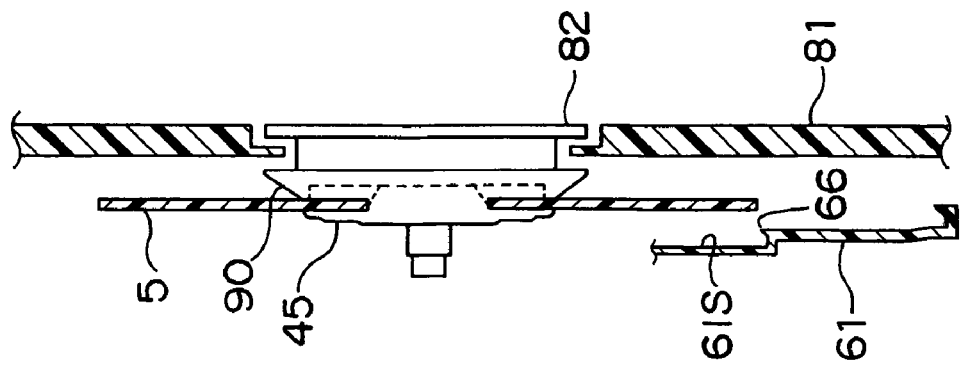
FIGS. 43(a), (b) and (c) are parts of explanatory view showing a series of steps for returning back the small size disk clamped between the damper and the turn table onto the small diameter support region of the main tray.
Figure 43B:
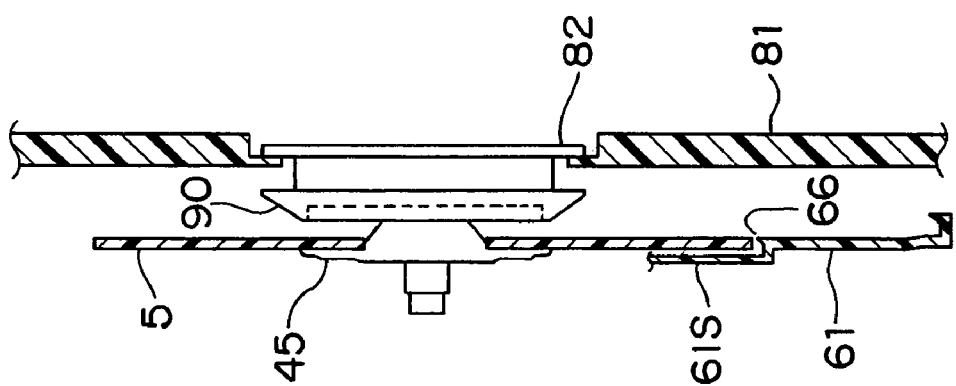
Figure 43C:
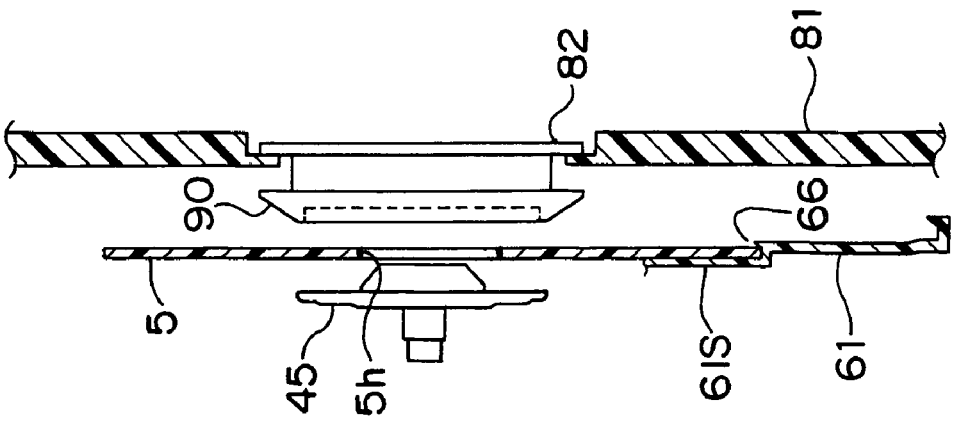
Figure 44:
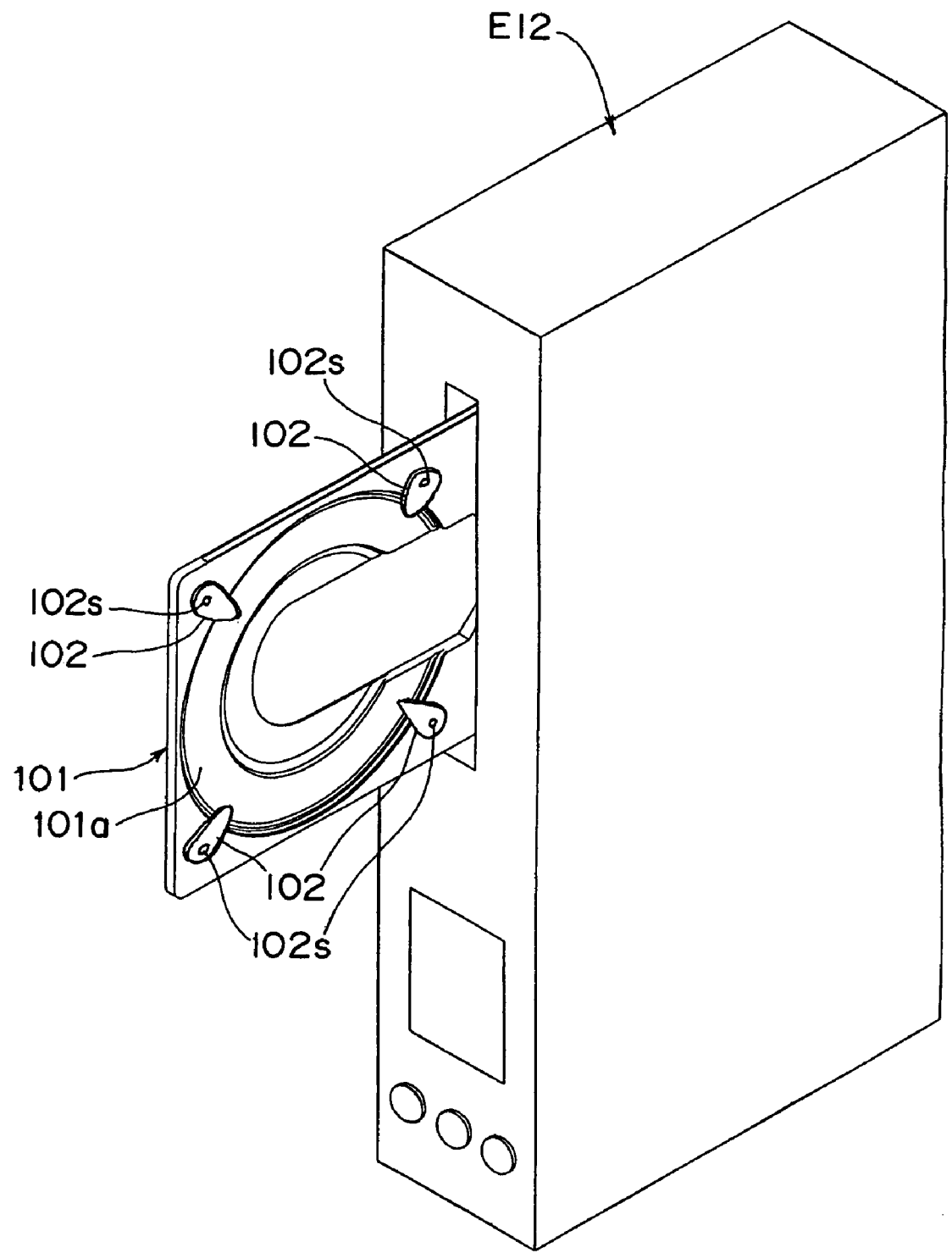
FIG. 44 is a perspective view of a vertical type personal computer equipped with a conventional disk drive.

FIGS. 43(*a*) to 43(*c*) are explanatory views illustrating a series of steps of releasing and returning the small size disk 5 held between the damper 90 and the turn table 45 onto the small diameter support region 61S of the main tray 61.

When the small size disk 5 held and pinched between the damper 90 and the turn table 45 is unloaded from the turn table 45, the peripheral edge run over the engaging claws 66. Thereby, the disk 5 is moved toward the turn table 45 and released from its held state between the damper 90 and the turn table 45.

More specifically as shown in FIG. 43(*a*), the damper 90 is slightly lifted up from the clamp board 81 in the reproducing position of the small size disk 5. Then, as the turn table 45 is departed from the reproducing position, the damper 90 moves toward the turn table 45 as compressing the coil spring 88 (i.e. resisting against the urging force of the coil spring 88) as shown in FIG. 43(*b*).

And, the lower peripheral edge of the small size disk 5 runs over the engaging claws 66 as moving in a reverse to the direction in which the disk 5 is held and pinched. In the step of FIG. 43(*b*), the magnetic force act between the turn table 45 and the magnet 87 is greater than the urging force of the coil spring 88. Therefore, the small size disk 5 remains sandwiched between the turn table 45 and the damper 90.

As the turn table 45 is further moved to estrange from the damper 90, the magnetism of the magnet 87 attracting the turn table 45 becomes smaller than the urging force of the coil spring 88. And, as shown in FIG. 43(*c*), the small size disk 5 is retained by the engaging claws 66 at the lower peripheral edge in a state where it is dropped toward the lowermost area in the small diameter support region 61S of the main tray 61.

When the large size (12 cm) disk 3 is used in the vertical position of the disk drive 1, it is received on the pocket 70 formed by the main tray 61 and the sub tray 71. And, it is held and pinched between the damper 90 and the turn table 45 within a distance of the pocket 70. Accordingly, the large size disk 3 can be loaded to and unloaded from the turn table 45 with much ease.

According to this embodiment, the small size disk 5 is held at the lower periphery edge by the engaging claws 66 formed at the small diameter support region 61S of the main tray 61, even if the disk drive 1 is tilted at an angle over a predetermined angle range from the horizontal position. Thereby, the small size disk 5 remains securely be transferred even when the disk drive 1 is in such a tilted condition. In the loading mode, the peripheral edge of the small size disk 5 engaged with the engaging claws 66 is moved toward the damper 90 with its peripheral edge running over the engaging claws 66 and loaded to the turn table 45 as sandwiched between the damper 90 and the turn table 45.

In the unloading mode from the turn table 45, the small size disk 5 is moved toward the turn table 45 with its peripheral edge running over the engaging claws 66 and its held state between the damper 90 and the turn table 45 is canceled. As the result, the loading and unloading of the small size disk 5 on the turn table 45 can be conducted with no difficulties.

In particular, the engaging claw 66 has the taper surfaces 66*a* and 66*b* provided on both sides thereof for allowing the peripheral edge of the small size disk 5 to move over the engaging claw 66 as run along the taper surface 66*a* or 66*b*. Accordingly, the engagement and disengagement of the peripheral edge of the small size disk 5 with the engaging claws 66 can smoothly be carried out with using no greater force.

The coil spring 88 is provided between the spring hook 82 and the damper 90 which holds directly the small size disk 5 for urging the damper 90 in a reverse of the disk holding direction. Consequently, when the magnetic force exerted between the clamper 90 and the turn table 45 is greater than the urging force of the coil spring 88, the damper 90 is pressed towards the turn table 45 as resisting against the urging force. Thereby, the small size disk 5 remains securely hold between the two components. And, once the magnetic force becomes not greater than the urging force, the holding and pinching state of the disk 5 can be canceled.

As explained previously, the small diameter support region 61S is stepped down by a predetermined amount from the large diameter support region 61D in the main tray 61. However, according to the present embodiment, by appropriately determining the balance between the magnetic force and the urging force, the small size disk 5 can be held by a more time which corresponds to a difference in the altitude between the small diameter support region 61S and the large diameter support region 61D while the holding level between the turn table 45 and the damper 90 is equal between the small size disk 5 and the large size disk 3. More particularly, the small size disk 5 can be unloaded from the turn table 45 and returned back to the small diameter support region 61S of the main tray 61. Also, as soon as the disk holding action with the magnetic force between the turn table 45 and the damper 90 is canceled, the damper 90 can return back to its initial position.

As described, according to the present embodiment, a part of the disk 3 can be received and supported in the pocket 70 defined between the main tray 61 and the sub tray 71, and the disk can be transferred in this supported state. Accordingly, even when the disk drive 1 is placed in the vertical position, the disk 3 can easily be loaded and unloaded on the tray unit 60 and transferred with much stability. Further, the disk 3 can be supported by simply the main tray 61 with no use of the sub tray 71. In this case, with the disk drive 1 placed in the horizontal position, the disk 3 can be loaded and unloaded from above onto the main tray 61 without difficulty. That is, in the disk transfer device according to the present embodiment, it is possible to deal easily with usage in both horizontal installation and vertical installation.

It is to be understood that the present invention is not limited to the described embodiment but various modifications and design changes may be made without departing from the scope of the present invention.

INDUSTRIAL APPLICABILITY

As described above, in the disk transfer device according to the present invention, it is possible to deal easily with usage in both horizontal installation and vertical installation. Accordingly, the present invention is effectively applicable to make a disk drive to be the type of so-called two ways layout-free, or further so-called perfect layout-free.

The invention claimed is:

1. A disk transfer device comprising a disk support member for supporting a disk when it is transferred and a disk support member driving mechanism for driving the disk support member bidirectionally between a first position corresponding to a turntable disposition inside a disk drive and a second position corresponding to a disk loading/unloading position outside the disk drive, wherein the disk support member is provided with a first disk support member for supporting a side face of the disk and a second disk support member for supporting a part of the other side face of the disk, the second disk support member is constituted separately from the first disk support member, wherein a pocket portion for receiving a part of the disk is formed by the first and the second disk support member, and wherein the disk transfer device is further provided with a transfer mode switching mechanism for switching the disk transfer mode between a first transfer mode for holding and transferring the disk with only the first disk support member and a second transfer mode for holding and transferring the disk with both of the first disk support member and the second disk support member.

2. A disk transfer device according to claim 1, wherein the transfer mode switching mechanism switches the disk transfer mode so that the disk is transferred in the first transfer mode when it is in a horizontal position or in a tilting position tilted at an angle within a predetermined value, while the disk is transferred in the second transfer mode when the disk is in a tilting posture tilted at an angle over the predetermined value.

3. A disk transfer device according to claim 2, wherein the urging state in which the disk is urged toward the first disk support member is released when the disk is at the first position.

4. A disk transfer device according to claim 1, wherein the urging state in which the disk is urged toward the first disk support member is released when the disk is at the first position.

5. A disk transfer device according to claim 4,
wherein the urging mechanism is provided with a disk guide having a contact portion capable of contacting directly a part of the peripheral portion of the disk held by both of the first and the second disk support member, and an urging member capable of urging the disk guide toward the first disk support member, and
wherein the disk guide is mounted to the second disk support member for pivotal movement, and the disk guide is capable of pivoting about a mounting point thereof in a plane parallel to the disk.

6. A disk transfer device according to claim 5,
wherein the disk transfer device is further provided with a clamp board covering the second disk support member when both of the first and the second disk support member are disposed at the first position,
wherein the disk guide is provided with a projection capable of engaging with a groove provided in the clamp board, and
wherein the projection of the disk guide is guided along the groove of the clamp board, thereby the disk guide is turned toward a predetermined direction, when both of the first and the second disk support member are disposed at the first position, and thereby the urging state in which the disk is urged toward the first disk support member is released.

7. A disk transfer device according to claim 1, wherein the urging state in which the disk is urged toward the first disk support member is released when the disk is at the first position.

8. A disk transfer device comprising a disk support member for supporting a disk during it is transferred and a disk support member driving mechanism for driving the disk support member bidirectionally between a first position corresponding to a turntable disposition inside a disk drive and a second position corresponding to a disk loading/unloading position outside the disk drive,
wherein the disk support member is provided with a first disk support member for supporting a side face of the disk and a second disk support member for supporting a part of the other side face of the disk, the second disk support member is constituted separately from the first disk support member,
wherein a pocket portion for receiving a part of the disk is formed by the first and the second disk support member,
wherein the disk transfer device is further provided with a transfer mode switching mechanism for switching the disk transfer mode between the first transfer mode for holding and transferring the disk with only the first disk support member and the second transfer mode for holding and transferring the disk with both of the first disk support member and the second disk support member,
wherein the transfer mode switching mechanism switches the disk transfer mode so that the disk is transferred in the first transfer mode when it is in a horizontal position or in a tilting position tilted at an angle within a predetermined value, while the disk is transferred in the second transfer mode when the disk is in a tilting posture tilted at an angle over the predetermined value,
wherein the disk support member driving mechanism is connected with the first disk support member, and the disk transfer mode switching mechanism is provided on the second disk support member, and wherein a part of driving force of the disk support member driving mechanism is transmitted to the second disk support member through the disk transfer mode switching mechanism in the second transfer state.

9. A disk transfer device according to claim 8, wherein the disk transfer mode switching mechanism is provided with a switching lever which is vertically hanging down with its own weight for swing motion freely in relation to the second disk support member.

10. A disk transfer device according to claim 9,
wherein a first lock member is further provided, the first lock member is to prevent a swing motion of the switching lever when only the first disk support member is driven, and
wherein the first lock member is to release a preventive state in which the swing motion of the switching lever is prevented when the first disk support member is at the first position.

11. A disk transfer device according to claim 9,
wherein a second lock member is further provided, the second lock member is to prevent a swing motion of the switching lever when both of the first and the second disk support member are driven, and
wherein the second lock member is to release a preventive state in which the swing motion of the switching lever is prevented when both of the first and the second disk support member are at the first position.

12. A disk transfer device according to claim 8, wherein the disk transfer device is further provided with an urging mechanism capable of urging the disk held by both of the first and the second disk support member toward the first disk support member.

13. A disk transfer device according to claim 10,
wherein a second lock member is further provided, the second lock member is to prevent a swing motion of the switching lever when both of the first and the second disk support member are driven, and
wherein the second lock member is to release a preventive state in which the swing motion of the switching lever is prevented when both of the first and the second disk support member are at the first position.

14. A disk transfer device according to claim 9, wherein the disk transfer device is further provided with an urging mechanism capable of urging the disk held by both of the first and the second disk support member toward the first disk support member.

15. A disk transfer device according to claim 10, wherein the disk transfer device is further provided with an urging mechanism capable of urging the disk held by both of the first and the second disk support member toward the first disk support member.

16. A disk transfer device according to claim 11, wherein the disk transfer device is further provided with an urging mechanism capable of urging the disk held by both of the first and the second disk support member toward the first disk support member.

17. A disk transfer device according to claim 12, wherein the urging state in which the disk is urged toward the first disk support member is released when the disk is at the first position.

* * * * *

UNITED STATES PATENT AND TRADEMARK OFFICE
CERTIFICATE OF CORRECTION

PATENT NO. : 7,251,817 B2  Page 1 of 1
APPLICATION NO. : 10/499326
DATED : July 31, 2007
INVENTOR(S) : Yuji Ariyoshi et al.

It is certified that error appears in the above-identified patent and that said Letters Patent is hereby corrected as shown below:

In column 26, after line 52 (claim 1, line 16), insert the following paragraph:

--wherein the disk transfer device is further provided with an urging mechanism capable of urging the disk toward the first disk support member in a case when the disk is held by both of the first and the second disk support member, and--.

Signed and Sealed this

Sixteenth Day of December, 2008

JON W. DUDAS
*Director of the United States Patent and Trademark Office*